United States Patent
Sauz

(10) Patent No.: US 9,275,554 B2
(45) Date of Patent: Mar. 1, 2016

(54) DEVICE, SYSTEM, AND METHOD FOR ENHANCED MEMORIZATION OF A DOCUMENT

(71) Applicant: Jimmy M Sauz, Los Angeles, CA (US)

(72) Inventor: Jimmy M Sauz, Los Angeles, CA (US)

(*) Notice: Subject to any disclaimer, the term of this patent is extended or adjusted under 35 U.S.C. 154(b) by 198 days.

(21) Appl. No.: 14/034,554

(22) Filed: Sep. 24, 2013

(65) Prior Publication Data

US 2015/0088932 A1   Mar. 26, 2015

(51) Int. Cl.
| G06F 17/30 | (2006.01) |
|---|---|
| G09B 19/00 | (2006.01) |
| G06Q 50/20 | (2012.01) |
| G09B 7/02 | (2006.01) |
| G09B 7/06 | (2006.01) |

(52) U.S. Cl.
CPC .............. G09B 19/00 (2013.01); G06Q 50/20 (2013.01); G09B 7/02 (2013.01); G09B 7/06 (2013.01)

(58) Field of Classification Search
USPC .......................................... 707/754, 779, 803
See application file for complete search history.

(56) References Cited

U.S. PATENT DOCUMENTS

| 6,077,085 | A | 6/2000 | Parry et al. | |
|---|---|---|---|---|
| 7,492,949 | B1* | 2/2009 | Jamieson | G06F 17/248 382/217 |
| 8,370,947 | B2 | 2/2013 | Zaitsev et al. | |
| 8,373,724 | B2 | 2/2013 | Ratnakar et al. | |
| 8,401,293 | B2 | 3/2013 | Antonijevic et al. | |
| 8,463,786 | B2 | 6/2013 | Udupa et al. | |
| 9,082,309 | B1* | 7/2015 | Fuka | G09B 7/00 |
| 2003/0093760 | A1* | 5/2003 | Suzuki et al. | 715/523 |
| 2005/0033632 | A1* | 2/2005 | Wu et al. | 705/10 |
| 2005/0086257 | A1* | 4/2005 | Wright | 707/103 R |
| 2005/0278623 | A1* | 12/2005 | Dehlinger et al. | 715/517 |
| 2008/0104508 | A1* | 5/2008 | Lumley et al. | 715/255 |
| 2008/0294479 | A1* | 11/2008 | Emling et al. | 705/7 |
| 2011/0078570 | A1* | 3/2011 | Larsen et al. | 715/710 |
| 2011/0123967 | A1 | 5/2011 | Perronnin et al. | |
| 2013/0122482 | A1* | 5/2013 | Sukkarieh | 434/353 |
| 2013/0166567 | A1* | 6/2013 | Chen | G06F 17/3007 707/741 |
| 2013/0230833 | A1 | 9/2013 | Hewett | |
| 2014/0359509 | A1* | 12/2014 | Baran | G06F 17/248 715/771 |

\* cited by examiner

*Primary Examiner* — Hanh Thai
(74) *Attorney, Agent, or Firm* — Jimmy M. Sauz

(57) ABSTRACT

A device, system, and method for enhanced memorization of a document. A document may be initially uploaded into a computer system and the textual information of the document may be converted into a test template for memorization and/ or testing. Portions of the test template may be converted into various test items, and the test items, in combination with the contents of the scanned document, may be displayed by the computer system for a user to answer in order to enhance his or her memorization of the document. The test questions may comprise: fill-in-the-blank questions, multiple choice questions, true or false questions, Scrabble®-like questions, and/ or a combination thereof.

45 Claims, 41 Drawing Sheets

VOCABULARY

- abstract – a concept or idea not associated with any specific instance
- belittle – lessen the authority, dignity, or reputation of
- censure – harsh criticism or disapproval
- deference – a disposition or tendency to yield to the will of others
- eccentric – a person of a specified kind (usually with many eccentricities)
- facilitate – make easier
- guile – shrewdness as demonstrated by being skilled in deception
- heed – paying particular notice (as to children or helpless people)
- inadvertent – without intention (especially resulting from heedless action)
- mar – a mark or flaw that spoils the appearance of something (especially on a person's body)
- parsimony – extreme care in spending money
- recalcitrant – marked by stubborn resistance to authority
- sage – aromatic fresh or dried gray-green leaves used widely as seasoning for meats and fowl and game etc
- tangible – possible to be treated as fact
- verbose – using or containing too many words
- advocate – a person who pleads for a cause or propounds an idea

2215
Contract Outline | Vocabulary
2205
2210

CONTRACT OUTLINE

2220

I. VOCABULARY
   a. Contract: Legally enforceable agreement ("agreement")
   b. Quasi contract: Equitable remedy applied when there is an unfair, inequitable result → quasi contract.
      i. Elements 2225
         1. P has [____] on D, and
         2. P [____] to be paid, and   2235
         2230
         3. D realized [____] if P not be compensated
   c. Bilateral contract: results from an offer that is open as to the method of acceptance
   d. Unilateral contract: results from [____] that expressly requires performance as only possible method of acceptance (i.e., "offer, only by" "first come, first served" → if words appear in question, then unilateral)
   2240

II. APPLICABLE LAW: UCC and Common Law of Contracts
   a. Common Law (C/L) – Real Estate, Service Contracts_ _ _ _ 2245
   b. Article 2 of the UCC – contracts that are primarily [_ _ _ _ _]  2250
   c. Mixed Deals: It is all or nothing - apply either UCC or CL. Look at [____] part of deal.

III. FORMATION OF A CONTRACT
   a. OVERVIEW OF FORMATION:
      i. Offer: initial communication
      ii. Termination of Offer: what happens after the initial communication
      2255
      iii. Acceptance: who responds and how she responds ○ Fill in the Blank
◉ Multiple Choice      2260
○ True or False
○ Scrabble Please choose the correct answer:    2265 a. Sale of Goods          c. Unjust Enrichment b. Conferred a benefit   d. More Important Enter your answer here: [__]

FIG. 22

CONTRACT OUTLINE

I. VOCABULARY
    a. Contract: Legally enforceable agreement ("agreement")
    b. Quasi contract: Equitable remedy applied when there is an unfair, inequitable result → quasi contract.
        i. Elements
            1. P has <u>conferred a benefit</u> on D, and
            2. P <u>reasonably expected</u> to be paid, and
            3. D realized <u>unjust enrichment</u> if P not be compensated
    c. Bilateral contract: results from an offer that is open as to the method of acceptance
    d. Unilateral contract: results from <u>offer</u> that expressly requires performance as only possible method of acceptance (i.e., "offer, only by" "first come, first served"→ if words appear in question, then unilateral)

II. APPLICABLE LAW: UCC and Common Law of Contracts — 2305
    a. Common Law (C/L) – Real Estate, Service Contracts — 2310
    b. Article 2 of the UCC – contracts that are primarily *sales of goods*.
    c. Mixed Deals: It is all or nothing - apply either UCC or CL. Look at <u>more important</u> part of deal.

III. FORMATION OF A CONTRACT
    a. OVERVIEW OF FORMATION: — 2315
        i. Offer: initial communication
        ii. Termination of Offer: what happens after the initial communication
        iii. Acceptance: who responds and how she responds
    b. OFFERS
        i. RULE: An offer is a manifestation of willingness to enter into a K
        ii. CONTENT: Offer is <u>not</u> required to contain all material terms. But:
            1. No Price:
                a. (i) Sale of real estate (CL): price and description required, not an offer
                b. (ii) Sale of goods (UCC): no price requirement, offer if <u>parties so intend</u>
                    i. If failure to agree upon price → a reasonable price at time of delivery will be supplied by the court.
            2. Vagueness: Vague or ambiguous *material* terms not an offer under CL or
        iii. CONTEXT: An advertisement is <u>not</u> an offer.

Search Terms & Filters

Please Apply Search Terms and Filters

2805 — 2810

1. [phrase ▼] [after ▼] [ Rule: ] except: [enter filter here]
   — 2815

2. [select ▼] [select ▼] [enter search term] except: [enter filter here]

3. [select ▼] [select ▼] [enter search term] except: [enter filter here]

○ No search term is applied
  — 2820

Please check all applicable search criteria:

Point Headings: ☐                         [select ▼]
Bullet Points: ☐                          [select ▼]
Emphasized Text: ☐
            ○ Boldfaced   ○ Italicized   ○ Underlined
Highlighted Text: ☐                       [select ▼]
Colored Text: ☐                           [select ▼]
Predetermined Keywords: ☐

[Reset]  [Submit]

FIG. 28

2915
Contract Outline | Vocabulary 2905
2910
2920

I. VOCABULARY
  a. Contract: Legally enforceable agreement ("agreement")
  b. Quasi contract: Equitable remedy applied when there is an unfair, inequitable result → quasi contract.
     2925
     i. Elements
        1. P has <u>conferred a benefit</u> on D, and
        2. P <u>reasonably expected</u> to be paid, and
        3. D realized <u>unjust enrichment</u> if P not be compensated
  c. Bilateral contract: results from an offer that is open as to the method of acceptance
  d. Unilateral contract: results from <u>offer</u> that expressly requires performance as only possible method of acceptance (i.e., "offer, only by" "first come, first served"→ if words appear in question, then unilateral)

II. APPLICABLE LAW: UCC and Common Law of Contracts
  a. Common Law (C/L) – Real Estate, Service Contracts
  b. Article 2 of the UCC – contracts that are primarily *sales of goods*.
  c. Mixed Deals: It is all or nothing - apply either UCC or CL. Look at <u>more important</u> part of deal.

III. FORMATION OF A CONTRACT
  a. OVERVIEW OF FORMATION:
     i. Offer: initial communication
     ii. Termination of Offer: what happens after the initial communication
     iii. Acceptance: who responds and how she responds
  b. OFFERS — — — — — — — — — — — — — — — 2930
     i. RULE:[ — — — — — — — — — — — — — — ]
2935 — ii. CONTENT: Offer is not required to contain all material terms. But:

---

2940
◉ Fill in the Blank
○ Multiple Choice
○ True or False
○ Scrabble

Please fill in the blanks:   2945

Search Terms & Filters

Please Apply Search Terms and Filters

1. [phrase ▼] [after ▼] [Rule:] except: [enter filter here]

3005 — 3010 — 3015
2. [phrase ▼] [before ▼] [ - ] except: [enter filter here]

3. [select ▼] [select ▼] [enter search term] except: [enter filter here]

○ No search term is applied
    — 3020

Please check all applicable search criteria:

Point Headings: ☐       [select ▼]
Bullet Points: ☐        [select ▼]
Emphasized Text: ☐
    ○ Boldfaced    ○ Italicized    ○ Underlined
Highlighted Text: ☐     [select ▼]
Colored Text: ☐         [select ▼]
Predetermined Keywords: ☐

[Reset]  [Submit]

FIG. 30

CONTRACT OUTLINE
3120

I. VOCABULARY
   a. Contract: Legally enforceable agreement ("agreement")
   b. Quasi contract: Equitable remedy applied when there is an unfair, inequitable result → quasi contract.
      i. Elements
         1. P has conferred a benefit on D, and
         2. P reasonably expected to be paid, and
         3. D realized unjust enrichment if P not be compensated
   c. Bilateral contract: results from an offer that is open as to the method of acceptance
   d. Unilateral contract: results from offer that expressly requires performance as only possible method of acceptance (i.e., "offer, only by" "first come, first served"→ if words appear in question, then unilateral)

II. APPLICABLE LAW: UCC and Common Law of Contracts
   a. [____] – Real Estate, Service Contracts
   b. [____] – contracts that are primarily *sales of goods*.
   c. [____] - apply either UCC or CL. Look at more important part of deal.

III. FORMATION OF A CONTRACT
   a. OVERVIEW OF FORMATION:
      i. Offer: initial communication
      ii. Termination of Offer: what happens after the initial communication

---

Contract Outline | Vocabulary

○ Fill in the Blank
◉ Multiple Choice
○ True or False
○ Scrabble

Please choose the correct answer: 3150 a. Mixed Deals: It is all or nothing
b. Article 2 of the UCC
c. Common Law (C/L)
d. Quasi-Contract Enter your answer [ ]

| 3315 | 3305 |
| Contract Outline | Vocabulary | 3310 |

I. VOCABULARY    3320    3325
    a. Contract: Legally enforceable agreement ("agreement")
    b. Quasi contract: Equitable remedy applied when there is an unfair, inequitable result → quasi contract.
        i. Elements
            1. P has <u>conferred a benefit</u> on D, and
            2. P <u>reasonably expected</u> to be paid, and
            3. D realized <u>unjust enrichment</u> if P not be compensated
    c. Bilateral contract: results from an offer that is open as to the method of acceptance
    d. Unilateral contract: results from <u>offer</u> that expressly requires performance as only possible method of acceptance (i.e., "offer, only by" "first come, first served"→ if words appear in question, then unilateral)

II. APPLICABLE LAW: UCC and Common Law of Contracts
    a. [          ] – Real Estate, Service Contracts
    b. [          ] – contracts that are primarily *sales of goods*.
    c. [          ] – apply either UCC or CL. Look at <u>more important</u> part of deal.

III. FORMATION OF A CONTRACT
    a. OVERVIEW OF FORMATION:
        i. Offer: initial communication
        ii. Termination of Offer: what happens after the initial communication    3330
        iii. _ _ _ _ : who responds and how she responds
    b. OFFERS
        i. RULE: [          ]
3335         ii. CONTENT: Offer is not required to contain all material terms. But:

○ Fill in the Blank
○ Multiple Choice    3340
☑ True or False
○ Scrabble

True or False?    3345

Acceptance: who responds and how she responds.

○ True      ○ False

FIG. 33

Search Terms & Filters

Please Apply Search Terms and Filters

1. [phrase ▼] [after ▼] [Rule:] except: [enter filter here]

2. [phrase ▼] [before ▼] [ - ] except: [Mixed Deals] — 3405

3. [phrase ▼] [exactly ▼] [Acceptance] except: [enter filter here]

○ No search term is applied

Please check all applicable search criteria:

Point Headings: ☐     [select ▼]

Bullet Points: ☐     [select ▼]

Emphasized Text: ☐

○ Boldfaced    ○ Italicized    ○ Underlined

Highlighted Text: ☐     [select ▼]

Colored Text: ☐     [select ▼]

Predetermined Keywords: ☐

[Reset] [Submit]

BASIC ELECTRICAL ENGINEERING FORMULAS

I. BASIC ELECTRICAL CIRCUIT FORMULAS

| CIRCUIT ELEMENT | IMPEDANCE | | VOLT-AMP EQUATIONS | | ENERGY (dissipated on R or stored in L, C) |
| --- | --- | --- | --- | --- | --- |
| | Absolute Value | Complex Form | instantaneous values | RMS values for sinusoidal signals | |
| RESISTANCE | $R$ | $R$ | $v = iR$ | $V_{rms} = I_{rms}R$ | $E = I_{rms}^2 R \times t$ |
| INDUCTANCE | $2\pi f L$ | $j\omega L$ | $v = L \times di/dt$ | $V_{rms} = I_{rms} \times 2\pi f L$ | $E = Li^2/2$ |
| CAPACITANCE | $1/(2\pi f C)$ | $1/j\omega C$ | $i = C \times dv/dt$ | $V_{rms} = I_{rms}/(2\pi f C)$ | $E = Cv^2/2$ |

Notes:
- R - electrical resistance in ohms,
- L - inductance in henrys,
- C - capacitance in farads,
- f - frequency in hertz,
- t - time in seconds, $\pi \approx 3.14159$;
- $\omega = 2\pi f$ - angular frequency;
- j - imaginary unit ( $j^2 = -1$ )

II. BASIC ELECTRICAL THEOREMS AND CIRCUIT ANALYSIS LAWS

| LAW | DEFINITION | RELATIONSHIP |
| --- | --- | --- |
| Ohm's Law modified for AC circuits with sinusoidal signals | $\dot{U} = Z \times \dot{I}$, where $\dot{U}$ and $\dot{I}$ - voltage and current phasors, Z - complex impedance (for resistive circuits: $u = R \times i$ ) | Lorentz force law, Faraday's law and Drude model |
| Kirchhoff's Current Law (KCL) | The sum of electric currents which flow into any junction in an electric circuit is equal to the sum of currents which flow out | Conservation of electric charge |
| Kirchhoff's Voltage Law (KVL) | The sum of the electrical voltages around a closed circuit must be zero | Conservation of energy |

DEVICE, SYSTEM, AND METHOD FOR ENHANCED MEMORIZATION OF A DOCUMENT

FIELD

The present disclosure relates to the field of memorization using computer-implemented steps, and more particularly, to a device, system, and method for enhanced memorization of a document by using test items in lieu of certain keywords and phrases.

BACKGROUND

When studying for an exam, a student generally reads one or more documents several times to process and memorize their contents. Such study methods generally rely upon multiple readings of those documents and may involve the use of supplementary educational devices to facilitate the aid in learning and memorizing important facts and concepts. Once the student is comfortable with his or her knowledge of the subject matter, the student then proceeds into the testing arena to begin the examination process.

Unfortunately, the studying paradigm for most students is often time consuming and inefficient. The student generally begins by learning the material, preparing an outline, and memorizing its contents. The student may also attempt to solidify his or her knowledge by answering practice questions based on that material.

A law student engaging in some form of preparatory review for a state bar exam, for example, may rely on his or her lecture notes and outlines. Although the law student may have had prior exposure to some of the information covered by the bar exam, the student generally relies on supplementing himself or herself with additional study materials. Unfortunately, the contents of such study materials may not be tailored to the student's needs and usually do not take into account the student's familiarity with a particular subject matter area. Furthermore, the student may lack knowledge in other areas and, as a result, may be required learn new materials.

Furthermore, while the use of outlines, flash cards, practice workbooks, and lecture notes are helpful to many students, their prolonged use can be tedious. Such educational devices may also be costly and may contain an exorbitant amount of material, thereby requiring the student to invest substantial time and money in learning and memorizing certain practice areas.

Therefore, based on the foregoing, a need exists that overcomes these deficiencies. The present disclosure solves these deficiencies and generally represents a new and useful innovation in the realm of study techniques and document memorization.

SUMMARY

To minimize the limitations in the related art and other limitations that will become apparent upon reading and understanding the present specification, the following discloses a new and useful device, system, and method for enhanced memorization of a document.

One embodiment may be a method for enhanced memorization of a document using a computer system, the method comprising the computer-implemented steps of: accessing textual information of a document stored in a computer-readable storage device by an application running on a computer system; receiving at least one configuration setting from a user; responsive to a selection of one or more keywords of the textual information based on the at least one configuration setting, replacing the one or more selected keywords with one or more test items to create a test template, such that the test template may comprise the textual information and the one or more test items replacing the one or more selected keywords; and displaying to the user the test template, wherein the test template may be configured for the user to answer the one or more test items. The at least one configuration setting for the selection of the one or more keywords may be an automatic setting; wherein the automatic setting may cause the application to automatically select the one or more keywords of the textual information for testing based on one or more search criteria. The one or more search criteria may comprise a point headings search; wherein the point headings search may cause the application to automatically select one or more words preceded by one or more alphanumeric bullets, such that the one or more words preceded by the one or more alphanumeric bullets may be the one or more selected keywords. The one or more search criteria may comprise a bullet point search; wherein the bullet point search may cause the application to automatically select one or more words preceded by one or more bullets, such that the one or more words preceded by the one or more bullets may be the one or more selected keywords. The one or more search criteria may comprise an emphasized text search; wherein the emphasized text search may cause the application to automatically select one or more emphasized text, such that the one or more emphasized text may be the one or more selected keywords. The one or more search criteria may comprise a highlighted text search; wherein the highlighted text search may cause the application to automatically select one or more highlighted text, such that the one or more highlighted text may be the one or more selected keywords. The one or more search criteria may comprise a colored text search; wherein the colored text search may cause the application to automatically select one or more colored text, such that the one or more colored text may be the one or more selected keywords. The at least one configuration setting for the selection of the one or more keywords may be an automatic setting; wherein the automatic setting may cause the application to automatically select the one or more keywords of the textual information for testing based on a search term. The one or more automatically selected keywords of the textual information for testing may be the search term. The one or more automatically selected keywords of the textual information for testing may be one or more words preceding the search term. The one or more automatically selected keywords of the textual information for testing may be one or more words following the search term. The search term may comprise at least one search filter. The at least one configuration setting for the selection of the one or more keywords may be a manual setting; wherein the manual setting may cause the application to allow the user to manually select the one or more keywords of the textual information for testing. The method may further comprise the first step of: prompting the user to upload the document into the computer-readable storage device, wherein the uploaded document may comprise the textual information generated in response to an optical character recognition (OCR) module. The one or more test items may be selected from the group of test items consisting of: a fill-in-the-blank question; a multiple choice question; a true or false question; and a Scrabble®-like question.

Another embodiment may be a method for enhanced memorization of a document using a computer system, the method comprising the computer-implemented steps of: prompting a user to upload a document into a computer-readable storage device by an application running on a computer system; accessing textual information of the uploaded document stored in the computer-readable storage device; automatically selecting one or more keywords of the textual information of the uploaded document, wherein the one or more keywords may be subjects for testing; replacing the one or more automatically selected keywords of the textual information with one or more test items to create a test template, such that the test template may comprise the textual information and the one or more test items replacing the one or more automatically selected keywords; and displaying to the user the test template, wherein the test template may be configured for the user to answer the one or more test items. The automatically selecting step of the one or more selected keywords may be based on one or more search criteria. The one or more search criteria may comprise a point headings search; wherein the point headings search may cause the application to automatically select one or more words preceded by one or more alphanumeric bullets, such that the one or more words preceded by the one or more alphanumeric bullets may be the one or more automatically selected keywords. The one or more search criteria may comprise a bullet point search; wherein the bullet point search may cause the application to automatically select one or more words preceded by one or more bullets, such that the one or more words preceded by the one or more bullets may be the one or more automatically selected keywords. The one or more search criteria may comprise an emphasized text search; wherein the emphasized text search may cause the application to automatically select one or more emphasized text, such that the one or more emphasized text may be the one or more automatically selected keywords. The one or more search criteria may comprise a highlighted text search; wherein the highlighted text search may cause the application to automatically select one or more highlighted text, such that the one or more highlighted text may be the one or more automatically selected keywords. The one or more search criteria may comprise a colored text search; wherein the colored text search may cause the application to automatically select one or more colored text, such that the one or more colored text may be the one or more automatically selected keywords. The automatically selecting step of the one or more selected keywords may be based on a search term; wherein the search term may comprises at least one search filter. The one or more automatically selected keywords of the textual information for testing may be the search term. The one or more automatically selected keywords of the textual information for testing may be one or more words preceding the search term. The one or more automatically selected keywords of the textual information for testing may be one or more words following the search term. The uploaded document may comprise the textual information generated in response to an optical character recognition (OCR) module. The one or more test items may be selected from the group of test items consisting of: a fill-in-the-blank question; a multiple choice question; a true or false question; and a Scrabble®-like question.

Another embodiment may be a method for enhanced memorization of a document using a computer system, the method comprising the computer-implemented steps of: prompting a user to upload a document into a computer-readable storage device by an application running on a computer system; accessing textual information of the uploaded document stored in the computer-readable storage device; displaying to the user the textual information; prompting the user to manually select one or more keywords of the textual information of the uploaded document, wherein the one or more manually selected keywords may be one or more subjects for testing; replacing the one or more manually selected keywords of the textual information of the uploaded document with one or more test items to create a test template, such that the test template may comprise the textual information and the one or more test items replacing the one or more manually selected keywords; and displaying to the user the test template, wherein the test template may be configured for the user to answer the one or more test items. The uploaded document may comprise the textual information generated in response to an optical character recognition (OCR) module. The one or more test items may be selected from the group of test items consisting of: a fill-in-the-blank question; a multiple choice question; a true or false question; and a Scrabble®-like question.

Another embodiment may be a non-transitory computer readable storage medium, comprising one or more executable instructions, which, when executed by a computer system, may configure the computer system to perform a method for enhanced memorization of a document, comprising: accessing textual information of a document stored in a computer-readable storage device by an application running on a computer system; receiving at least one configuration setting from a user; responsive to a selection of one or more keywords of the textual information based on the at least one configuration setting, replacing the one or more selected keywords with one or more test items to create a test template, such that the test template may comprise the textual information and the one or more test items replacing the one or more selected keywords; and displaying to the user the test template, wherein the test template may be configured for the user to answer the one or more test items. The at least one configuration setting for the selection of the one or more keywords may be an automatic setting; wherein the automatic setting may cause the application to automatically select the one or more keywords of the textual information for testing based on one or more search criteria. The one or more search criteria may comprise a point headings search; wherein the point headings search may cause the application to automatically select one or more words preceded by one or more alphanumeric bullets, such that the one or more words preceded by the one or more alphanumeric bullets may be the one or more selected keywords. The one or more search criteria may comprise a bullet point search; wherein the bullet point search may cause the application to automatically select one or more words preceded by one or more bullets, such that the one or more words preceded by the one or more bullets may be the one or more selected keywords. The one or more search criteria may comprise an emphasized text search; wherein the emphasized text search may cause the application to automatically select one or more emphasized text, such that the one or more emphasized text may be the one or more selected keywords. The one or more search criteria may comprise a highlighted text search; wherein the highlighted text search may cause the application to automatically select one or more highlighted text, such that the one or more highlighted text may be the one or more selected keywords. The one or more search criteria may comprise a colored text search; wherein the colored text search may cause the application to automatically select one or more colored text, such that the one or more colored text may be the one or more selected keywords. The at least one configuration setting for the selection of the one or more keywords may be an automatic setting; wherein the automatic setting may cause the application to automatically select the one or more keywords of the textual information for testing based on a search term. The one or more automatically selected keywords of the textual information for testing may be the search term. The one or more automatically selected keywords of the textual information for testing may be one or more words preceding the search term. The one or more automatically selected keywords of the textual information for testing may be one or more words following the search term. The search term may comprise at least one search filter. The at least one configuration setting for the selection of the one or more keywords may be a manual setting; wherein the manual setting may cause the application to allow the user to manually select the one or more keywords of the textual information for testing. The one or more test items may be selected from the group of test items consisting of: a fill-in-the-blank question; a multiple choice question; a true or false question; and a Scrabble®-like question.

It is an object to provide a device, system, and method that assists a user to enhance his or her memorization of a document. The document may be uploaded into a computer system and may be converted into a test template.

It is an object to facilitate the learning and memorizing of facts or concepts.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are illustrative embodiments. They do not illustrate all embodiments. They do not set forth all embodiments. Other embodiments may be used in addition or instead. Details, which may be apparent or unnecessary, may be omitted to save space or for more effective illustration. Some embodiments may be practiced with additional components or steps and/or without all of the components or steps, which are illustrated. When the same numeral appears in different drawings, it is intended to refer to the same or like components or steps.

FIG. 17 is an illustration of one embodiment of a document with bullet points.

FIG. 22 is a screenshot of another embodiment of the graphical user interface of the application and shows the search results of an emphasized text search in an automatic configuration setting.

FIG. 23 is an illustration of one embodiment of a document with highlighted text and colored text.

FIG. 28 is a screenshot of another embodiment of the automatic search window of the application and shows how a user may use a search term to automatically search for keywords positioned after the search term in a document.

FIG. 29 is a screenshot of another embodiment of the graphical user interface of the application and shows the search results of an automatic search that uses a search term in an automatic configuration setting.

FIG. 30 is a screenshot of another embodiment of the automatic search window of the application and shows how a user may use a search term to automatically search for keywords positioned before the search term in a document.

FIG. 31 is a screenshot of another embodiment of the graphical user interface of the application and shows the search results of an automatic search that uses a search term in an automatic configuration setting.

FIG. 33 is a screenshot of another embodiment of the graphical user interface of the application and shows the search results of an automatic search that uses a search term in an automatic configuration setting.

FIG. 34 is a screenshot of another embodiment of the automatic search window of the application and shows how a user may use a search term and search filter to automatically search for keywords in a document.

FIG. 35 is a screenshot of another embodiment of the graphical user interface of the application and shows the search results of an automatic search that uses a search term and search filter in an automatic configuration setting.

FIG. 38 is an illustration of another embodiment of a document.

FIG. 40 is a screenshot of another embodiment of the graphical user interface of the application and shows the search results of a manual search in a manual configuration setting.

DETAILED DESCRIPTION OF ILLUSTRATIVE EMBODIMENTS

Figure 1:
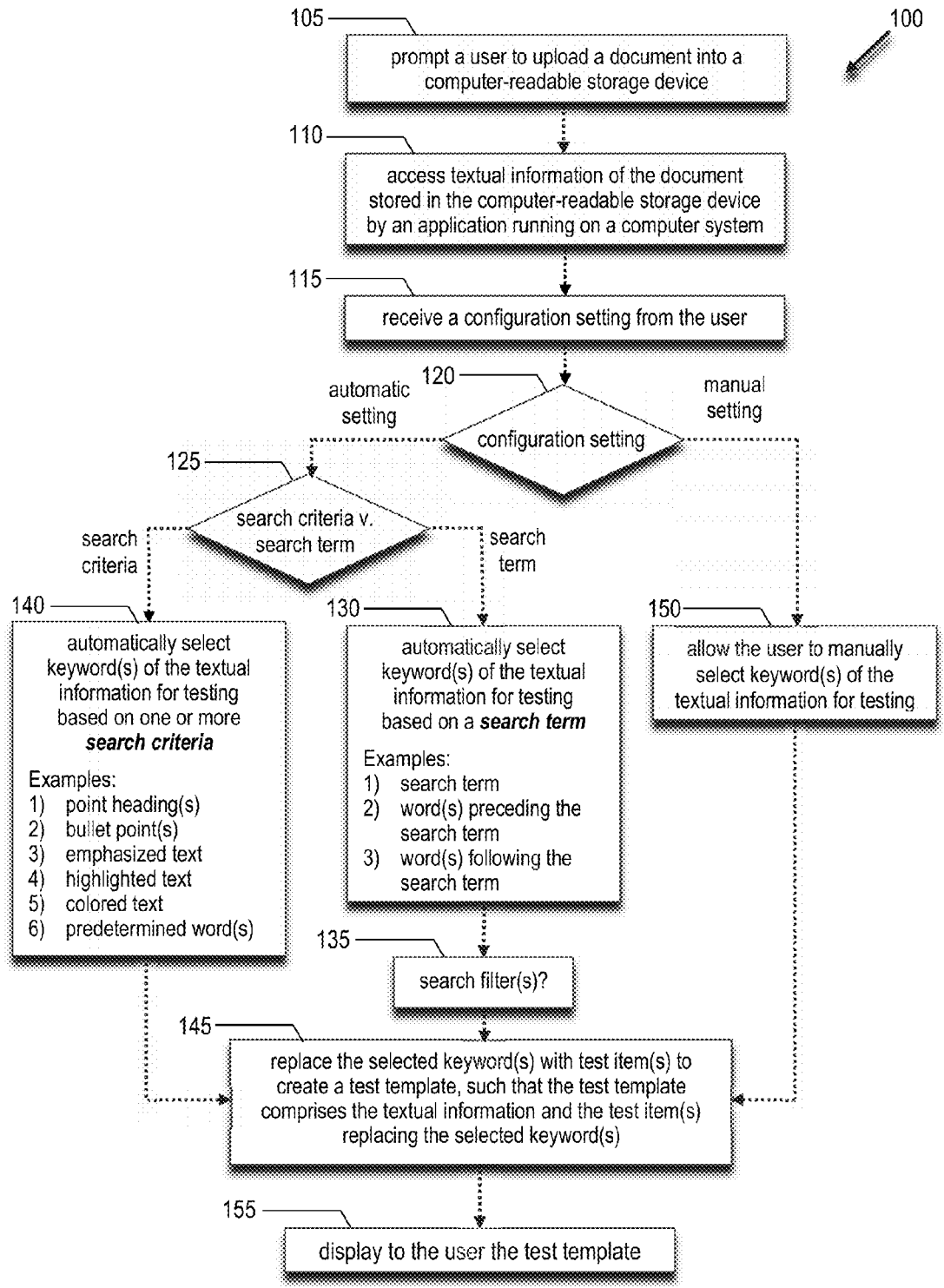
FIG. 1 is a flow chart of one embodiment of the method for enhanced memorization of a document.

In the following detailed description of various illustrative embodiments, numerous specific details are set forth in order to provide a thorough understanding of various aspects of one or more embodiments. However, these embodiments may be practiced without some or all of these specific details. In other instances, well-known methods, procedures, and/or components have not been described in detail so as not to unnecessarily obscure aspects of the embodiments.

While multiple embodiments are disclosed, still other embodiments of the present disclosure will become apparent to those skilled in the art from the following detailed description. As will be realized, the following embodiments may be capable of modifications in various obvious aspects, all without departing from the spirit and scope of the present disclosure. Accordingly, the graphs, figures, and the detailed descriptions thereof, are to be regarded as illustrative in nature and not restrictive. Also, the reference or non-reference to a particular embodiment shall not be interpreted to limit the scope of the disclosure.

Before the embodiments are disclosed and described, it is to be understood that this these embodiments are not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should also be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment", "an embodiment", or "another embodiment" may mean that a particular feature, structure, or characteristic described in connection with the embodiment may be included in at least one embodiment of the present disclosure. Thus, appearances of the phrases "in one embodiment" or "in an embodiment" in various places throughout this specification may not necessarily refer to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of the embodiments. One skilled in the relevant art will recognize, however, that the scope of protection can be practiced without one or more of the specific details, or with other methods, components, materials, etc. In other instances, well-known structures, materials, or operations are generally not shown or described in detail to avoid obscuring aspects of the disclosure.

Definitions

In the following description, certain terminology is used to describe certain features of one or more embodiments. For example, as used herein, the terms "computer", "computer system", "computing device", "electronic data processing unit", or "server" generally refer to any device that processes information with an integrated circuit chip, including without limitation, personal computers, mainframe computers, workstations, servers, desktop computers, portable computers, laptop computers, embedded computers, wireless devices, including cellular phones, personal digital assistants, tablets, tablet computers, smart phones, portable game players, and hand-held computers.

As used herein, the term "Internet" generally refers to any collection of networks that utilizes standard protocols, whether Ethernet, Token ring, Wi-Fi, asynchronous transfer mode (ATM), Fiber Distributed Data Interface (FDDI), code division multiple access (CDMA), global systems for mobile communications (GSM), long term evolution (LTE), or any combination thereof.

As used herein, the terms "application", "software", or "software application" generally refer to any set of machine-readable instructions on a client machine, web interface, and/or computer system, that directs a computer's processor to perform specific steps, processes, or operations disclosed herein. The "application", "software", or "software application" may comprise one or more modules that direct the operation of the computer system on how to perform the disclosed method for enhanced memorization of a document, including without limitation, a graphical user interface module, upload module, document module, user account module, optical character recognition module, text processing module, foreign language module, manual configuration module, search criteria module, search term module, test item module, and tutorial module. The "application", "software", or "software application" may also comprise one or more sub-modules, including without limitation, a point headings module, bullet point sub-module, emphasized text sub-module, highlighted text sub-module, colored text sub-module, search term sub-module, words before a search term sub-module, words after a search term sub-module, and a search filter sub-module.

As used herein, the term "search term" generally refers to one or more alphanumeric characters, words, symbols, or phrases that may be inputted by a user to locate certain words or keywords in a document.

As used herein, the term "document" generally refers to one or more pieces of written, printed, or electronic matter that provides information. A document may be a physical hard copy such as written notes, lecture notes, outlines, paper outlines, books, lists, spreadsheets, and the like. Alternatively, a document may be any electronic or digital file, including without limitation, Adobe® portable document format files (.pdf), Microsoft® Word® document files (.doc, .docx), plain text files (.txt), hypertext markup language files (.htm, .html), rich text format files (.rtf), WordPerfect® files (.wpd), and Microsoft® Excel® spreadsheet files (e.g., .xls, .xlsx), Microsoft® Word® macro-enabled documents (.docm), Microsoft® Word® template files (.doct), extensible markup language files (.xml), xml paper specification files (.xps), open document text files (.odt), Microsoft® Works® files (.wps), Microsoft® Outlook® files (.pst), and the like. Furthermore, a document may be one or more image files, including without limitation, joint photographic experts group files (.jpg, .jpeg), portable network graphics files (.png), graphics interchange format files (.gif), Adobe® Photoshop® document files (.psd), and the like.

As used herein, the term "upload" may refer to the process of transferring data, files, or programs usually from a peripheral computer, device, or electronic accessory to another computer, remote computer, or computer readable media, including without limitation, hard drives, flash memory devices, universal serial bus drives, floppy disks, compact discs (CDs), digital video discs (DVDs), CD-ROM drives, and/or DVD-ROMs. Examples of uploading may also include, without limitation, transferring data from a client workstation to a server, dragging files from one digital folder to another digital folder, and transferring data from one computer-readable storage device to another computer-readable storage device.

As used herein, the term "computer-readable medium" may refer to any storage medium configured to store data and/or instructions that are executable by a processor of a computer system. The computer-readable storage medium may be a computer-readable non-transitory storage medium and/or any non-transitory data storage circuitry (e.g., buffers, cache, and queues) within transceivers of transitory signals. The computer-readable storage medium may also be any tangible computer readable medium. In various embodiments, a computer readable storage medium may also be able to store data which is able to be accessed by the processor of the computer system. Examples of such computer-readable mediums may comprise, without limitation: a floppy disk, a magnetic hard disk drive, a solid state hard disk, flash memory, a USB thumb drive, Random Access Memory (RAM) memory, Read Only Memory (ROM) memory, an optical disk, a magneto-optical disk, and the register file of the processor. Examples of optical disks may include Compact Disks (CD) and Digital Versatile Disks (DVD), for example CD-ROM, CD-RW, CD-R, DVD-ROM, DVD-RW, or DVD-R disks. The term "computer readable-storage medium" may also refer to various types of recording media capable of being accessed by the computer device via a network or communication link. For example data may be retrieved over a modem, over the internet, or over a local area network.

As used herein, the term "keyword" generally refers to one or more significant words, phrases, images, alphanumeric characters, or concepts in a document. A "keyword" may be manually selected by the user (i.e., manually selected keywords) or automatically selected by the application (i.e., automatically selected keywords). The term "keyword" may also refer to any word, symbol, and phrase in a document, as described herein.

As used herein, the terms "prompt" or "prompting" may refer to any act by the application to assist or encourage a user to perform a certain act. The terms "prompt" or "prompting" may also refer to any passive action or inaction by the application that allows or permits a user to perform a certain act without the assistance or act of the application.

As used herein, the term "point heading" may refer to one or more lists of alphanumeric characters or alphanumeric bullets divided into headings and subheadings that distinguish main points from supporting points. The term "alphanumeric bullet" may refer to any first character(s) in a point heading, which may precede a period, including without limitation, roman numerals, capitalized letters, Arabic numerals, lowercase letters, and numbers. The "alphanumeric bullet" may introduce headings, subheadings, important words/phrase, and main points. The term "bullet point" may refer to any number of items printed in a list, each of which may be after a centered dot or symbol and may be the important points in a longer piece of text.

As used herein, the terms "emphasized word" or "emphasized text" may refer to one or more words, phrases, or symbols in a document, showing emphasis, and may be in a format such as boldface, underline, or italics. Examples of such "emphasized words" or "emphasized text" in a document may comprise a boldfaced word, an underlined word, and/or an italicized word.

An embodiment may be a device, system, or method for enhanced memorization of a document. A document may be initially uploaded into a computer system and the textual information of the document may be converted into a test template for memorization and/or testing. Portions of the test template may be converted into various test items, and the test items, in combination with the contents of the scanned document, may be displayed by the computer system for a user to answer in order to enhance his or her memorization of the document. The test questions may comprise: fill-in-the-blank questions, multiple choice questions, true or false questions, Scrabble®-like questions, and/or a combination thereof.

Given that the documents may be used for studying, certain words and phrases may appear as the subject of studying for such documents. These words and phrases may appear as boldface, italicized or underlined. These words and/or phrases may also be preceded by a hyphen, thereby placing much emphasis towards that certain word/phrase. In view of the foregoing, it may be possible to replace these keywords with test items for studying. A keyword extraction technique described herein may be used as the topic for studying for each document.

FIG. 1 is a flow chart of one embodiment of the method for enhanced memorization of a document. As shown in FIG. 1, one embodiment of the method 100 for enhanced memorization of a document may comprise step 105, which may be prompting a user to upload a document into a computer-readable storage device. The computer-readable storage device may be any device or component used to store data or information. Examples of such computer-readable storage devices may include, without limitation: a floppy disk, a magnetic hard disk drive, a solid state hard disk, flash memory, a USB thumb drive, Random Access Memory (RAM) memory, Read Only Memory (ROM) memory, an optical disk, a magneto-optical disk, and the register file of a processor. Examples of optical disks may include, without limitation, Compact Disks (CD) and Digital Versatile Disks (DVD) (e.g., CD-ROM, CD-RW, CD-R, DVD-ROM, DVD-RW, or DVD-R disks). The term "computer-readable storage device" may also refer to various types of recording media capable of being accessed by a computer system via a network or communication link. For example, data may be retrieved over a modem, over the Internet, or over a local area network. Regarding the document, a document may be any piece of written, printed, or electronic matter that provides information. Examples of such documents may include a digital file or physical piece of paper containing text.

In various embodiments, the user may upload the document into a computer-readable storage device by transferring data from one computer system or device to another computer system or device. Step 105 of uploading the document may be accomplished in various ways, including without limitation, transferring a digital file in a computer system, transferring document data from a peripheral device (e.g., universal serial bus (USB) drive, external hard drive, flash drive, etc. . . . ) to a computer system, transferring document data from a client workstation to a server or vice versa, dragging files from one computer file folder to another file folder, scanning documents into a computer system using a scanner, and/or transferring data from a local disk drive to a software application. It should be understood, however, that the method 100 may lack step 105 without deviating from the scope of protection.

After the document has been uploaded to the computer-readable storage device, the method 100 may comprise step 110, which may be accessing textual information of the document stored in the computer-readable storage device by an application running on a computer system. The textual information may be any content on the document, including without limitation, one or more words, symbols, phrases, or images that provides information to the user. The textual information may also comprise one or more keywords for testing. For example, the textual information may comprise words, phrases, topics, definitions, formulas, main points, rules, concepts, ideas, or any form of information that would be used for memorization and/or testing. Thus, after the document has been uploaded into a computer-readable storage device, the application may access, review, or interpret the textual information for processing.

In additional embodiments where the document may comprise one or more physical pieces of written material (e.g., notes, outlines, book, etc. . . . ), a user may scan the physical written document into a scanner to convert the document into a digital format. Optical character recognition (OCR) by an OCR processor or OCR module of the application may then be used to process the document to create the textual information readable by the application of the computer system.

After the application has accessed the textual information of the document, the application may receive one or more configuration settings from the user, as shown in step 115. Specifically, the method 100 may involve the user to perform step 120, which may be selecting one or more configuration settings in the application to select keywords of a document. Such configuration settings may comprise an automatic setting, a manual setting, semi-automatic setting, or both. For example, if a user selects an automatic setting for the configuration setting, the application may automatically select one or more keywords in the document, wherein the one or more keywords may be used for testing. Such automatic settings may comprise: (1) a keyword search based on one or more search criteria or (2) a keyword search based on a search term. On the other hand, if a user chooses to select a manual setting for the configuration setting, the application may prompt the user to manually select the keywords. Furthermore, in various embodiments, the application may be configured to allow the user to select both an automatic setting and a manual setting to allow both the user and application to select the keywords to be used as test items.

Assuming that the user selects an automatic setting for the configuration setting, another embodiment of the method 100 may comprise step 125, which may be selecting a search based on either a search term or one or more search criteria. A search term may be any one or more words, symbols, marks, images, or phrases inputted by a user to locate keywords in the textual information of a document. Utilizing a search based on a search term may then lead to step 130, which may be automatically selecting keywords of the textual information for testing based on the search term. In step 130, the method 100 may incorporate a search term function used to assist the user is searching for one or more particular keywords. For example, a user may select a hyphen or dash sign ("-") as the search term, and may use that search term to choose or select keywords before and/or after the hyphen or dash sign. Alternatively, the user may also use a search term to select those keywords that are identical to the search term. Thus, examples of search results due to a keyword search based on a search term may comprise: (1) words and/or keywords that are the search term itself; (2) words and/or keywords preceding the search term; or (3) words and/or keywords following the search term.

Furthermore, utilizing a search term in step 130 may comprise an additional step 135, which may be incorporating a search filter to improve a user search query. Specifically, the search filter may be configured to remove or filter one or more unwanted words, keywords, or phrases. For example, if a user inputs a search term for words located before a period and incorporates a search filter using the word "rule", then a search result may comprise of one or more words or keywords before a period without the word "rule". Thus, any words in the document may virtually be selected in response to a search term query inputted by the user.

On the other hand, assuming that no search term is employed, an embodiment of the method 100 may comprise step 140, which may be automatically selecting one or more keywords of textual information for testing based on one or more search criteria. Certain search criteria selected by the user may cause the application to search one or more words, keywords, or phrases as the subject for testing. Examples of such search criteria may comprise: a point headings search, bullet point search, emphasized text search, highlighted text search, colored text search, and predetermined word search. A point heading search may be an automatic search by the application to select one or more words preceded by one or more alphanumeric bullets in a document, such that those selected words are the selected keywords of that document. A bullet point search may be an automatic search by the application to select one or one or more words preceded by one or more bullets in a document, such that those selected words are the selected keywords in that document. An emphasized text search may be an automatic search by the application to select one or more emphasized text or emphasized keywords in a document (e.g., boldfaced, italicized, underlined, etc. . . . ), such that those selected emphasized text or emphasized keywords are the selected keywords in that document. A highlighted text search may be an automatic search by the application to select one or more highlighted text in a document, such that those selected highlighted text are the selected keywords in that document. The colored text search may be an automatic search by the application to select one or more colored text in a document, such that those selected colored text are the selected keywords in that document. The predetermined word search may be an automatic search by the application to select one or more preset words in a document, such that those preset words are the selected keywords in that document.

After the keywords have been automatically selected by the application via step 130 and/or step 140, the application may perform step 145, which may be replacing the automatically selected keyword(s) with test item(s) to create a test template. As discussed, above, the one or more automatically selected keywords or words may be used for testing, in accordance with the preference of the user. A test item may be one or more questions used to test the knowledge of the user pertaining to the selected keyword(s) of a document and may be directed to enhance the memorization of the user for those automatically selected keywords of a document. Each test item may comprise at least one question such as a fill-in-the-blank question, multiple choice question, true or false question, or a Scrabble®-like question. Additionally, in the situation of a Scrabble®-like question, the user may be allowed to select letters, words, or symbols used for scrabbling—i.e., the user may be allowed to rearrange or construct the correct order of words, letters, and/or symbols for memorizing the automatically selected keyword(s) or phrase(s).

Turning to step 145, in a preferred embodiment, the test template may comprise textual information of the document and one or more test items. As discussed above, the textual information may be any content on the document, comprising a plurality of words, symbols, phrases, and/or images that provide information to the user and may contain one or more words and/or keywords for testing. The test item may be one or more questions used for testing to enhance the memory of the user regarding those selected keywords. In an embodiment, the test template may comprise both textual information and test items replacing the one or more selected keywords for testing. Specifically, the test item may substantially overlap the selected keywords for memorization. Thus, the test template may show the contents of a document with certain keywords removed, redacted, covered, or retracted in order to allow the user to test his or her memory for those particular test items. As such, the user may be presented with a test template, comprising a document with test items in lieu of those selected keywords.

Turning to step 150, in another embodiment of the method 100, the user may select a manual setting for the configuration setting. Specifically, when a user selects a manual setting as the configuration setting, the application may allow the user to manually select one or more words as the manually selected keywords for testing. Thus, unlike step 130 and step 140 where the application selects keywords, this configuration setting thus may allow the user to select certain keywords and replace those keywords as test items in accordance with the preferences of the user without the need of setting a search criteria and/or search term(s). After the user has manually selected certain keywords that he or she would like to test, those keywords may be replaced by the test items.

Finally, after a test template has been created (i.e., test items substantially covering or replacing keywords in the textual information of a document) in accordance with step 145, one embodiment of the method 100 may comprise step 155, which may be displaying the test template to the user for testing. Here, the test template may be displayed to a user through the display screen of the computer system such as a display screen on a tablet computer, monitor in a desktop computer, display screen on a smartphone, and/or display screen of a laptop computer. The test template may also be stored in a computer system and displayed on a separate display screen. Alternatively, the test template may be displayed to the user at a display screen of a workstation and/or stored in a separate computer system such as a remote server or database. Although FIG. 1 shows only eleven steps, the method 100 may comprise any number of steps, and some steps may be performed at the same time or out of order.

Figure 2:
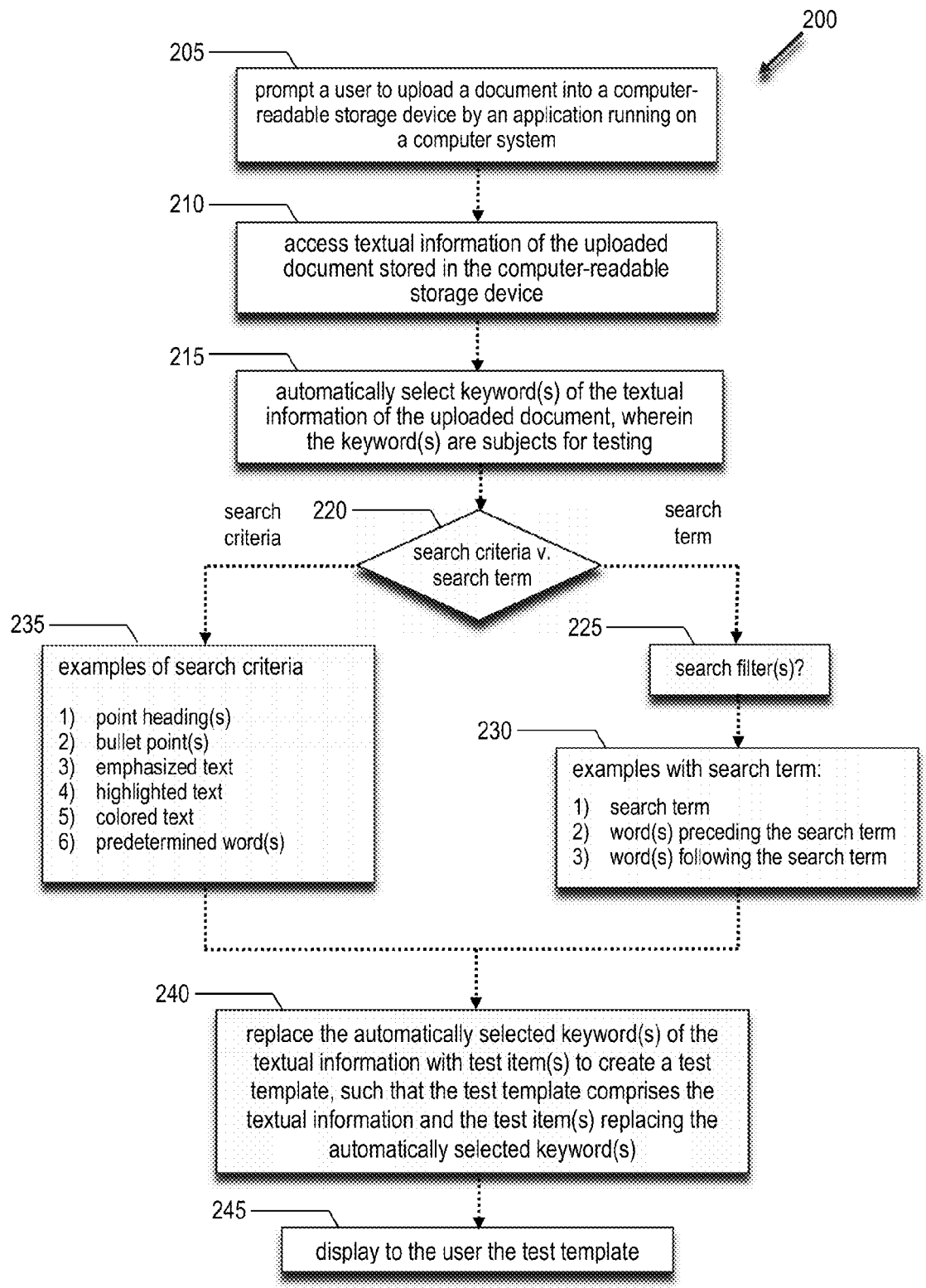
FIG. 2 is a flow chart of another embodiment of the method for enhanced memorization of a document.

FIG. 2 is a flow chart of another embodiment of the method for enhanced memorization of a document. As shown in FIG. 2, another embodiment of the method 200 may comprise step 205 of prompting a user to upload a document into a computer-readable storage device by an application running on a computer system. Like method 100, method 200 may allow the user to upload the document into a computer-readable storage device by transferring data from one computer system or device to another computer system. Specifically, the user may upload the document in various ways, including without limitation, transferring a digital file in a computer system, transferring document data from a peripheral device to a computer system, transferring document data from a client workstation to a server or vice versa, dragging files from one computer file folder to another file folder, scanning documents into a computer system using a scanner, and/or transferring data from a local disk drive to a software application. It should be understood, however, that the method 200 may also lack step 205.

After the document has been uploaded into a computer-readable storage device in digital form, the method 200 may comprise step 210, which may be accessing textual information of a document. As discussed above, the textual information may be any content on the document and may comprise one or more words, phrases, topics, definitions, formulas, main points, rules, concepts, ideas, or any form of information that would the subject for memorization and/or testing. After the document has been uploaded into a computer-readable storage device, the application may then access, review, or interpret the textual information for processing. If a document comprises one or more physical pieces of written material, a user may scan the physical document using a scanner to convert the document into digital form. An OCR processor or OCR module may then be used to process the document to create textual information readable by the computer system.

The method 200 may then comprise step 215, which may be automatically selecting one or more keywords of textual information for testing. This may depend upon the user's selection in step 220, which may be selecting one or more search terms and/or one or more search criteria inputted by the user. For example, if a user selects a search term, the application may automatically select one or more keywords in the document based on the search term, wherein the one or more keywords may be used for testing. Like the search term function in method 100, the search term(s) in method 200 may be any words, symbols, marks, images, or phrases inputted by a user to locate one or more other words, phrases, images, or symbols in the textual information of a document. The search term may allow the user to search for one or more particular words and/or keywords and may comprise an additional step 225, which may be incorporating a search filter to improve the search query by removing unwanted words, keywords, or phrases. Examples of such keywords selected as test items may be the search term itself, one or more words preceding the search term, and/or one or more words following the search term, as shown and described in step 230.

On the other hand, the method 200 may comprise step 235, which may be automatically selecting one or more keywords of textual information for testing. Like method 100, method 200 may have certain search criteria selected by the user. These search criteria may cause the application to automatically search one or more words, keywords, or phrases as the subject for testing. Examples of such search criteria may comprise: a point headings search, bullet point search, emphasized text search, highlighted text search, colored text search, and predetermined word search. A point heading search may be an automatic search by the application to select one or more words preceded by one or more alphanumeric bullets in a document, such that those selected words are the selected keywords of that document. A bullet point search may be an automatic search by the application to select one or one or more words preceded by one or more bullets in a document, such that those selected words are the selected keywords in that document. An emphasized text search may be an automatic search by the application to select one or more emphasized text or emphasized keywords in a document (e.g., boldfaced, italicized, underlined, etc. . . . ), such that those selected emphasized text or emphasized keywords are the selected keywords in that document. A highlighted text search may be an automatic search by the application to select one or more highlighted text in a document, such that those selected highlighted text are the selected keywords in that document. The colored text search may be an automatic search by the application to select one or more colored text in a document, such that those selected colored text are the selected keywords in that document. The predetermined word search may be an automatic search by the application to select one or more preset words in a document, such that those preset words are the selected keywords in that document.

After the application has automatically searched and selected all of the keywords, the application may replace the selected keywords with one or more test items to create a test template, as shown in step 240. Here, like method 100, the test template in method 200 may comprise both textual information and test items. These test items may substantially cover or replace the selected keywords and may offer the user with an option to answer certain questions in the test template.

Finally, after a test template has been created, the test template may be displayed to the user for testing, as shown and described in step 245. The test template may be displayed to a user through the display screen of any computer system such that the user may answer those test items on the text template, as displayed on the display screen. Although FIG. 2 shows only nine steps, it should be understood that the method 200 may comprise any number of steps, and some steps may be performed at the same time or out of order.

Figure 3:
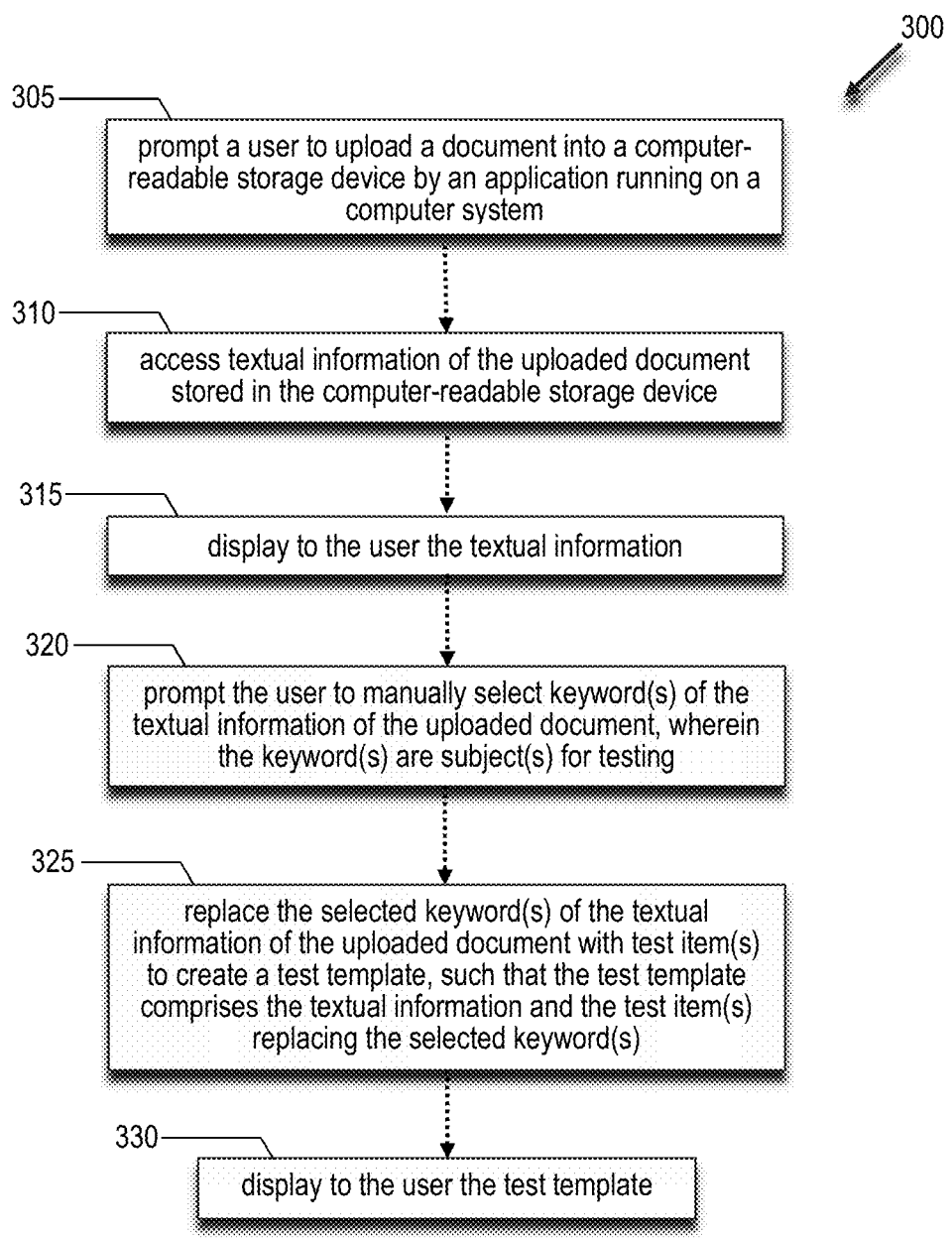
FIG. 3 is a flow chart of another embodiment of the method for enhanced memorization of a document.

FIG. 3 is a flow chart of another embodiment of the method for enhanced memorization of a document. As shown in FIG. 3, another embodiment of the method 300 may comprise step 305, which may be prompting a user to upload a document into a computer-readable storage device by an application running on a computer system. Specifically, in step 305, the user may upload the document in various ways, including without limitation, transferring a digital file into the computer system, transferring document data from a peripheral device to a computer system, transferring document data from a client workstation to a server or vice versa, dragging files from one computer file folder to another file folder, scanning documents into a computer system using a scanner, and/or transferring data from a local disk drive to a software application. It should be understood, however, that the method 300 may lack step 305.

After the document has been uploaded into a computer-readable storage device in digital form, the method 300 may comprise step 310, which may be having the application access textual information from the document. The textual information may be any content on the document and may comprise of words, phrases, topics, definitions, formulas, main points, rules, concepts, ideas, or any form of information that would be the subject for memorization and/or testing. After the document has been uploaded into a computer-readable storage device, the application may then access, review, or interpret the textual information for processing. In the event where a document is one or more physical pieces of written material (e.g., notes, outlines, or a book), a user may scan the physical document using a scanner to convert the document into digital form. An OCR processor or OCR module may then be used to process document to create textual information readable by the computer system.

In step 315, portions of the textual information or the textual information as a whole may be displayed to the user. This may be accomplished when the computer system displays through a display screen the textual information of the document. Once displayed, the user may be prompted to manually select one or more keywords of the textual information of the uploaded document. Such prompting by the application may be in the form of instructions and may include asking the user to select one or more words for testing. Alternatively, the application may allow the user to manually select the keywords without any instructions by the application to do so. As such, method 300, unlike method 100, 200 may allow the user to select those keywords for testing.

After the user has manually selected all of his or her desired keywords, the application may replace those manually selected keywords of the uploaded document with one or more test items to create a test template, as shown in step 325. Here, like method 100, 200, the test template in method 300 may comprise both textual information and test items. The test items may substantially cover or replace the selected keywords and may offer the user with option to answer certain questions on the test template for those replaced selected keywords.

Finally, after a test template has been created, the test template may be displayed to the user for testing, as shown and described in step 330. Specifically, the test template may be displayed to a user through the display screen of any computer system and the test template may be configured to allow a user to answer those test items. Although FIG. 3 shows only six steps, it should be understood that the method may comprise any number of steps, and some steps may be performed at the same time or out of order.

Figure 4:
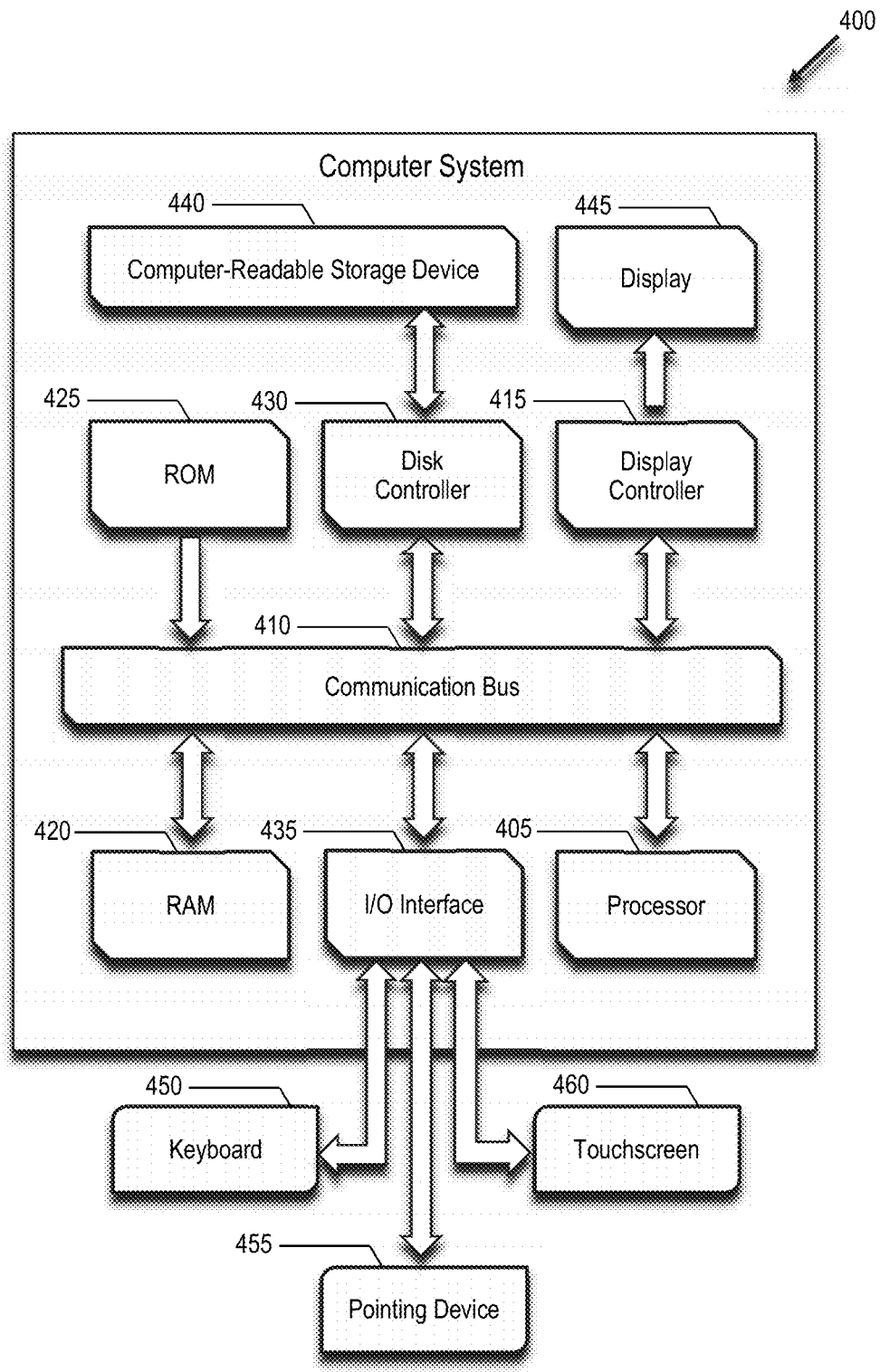
FIG. 4 is a block diagram of one embodiment of a computer system.

FIG. 4 is a block diagram of one embodiment of a computer system. As shown in FIG. 4, one embodiment of the computer system 400 may comprise: a processor 405, communication bus 410, display controller 415, random access memory (RAM) 420, read only memory (ROM) 425, disk controller 430, input/output interface (I/O interface) 435, computer-readable storage device 440, display 445, and one or more input devices; wherein the one or more input devices may be: a keyboard 450, pointing device 455 (e.g., mouse), and/or a touchscreen 460. In one embodiment, the computer system 400 may be a personal computer that comprises a processor 405 connected through a communication bus 410, wherein the communication bus 410 may further connect to other electronic hardware, including without limitation, a display controller 415, RAM 420, ROM 425, disk controller 430, and I/O interface 435. The disk controller 430 may be configured to control the computer-readable storage device 440, which may be a hard drive and/or optical disk drive. The computer-readable storage device 440 may also be another form of random access memory or flash memory. The display controller 415 may be connected to a display 445 such as a liquid crystal display (LCD), projection system, or touchscreen. The I/O interface 435 may be connected to one or more input devices such as a keyboard 450, pointing device 455, and/or touchscreen 460. In additional embodiments, the computer system 400 may also comprise a network controller card connected through a network (shown in FIG. 41) such as the Internet or along an Intranet.

The processor 405 may be configured to execute a set of computer readable instructions and further to execute an application or computer program described herein. The computer readable instructions and application may comprise instructions that cause the processor 405 to perform the above-disclosed methods and processes when the instructions are executed by the processor 405. In other various embodiments, the computer readable instructions or application may be tangibly embodied in the memory of the computer system 400 such as the RAM 420 or ROM 425, as shown in FIG. 4, or on a computer-readable storage medium, such as a magnetic, optical or solid-state digital storage medium.

Figure 5:
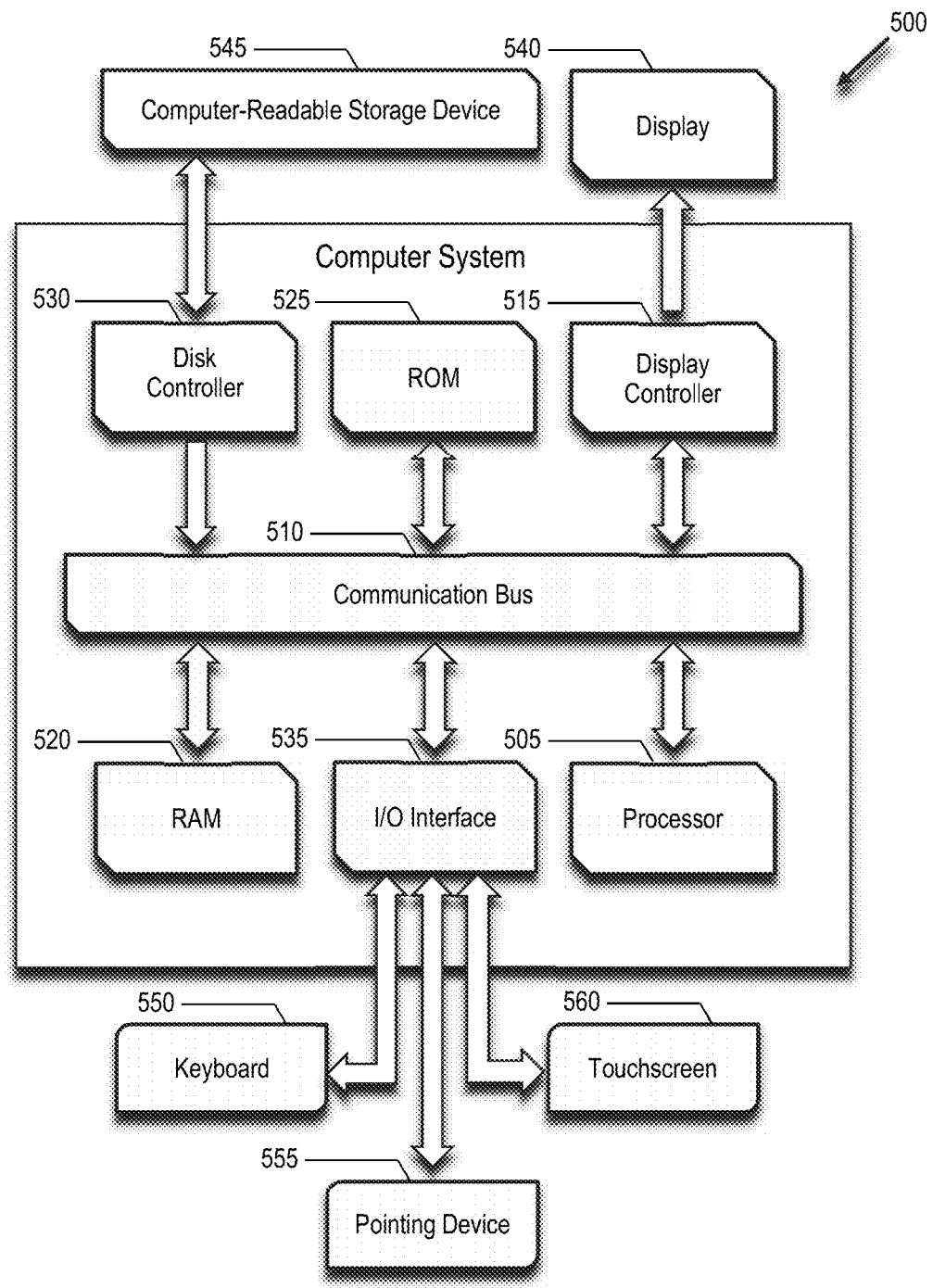
FIG. 5 is a block diagram of another embodiment of a computer system and shows the computer-readable storage device as an independent peripheral device.

FIG. 5 is a block diagram of another embodiment of a computer system and shows the computer-readable storage device as an independent peripheral device. As shown in FIG. 5, another embodiment of the computer system 500 may comprise: a processor 505, communication bus 510, display controller 515, random access memory (RAM) 520, read only memory (ROM) 525, disk controller 530, input/output interface (I/O interface) 535, display 540, computer-readable storage device 545, and one or more input devices. The one or more input devices may be: a keyboard 550, pointing device 555 (e.g., mouse), or a touchscreen 560. In this embodiment, unlike the computer system 400 shown in FIG. 4, a computer-readable storage device 540 may serve as a device that is independent from the computer system. Specifically, the computer-readable storage device 545 may be a peripheral device such as a flash drive, universal serial bus (USB) drive, external hard drive, network attached storage (NAS) drive connected through a local area network (LAN) or wide area network (WAN), or a separate hard drive in another computer system communicatively connected to the computer system 500 through the Internet.

Figure 6:
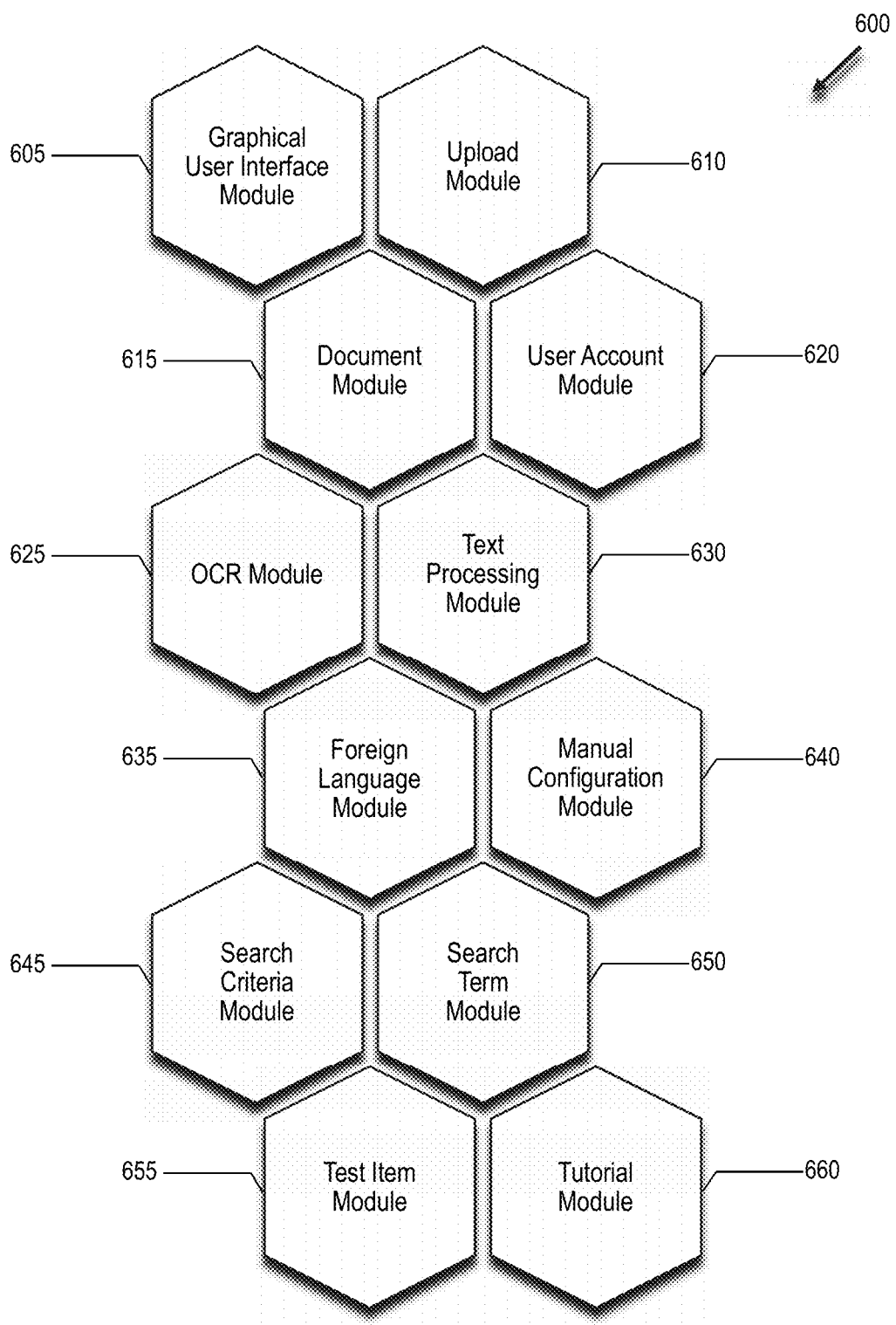
FIG. 6 is an illustration of one embodiment of the application and illustrates several software modules that may be used in at least one embodiment.

FIG. 6 is an illustration of one embodiment of the application and illustrates several software modules that may be used in at least one embodiment. In other embodiments, one or more these modules may be combined or omitted altogether. As shown in FIG. 6, one embodiment of the application 600 may comprise: a graphical user interface module 605, upload module 610, document module 615, user account module 620, OCR module 625, text processing module 630, foreign language module 635, manual configuration module 640, search criteria module 645, search term module 650, test item module 655, and tutorial module 660. In an embodiment, the graphical user interface module 605 may be configured to operatively generate and operatively display a graphical user interface and may be configured to enable a user to change a configuration setting, allow a user to search a document, select one or more keywords for testing, answer one or more test items, and/or capture one or more inputs of a user. The graphical user interface module 605 may also be used in conjunction with the several other types of modules. The upload module 610 may be configured to manage the uploading of a document to a computer-readable storage device 440, 540, component of a computer system 500, 600, or any other electronic device. The document module 615 may be configured to manage one or more electronic documents that are stored in the computer-readable storage device 440, 540. The user account module 620 may be configured to create, authenticate, and manage user accounts and may also include other processes, such as an updating user account processes, which may change existing user account information. The OCR module 625 may be configured to optically recognize one or more characters in a document and may be configured to decode the scanned images of the document to recognize such characters in the document. The text processing module 630 may be configured to extract and organize relevant keywords based on predetermined words, keys, phrases, patterns of words and phrases, and associated question/answer analysis. Furthermore the relevance of such words and/or phrases may be determined in light of their presence, frequency, and context. The foreign language module 635 may be configured to interpret various foreign language texts in a document. The manual configuration module 640 may be configured to allow a user to manually select one or more words or keywords in a document for memorization and testing. The search criteria module 645 may be configured to allow a user to automatically search for one or more words or keywords in a document based on certain search criteria (e.g., point headings search, bullet point search, emphasized text search, highlighted text search, colored text search, predetermined words selection, etc. . . . ). The search term module 650 may be configured to allow a user to automatically search for one or more words or keywords in a document based on one or more search terms. The test item module 655 may be configured to replace the selected words or keywords with test items used for testing, such that one or more test questions appear (e.g., fill-in-the-blank questions, multiple choice questions, true or false questions, Scrabble®-like questions, etc. . . . ). The test item module 655 may also be configured to allow a user to answer those test questions and may generate questions and answers based on the selected keywords. The tutorial module 660 may be configured to provide the user with assistance in navigating through the application 600 and other various aspects of the method 100, 200, 300.

Figure 7:
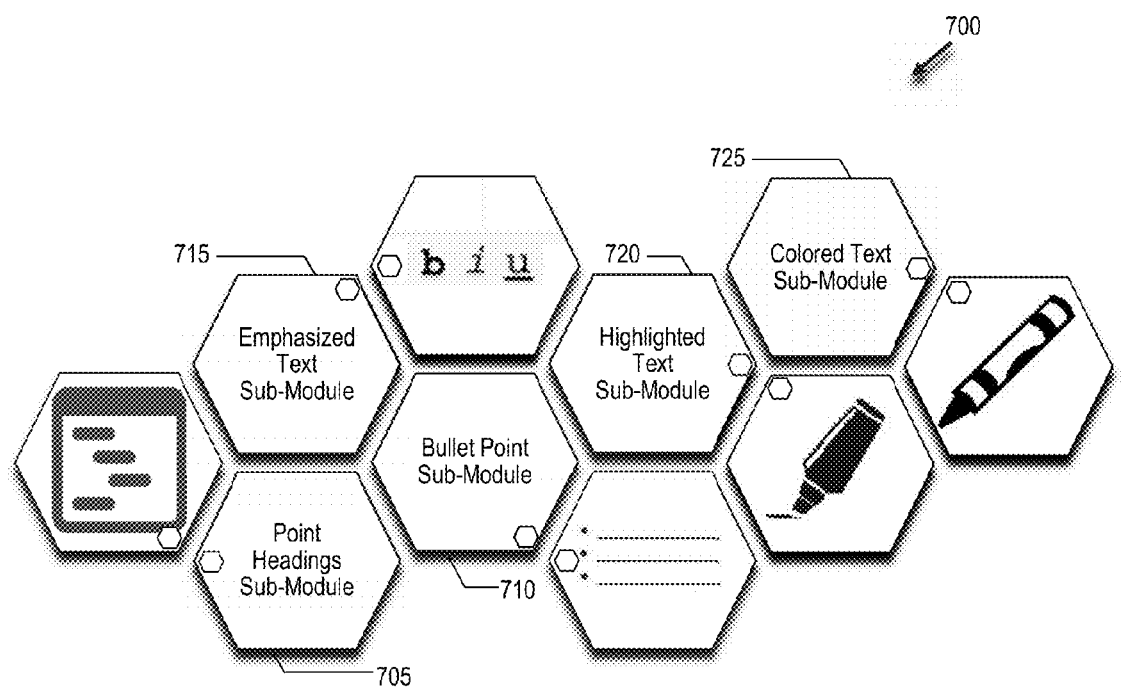
FIG. 7 is an illustration of one embodiment of the search criteria module and illustrates several sub-modules that may be used in at least that embodiment.

FIG. 7 is an illustration of one embodiment of the search criteria module and illustrates several sub-modules that may be used in at least that embodiment. In other embodiments, one or more these sub-modules may be combined or omitted altogether. As shown in FIG. 7, one embodiment of the search criteria module 700 may comprise: a point headings module 705, bullet point sub-module 710, emphasized text sub-module 715, highlighted text sub-module 720, and colored text sub-module 725. The point headings module 705 may be configured to allow a user to automatically search for one or more words or keywords in a document based on point headings in a document. The bullet point sub-module 710 may be configured to allow a user to automatically search for one or more words or keywords in a document based on bullet points in a document. The emphasized text sub-module 715 may be configured to allow a user to automatically search for one or more words or keywords in a document based on emphasized text in a document. The highlighted text sub-module 720 may be configured to allow a user to automatically search for one or more words or keywords in a document based on highlighted text in a document. The colored text sub-module 725 may be configured to allow a user to automatically search for one or more words or keywords in a document based on colored text in a document.

Figure 8:
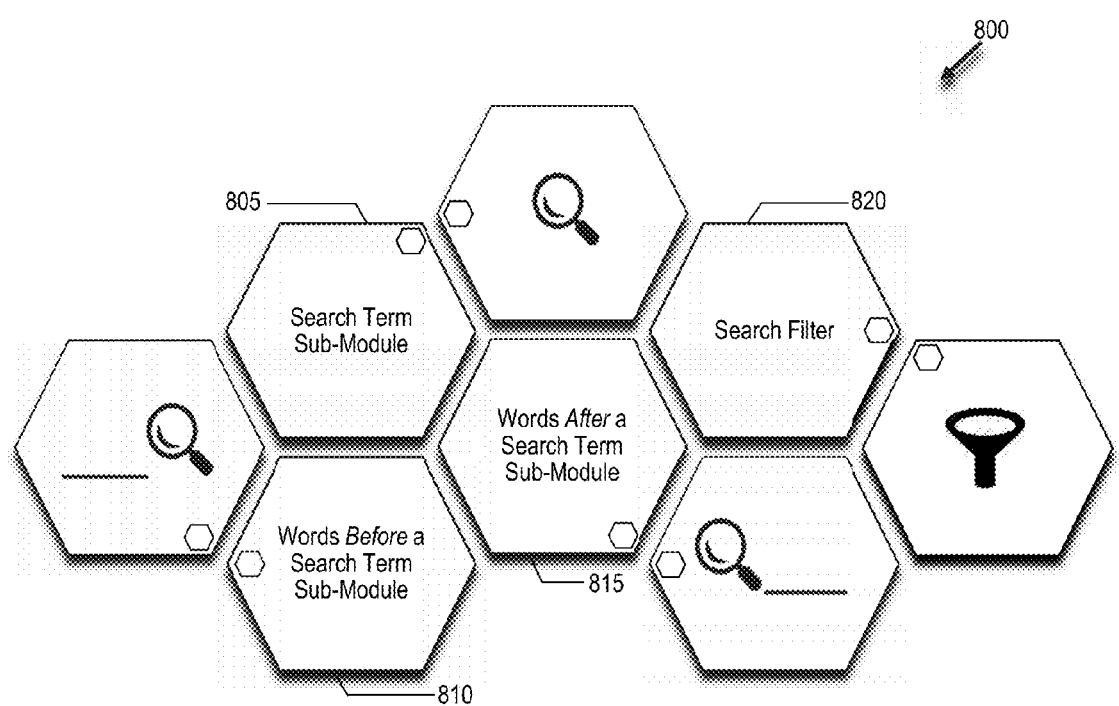
FIG. 8 is an illustration of another embodiment of the search term module and illustrates several sub-modules that may be used in at least one embodiment.

FIG. 8 is an illustration of another embodiment of the search term module and illustrates several sub-modules that may be used in at least one embodiment. In other embodiments, one or more these sub-modules may be combined or omitted altogether. As shown in FIG. 8, one embodiment of the search term module 800 may comprise: search term sub-module 805, words before a search term sub-module 810, words after a search term sub-module 815, and a search filter sub-module 820. The search term sub-module 805 may be configured to allow a user to automatically search for one or more words or keywords in a document based on one or more search terms. The words before a search term sub-module 810 may be configured to allow a user to automatically search for one or more words or keywords in a document based on words located before a search term. The words after a search term sub-module 815 may be configured to allow a user to automatically search for one or more words or keywords in a document based on words located after a search term. The search filter sub-module 820 may be configured to incorporate one or more search filters for each search term function.

Figure 9:
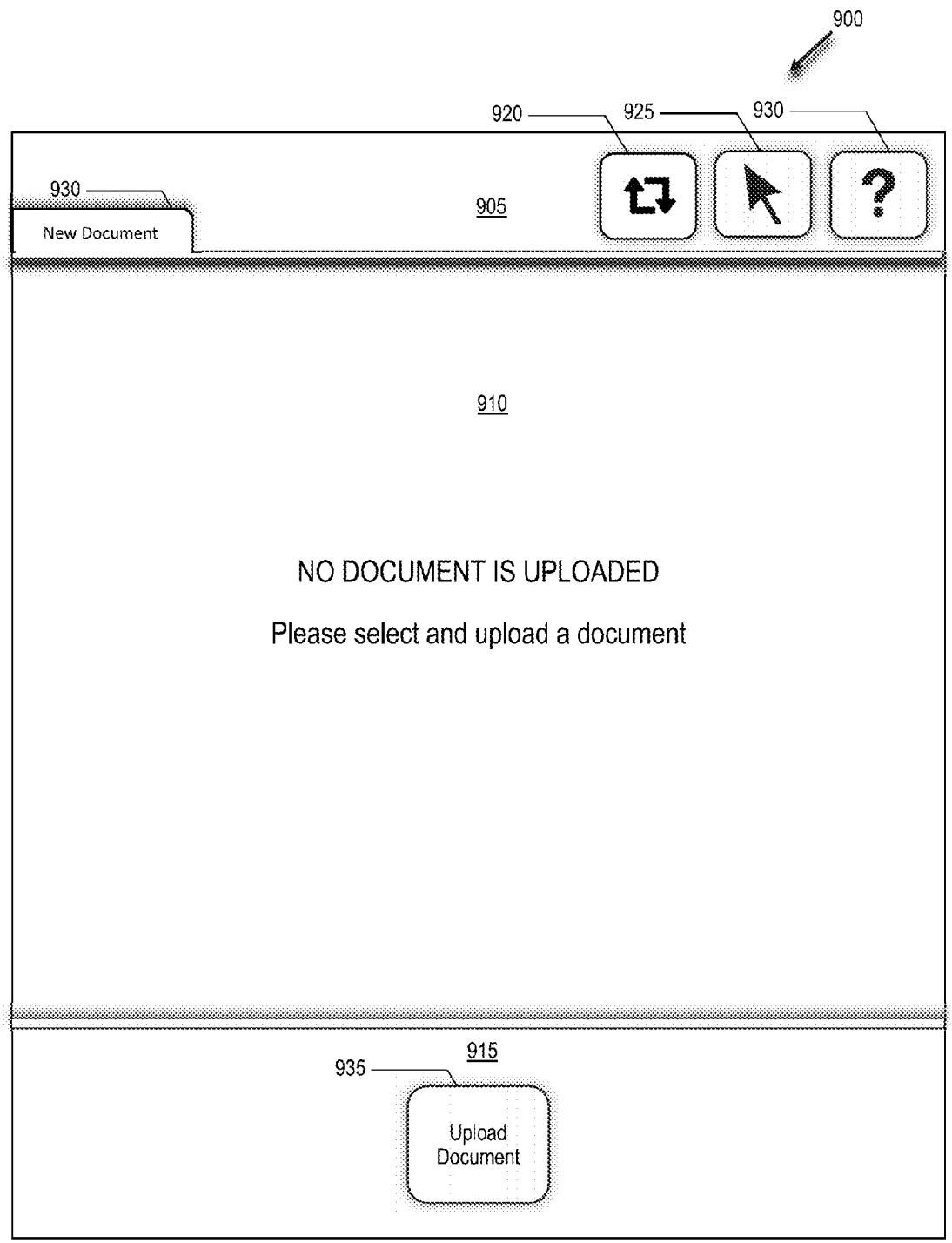
FIG. 9 is a screenshot of one embodiment of the graphical user interface of the application.

FIG. 9 is a screenshot of one embodiment of the graphical user interface of the application. As shown in FIG. 9, one embodiment of the graphical user interface (GUI) 900 of the application 600 may comprise: a menu bar 905, document window 910, and user input window 915. FIG. 9 shows that the menu bar 905 may comprise: an automatic configuration button 920, manual configuration button 925, and help button 930. The automatic configuration button 920 may be configured to open an automatic search window 1100 (shown in FIG. 11). The automatic search window 1100 may allow the user to select one or more certain search criteria and/or one or more search terms for automatically searching and selecting certain words and/or keywords to be replaced with those words and/or keywords as test items. Examples of such search criteria may comprise: a point headings search, bullet point search, emphasized text search, highlighted text search, colored text search, and predetermined word search. The automatic search window 1100 may also comprise one or more search term input fields and/or one or more search filters to allow a user to search for certain keywords in the document via the search terms. The manual configuration button 925 may allow the user to manually select certain keywords to be replaced as test items for testing, and the help button 930 may open a tutorial window, which may provide the user with information as to how to navigate through the GUI 900 of the application 600. Although the menu bar 905 only shows three buttons, it should be understood that any number of buttons may be provided by the application 600.

FIG. 9 also shows the document window 910 and user input window 915. The document window 910 may provide one or more window tabs, wherein the window tabs may be configured to load a digital image of the document, thereby showing the textual information of that document. The one or more window tabs may also comprise a new document window tab 930, which may show no document but may prompt the user to upload and/or select a document, as shown in FIG. 9. However, the graphical user interface 900 may have a plurality of window tabs or no window tabs.

Regarding the user input window 915, one or more buttons may be incorporated in the user input window 915 to allow the user to enter data or provide user inputs into application 600. In one embodiment, one button may be an upload document button 935, which may be configured to open a submit document window 1000 (shown in FIG. 10). Although FIG. 9 shows the user input window 915 with only one button, any number of buttons or no buttons may be displayed and provided by the application 600.

Figure 10:
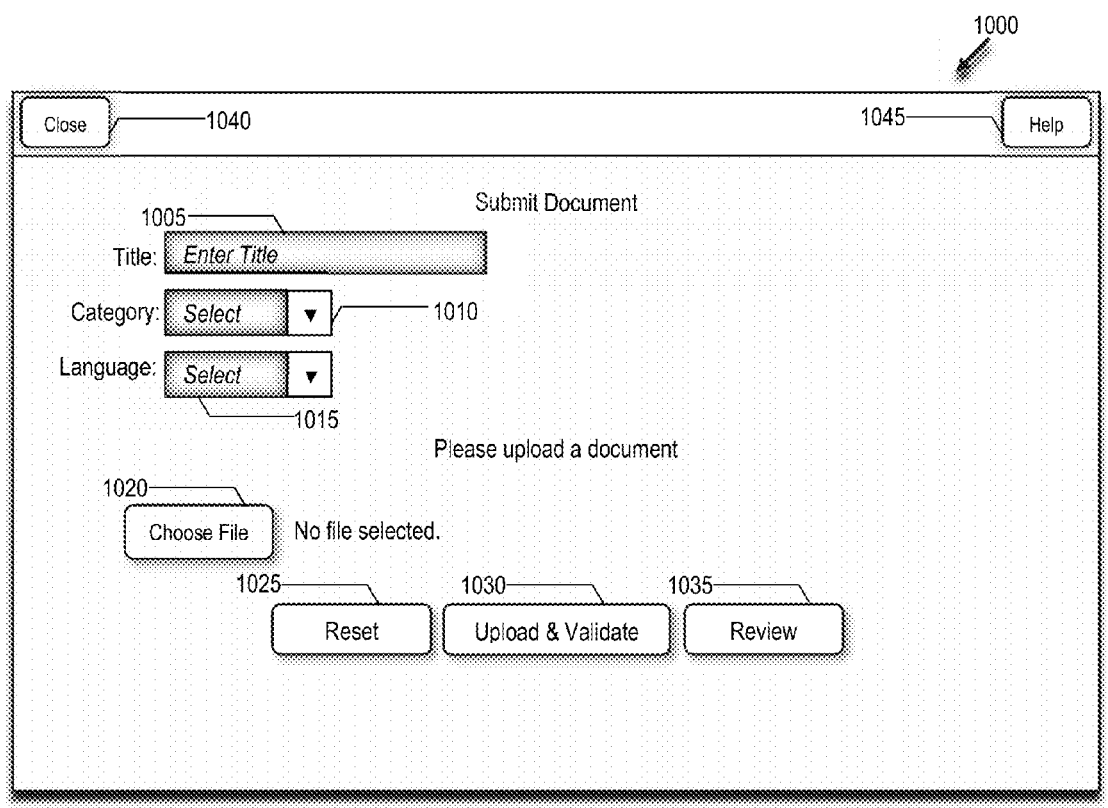
FIG. 10 is a screenshot of one embodiment of a submit document window of the application.

FIG. 10 is a screenshot of one embodiment of a submit document window of the application. As shown in FIG. 10, one embodiment of the submit document window 1000 may comprise: a title input field 1005, category input field 1010, language input field 1015, choose file button 1020, reset button 1025, upload button 1030, review button 1035, close button 1040, and help button 1045. As discussed above, the submit document window 1000 may appear when a user selects the document button 935, shown in FIG. 9 and may be used to upload a document into a computer readable storage device accessible by the application 600. The title input field 1005 may be an input field where the user may input the title of the document or project that he or she desires to memorize from. The category input field 1010 may be a scroll down menu, as shown in FIG. 10, or a typewritten input field used to classify the current document being uploaded. Examples of such categories may include, without limitation, outlines, lists, bullet lists, notes, spreadsheets, slides, articles, formulas, and the like. The language input field 1015 may be a scroll down menu, as shown in FIG. 10, or typewritten input field used to identify the type of language used in the document. Examples of such languages may include, without limitation, Arabic, Bengali, English, Cantonese, French, Dutch, Farsi, Japanese, Javanese, Jin, German, Gurjarati, Hindi, Italian, Kannada, Korean, Latin, Malay/Indonesian, Malayalam, Mandarin, Marathi, Min Nan, Pashto, Persian, Polish, Portuguese, Punjabi, Russian, Spanish, Sundanese, Tagalog, Tamil, Telugu, That, Turkish, Urdu, Vietnamese, Wu, and Xiang. In various embodiments, the application 600 may comprise a foreign language module 635, which may be used to translate or interpret various languages of the document for OCR processing. The foreign language module 635 may also be used to assist the application 600 in recognizing foreign words, phrases, fonts, or scripts. The choose file button 1020 may be a button used to select a document or file for uploading and may show a directory path of the file. The reset button 1025 may be used to cancel and/or remove the current document or file that has been uploaded to the application 600. The upload button 1030 may be used to initiate the uploading process of the document after the document has been selected by the choose file button 1020. The upload button 1030 may also be used to validate the integrity of the file. The review button 1035 may be used to close the submit document window 1000 in order to show user the document as displayed in the document window 910. The close button 1040 may be used to close the submit document window 1000 and the help button 1045 may be used to open the help menu, which may provide the user with tutorials about the functionality of the submit document window 1000. Although FIG. 10 shows that a submit document window 1000 may be used to upload a document, the application 600 may lack a submit document window and may upload a document to the computer readable storage device by a different uploading mechanism.

Figure 11:
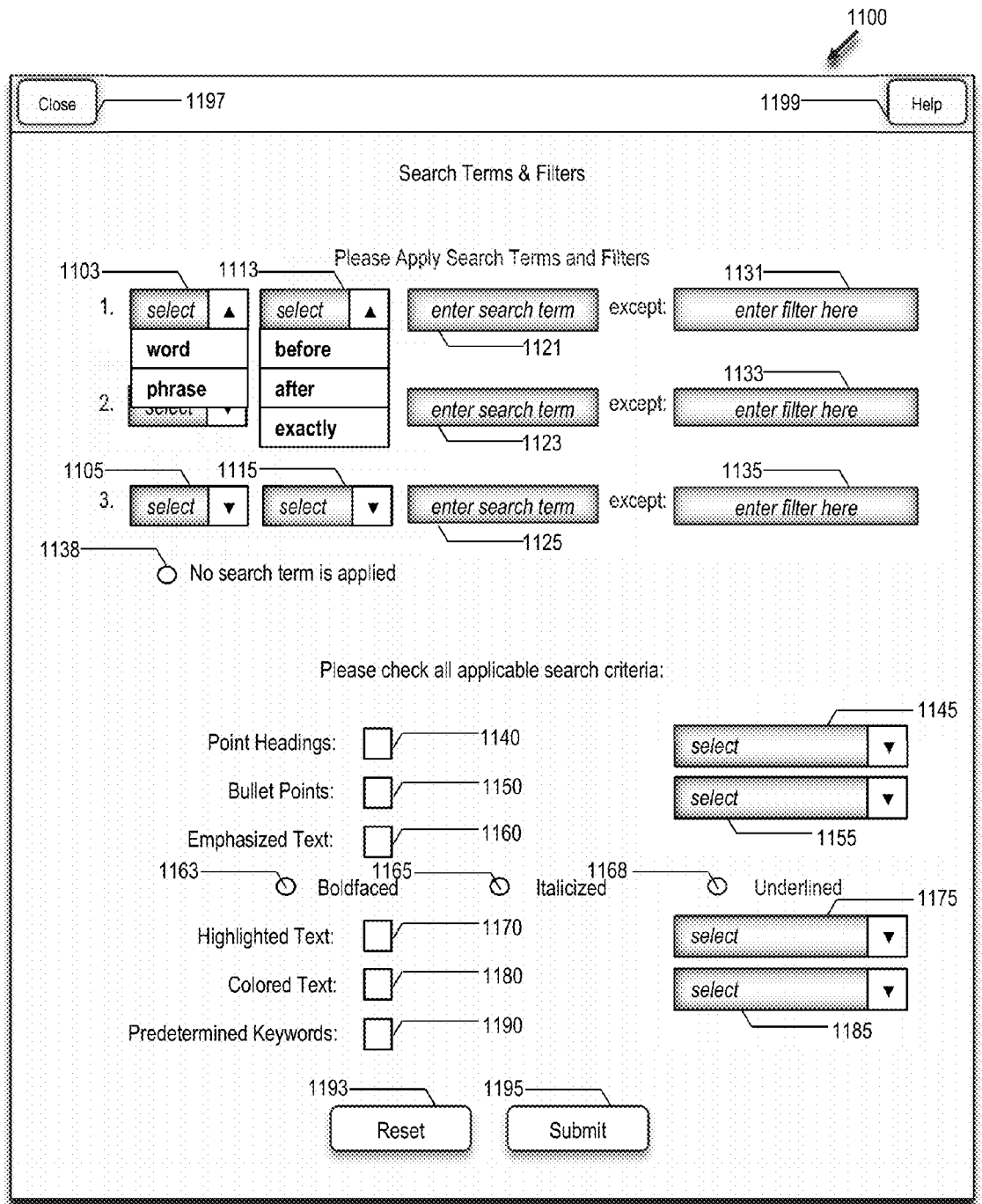
FIG. 11 is a screenshot of one embodiment of the automatic search window of the application.

FIG. 11 is a screenshot of one embodiment of the automatic search window of the application. As shown in FIG. 11, one embodiment of the automatic search window 1100 of the application 600 may comprise: one or more first input fields 1103, 1105; second input fields 1113, 1115; search term input fields 1121, 1123, 1125; search filters 1131, 1133, 1135; no search term option 1138; point headings search 1140; point headings level input field 1145; bullet point search 1150; bullet point level input field 1155; emphasized text search 1160; boldfaced selection 1163; italicized selection 1165; underlined selection 1168; highlighted text search 1170; highlighted text input field 1175; colored text search 1180; colored text input field 1185; predetermined keywords search 1190; reset button 1193; submit button 1195; close button 1197; and help button 1199. As discussed above, the automatic search window 1100 may allow the user to select one or more search criteria and/or one or more search terms for automatically selecting one or more keywords and replacing those keywords with test items. Examples of search criteria may comprise, without limitation, a point headings search 1140; bullet point search 1150; emphasized text search 1160; highlighted text search 1170; colored text search 1180; and predetermined keywords search 1190. A search term may be any one or more words, symbols, marks, images, or phrases inputted by a user to locate keywords in the textual information of a document. The method 100 may incorporate a search term function used to assist the user is searching for one or more particular keywords. The search term function may comprise: a first input field 1103, 1105; second input field 1113, 1115; search term input field 1121, 1123, 1125; and search filters 1131, 1133, 1135. The first input field 1103, 1105 may limit a keyword search in a document to either a single word or phrase (i.e., a plurality of words) for each corresponding search term. The second input fields 1113, 1115 may also limit the search for keyword(s) for a word or phrase that is exactly, before, and/or after the search term. The search term input field 1121, 1123, 1125 may be the input field where a user can input a search term, and the search filter 1131, 1133, 1135 may be configured to exclude one or more words or keywords in an automatic search when utilizing the search term function. The no search term option 1138 may be a selected to disable the search term feature in the application 600.

The point headings search 1140 may be one of the search criteria that allows the application 600 to automatically search for one or more words or keywords preceded by one or more alphanumeric bullets or alphanumeric characters. The point headings level input field 1145 may be an input field where the user may select the desired amount of point headings when the application 600 searches for point headings as keywords. The point headings level input field 1145 may be applied when the point headings search 1140 is selected and may be used to select a particular point heading level (e.g., first level of point headings, second level of point headings, third level of point headings, etc. . . . ). The bullet point search 1150 may be one of the search criteria that allows the application 600 to automatically search for one or more words preceded by one or more bullets. The bullet point level input field 1155 may be an input field where the user may select the desired amount of words when the application 600 searches for bullet points as keywords. Unlike the point headings search 1140, the bullet point search 1150 may not have the option for searching keywords in various levels that utilize tabs or indentations. The emphasized text search 1160 may be one of the search criteria that allows the application to automatically search for one or more keywords that are formatted with emphasized text (i.e., boldfaced, italicized, or underlined) and may be further limited by the boldfaced selection 1163 (i.e., text in boldface font), italicized selection 1165 (i.e., text in italics), and underlined selection 1168 (i.e., text that is underlined). The emphasized text search 1160 may also be applied to point headings and bullet points. The highlighted text search 1170 may be one of the search criteria that allows the application to automatically search for one or more words or keywords that are highlighted text in the document. The highlighted text input field 1175 may be an input field where the user may select the desired color of the highlighted portion, in which the application 600 searches for highlighted text as keywords. The colored text search 1180 may be one of the search criteria that allows the application 600 to automatically search for one or more words or keywords in a particular colored font within the document. The colored text input field 1185 may be an input field where the user may select the desired color of the font or text, in which the application 600 searches for colored text as keywords. The predetermined keywords search 1190 may be one of the search criteria that allows the application to automatically search for one or more preset words or keywords within the document—that is, those words or keywords that are considered relevant within a certain subject area. The reset button 1193 may be used to cancel the current settings of the automatic search window 1100. The submit button 1195 may be used to confirm the current settings of the automatic search window 1110. The close button 1197 may be used to close the automatic search window 1100 and the help button 1199 may be used to open the help menu, which may provide the user with tutorials or instructions about how a user may navigate through the automatic search window 1100. Although FIG. 11 shows that the automatic search window 1100 may have three search terms functions and six search criteria, the automatic search window 1100 may have any number of search terms and search criteria.

Figure 12:
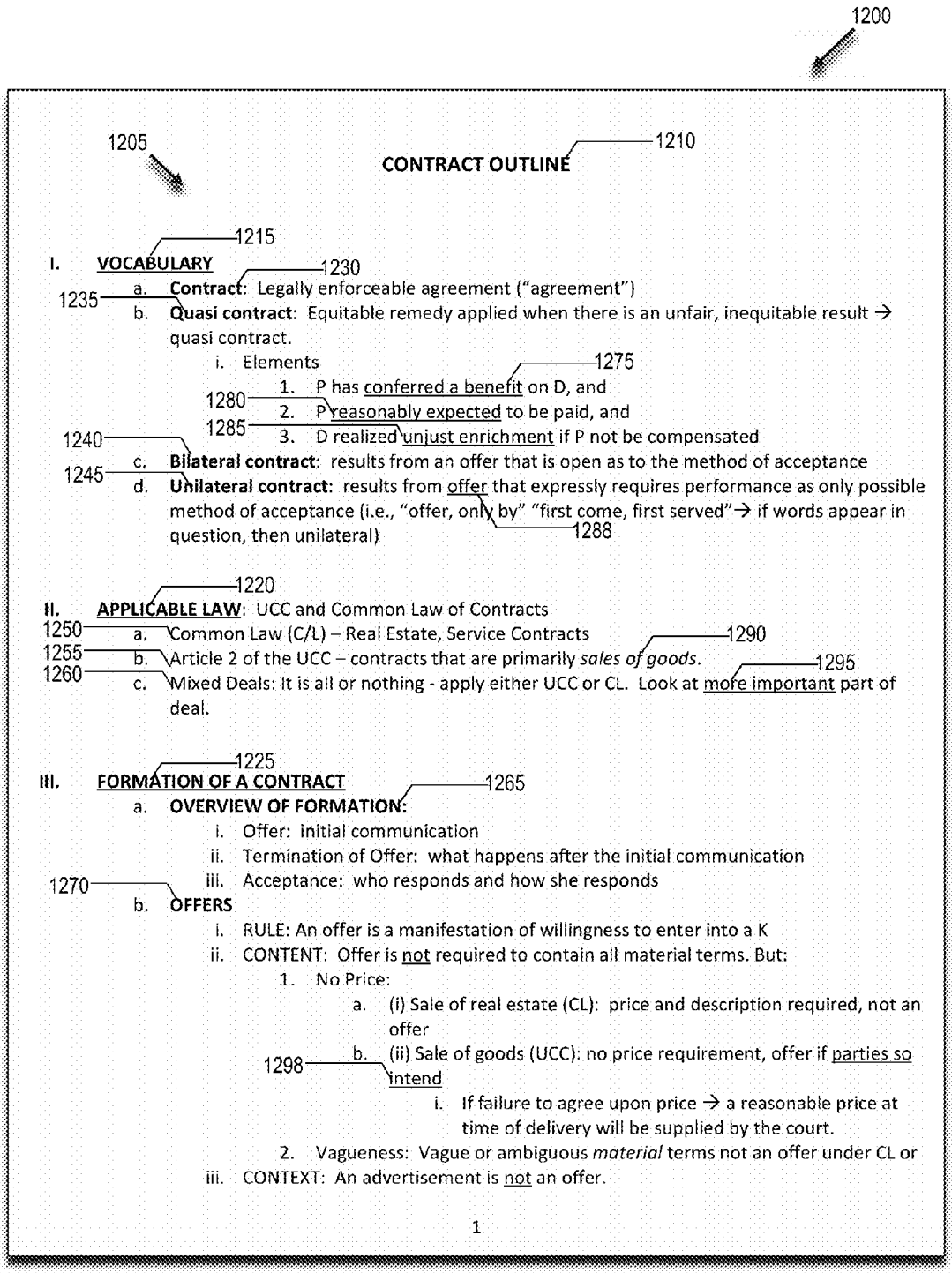
FIG. 12 is an illustration of one embodiment of a document.

FIG. 12 is an illustration of one embodiment of a document. As shown in FIG. 12, one embodiment of a document may comprise textual information 1205, which may be any information relating to written or printed text of a document. The textual information 1205 may further comprise: a title 1210; first level point headings 1215, 1220, 1225; second level point headings 1230, 1235, 1240, 1245, 1250, 1255, 1260, 1265, 1270; and emphasized text 1215, 1220, 1225, 1230, 1235, 1240, 1245, 1265, 1270, 1275, 1280, 1285, 1288, 1290, 1295, 1298. The title 1210 may be the name of the document 1200. The first level point headings 1215, 1220, 1225 may be a list or lists of main points following alphanumeric characters or alphanumeric bullets that distinguishes main points from supporting points. The first level point headings 1215, 1220, 1225 may have alphanumeric characters or alphanumeric bullets of the same type (e.g., roman numerals, capitalized letters, Arabic numerals, lowercase letters, numbers, etc. . . . ) and may be distinguished from second or third level point headings by indentation. Similarly, the second level point headings 1230, 1235, 1240, 1245, 1250, 1255, 1260, 1265, 1270 may be a list or lists of sub-points or supporting points following alphanumeric characters or alphanumeric bullets that distinguishes main points from supporting points. Like the first level point headings 1215, 1220, 1225, the second level point headings 1230, 1235, 1240, 1245, 1250, 1255, 1260, 1265, 1270 may have alphanumeric characters or alphanumeric bullets of the same type (e.g., roman numerals, capitalized letters, Arabic numerals, lowercase letters, numbers, etc. . . . ) and may be distinguished from first level or third level point headings by indentation. Both first level point headings 1215, 1220, 1225 and second level point headings 1230, 1235, 1240, 1245, 1250, 1255, 1260, 1265, 1270 may be point headings, and, although FIG. 12 references only the first level and second level point headings, it should be understood that a document may have any number of level of point headings such as a third, fourth, fifth, sixth, and seventh level. For example, as shown in FIG. 12, document 1200 may show six levels of point headings represented with alphanumeric characters or alphanumeric bullets as follows: first level point headings (Roman numeral), second level point headings (lowercase letter), third level point headings (lowercase Roman numeral), fourth level point headings (Arabic numeral), fifth level point headings (lowercase letters), and sixth level point headings (lowercase Roman numeral).

FIG. 12 also shows that the document 1200 may comprise emphasized text 1215, 1220, 1225, 1230, 1235, 1240, 1245, 1265, 1270, 1275, 1280, 1285, 1288, 1290, 1295, 1298. Specifically, the document 1200 may comprise of one or more boldfaced words, italicized words, and underlined words. The boldfaced words may be the emphasized text 1215, 1220, 1225, 1230, 1235, 1240, 1245, 1265, 1270. The italicized words may be emphasized text 1290. The underlined words may be emphasized text 1275, 1280, 1285, 1288, 1295, 1298.

Figure 13:
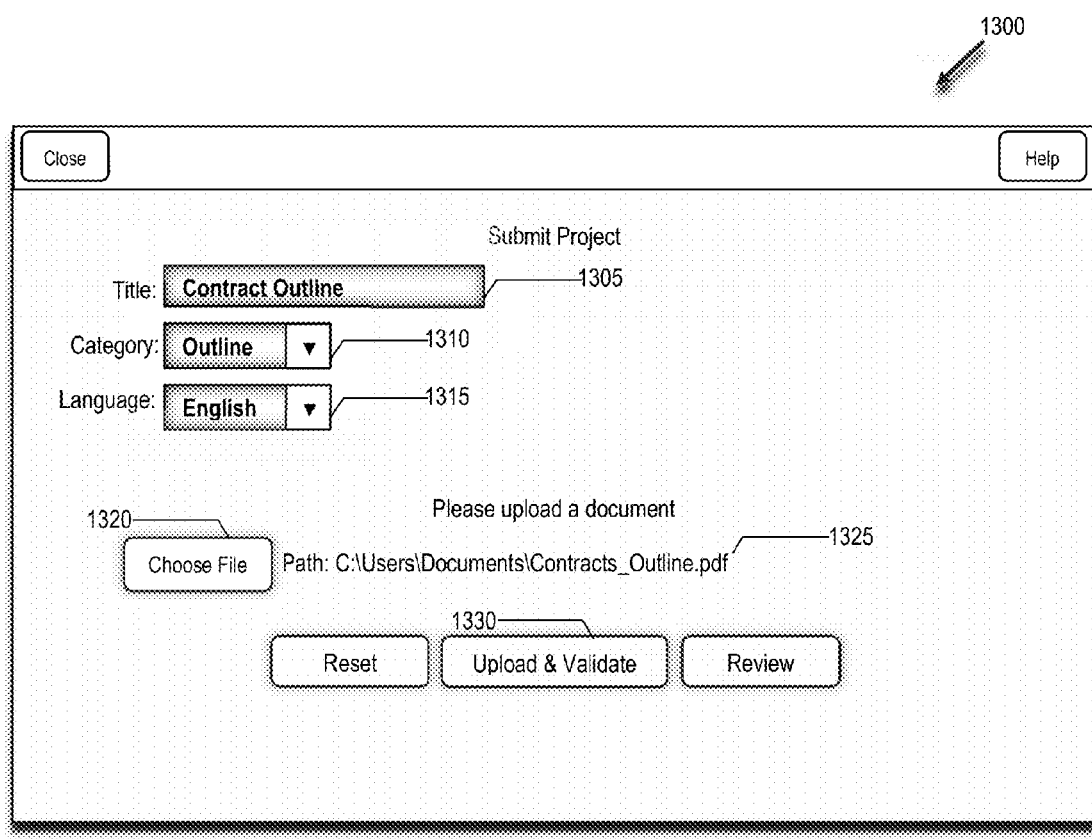
FIG. 13 is a screenshot of another embodiment of the submit document window of the application.

FIG. 13 is a screenshot of another embodiment of the submit document window of the application. As shown in FIG. 13, another embodiment of the submit document window 1300 may comprise: a title input field 1305, category input field 1310, language input field 1315, choose file button 1320, path 1325, and upload button 1330. As discussed above, the submit document window 1300 may appear when a user selects the upload document button 935 shown in FIG. 9 and may be used to upload a document into a computer readable storage device accessible by the application 600. In this embodiment, the user may upload the document 1200 shown in FIG. 12 to select one or more keywords of that document 1200 to be used as test items. The user may name the document or test template "Contract Outline" by inputting the title "Contract Outline" into title input field 1305. The user may categorize or classify some of the contents of the document 1200 as an outline by selecting "Outline" in the category input field 1310. The user may identify the primary language of the document 1200 as the English language by selecting "English" in the language input field 1315. The user may select the document 1200 as the document used for testing by selecting the choose file button 1320 and selecting the appropriate document in the computer-readable storage device 440, 545, which may be found in the computer system 400, 500. As a result of selecting the desired document, an appropriate file directory path 1325 may be shown, wherein the path 1325 may be a file directory and may specify a unique location in a file system of the computer system 400, 500. Once the appropriate document is selected, the user may select the upload button 1330 to upload the document 1200 for processing by the application 600. Although FIG. 13 shows that three input fields may be used when uploading a document, any number of input fields may be used.

Figure 14:
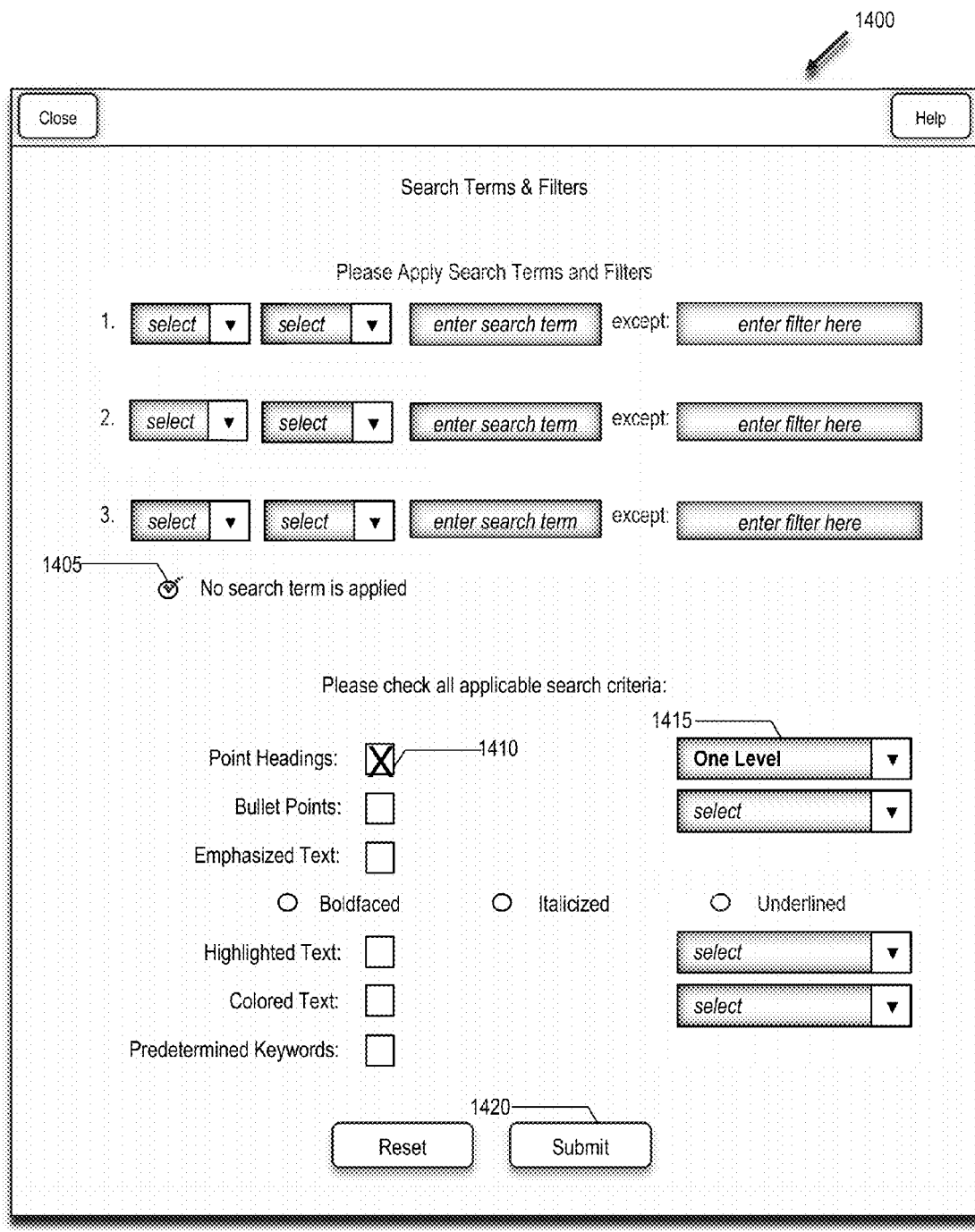
FIG. 14 is a screenshot of another embodiment of the automatic search window of the application and shows how a user may use a point headings search to automatically search for keywords in a document.

FIG. 14 is a screenshot of another embodiment of the automatic search window of the application and shows how a user may use a point headings search to automatically search for keywords in a document. As shown in FIG. 14, another embodiment of the automatic search window 1400 of the application 600 may comprise: a no search term option 1405, point headings search 1410, point headings level input field 1415, and submit button 1420. As discussed above, the no search term option 1405 may be a selectable feature where a user can disable the search term feature in the application 600. The point headings search 1410 may be one of the search criteria that allows the application 600 to automatically search for one or more words preceded by one or more alphanumeric bullets or alphanumeric characters. The point headings level input field 1415 may be an input field where the user may select the desired level of point headings when the application 600 searches for point headings as keywords. The point headings level input field 1415 may be applied when the point headings search 1410 is selected and may be used to select a particular point heading level (e.g., first level of point headings, second level of point headings, third level of point headings, etc. . . . ). Here, FIG. 14 shows that the user may select a point headings level input field 1415 of one level, which may cause the application 600 to automatically select the first level of point headings as the selected keywords in the document 1200. After the user selects the desired search criteria (e.g., point headings search 1410 with a single level of point headings), the user may confirm the settings by selecting the submit button 1420.

Figure 15:
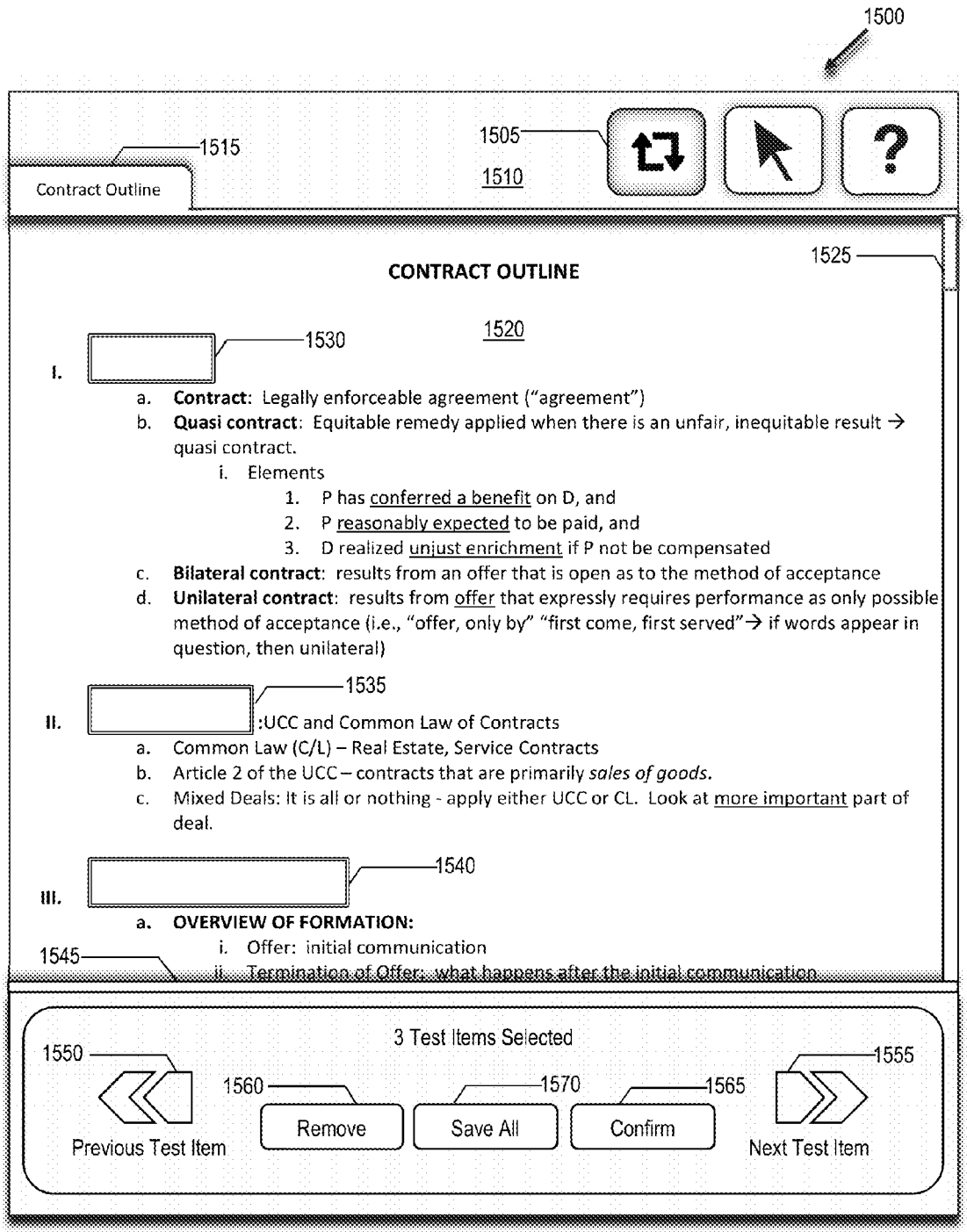
FIG. 15 is a screenshot of another embodiment of the graphical user interface of the application and shows how a user may confirm that the selected keywords are test items in a test template.

FIG. 15 is a screenshot of another embodiment of the graphical user interface of the application and shows how a user may confirm that the selected keywords are test items in a test template. As shown in FIG. 15, another embodiment of the graphical user interface 1500 of the application 600 may comprise: a menu bar 1510, a document window 1520, and a user input window 1545. FIG. 15 shows how a user may automatically confirm the selection of one or more keywords in the document 1200 shown in FIG. 12 based on the selected search criteria shown in FIG. 14. Specifically, the user may set the configuration setting as an automatic setting by selecting the automatic configuration button 1505 located in the menu bar 1510, which may open the automatic search window 1400. When setting the configuration setting to an automatic setting, and, after selecting one or more search criteria, the application 600 may select one or more keywords to be used as test items. For example, based on the selected search criteria shown in FIG. 14, the user may select the search criteria of a point headings search 1410 with a single level or first level of point headings. As a result of this selection, the application may replace the first level point headings 1215, 1220, 1225 shown in FIG. 12 with test items 1530, 1535, 1540 shown in the document window 1520. Additionally, a scrollbar 1525 may also be adjusted to show the available test items in the displayed page of the test template.

Regarding the user input window 1545, the application 600 may show how many test items have been selected and may prompt the user to remove or confirm the test items 1530, 1535, 1540. Specifically, the user may delete a test item by selecting the test item that he or she desires to remove and then selecting the remove button 1560. The user may also add a test item by selecting one or more words or keywords to be used as test items and then selecting the confirm button 1565. Furthermore, the user may navigate through the pre-selected test items 1530, 1535, 1540 by selecting the previous test item button 1550 or the next test item button 1555. Once the user is satisfied with the selected test items, the user may select the save all button 1570 to save his or her document as a test template for testing. Although FIG. 15 only shows three test items automatically selected, it should be understood that any number of test items may be selected.

Figure 16:
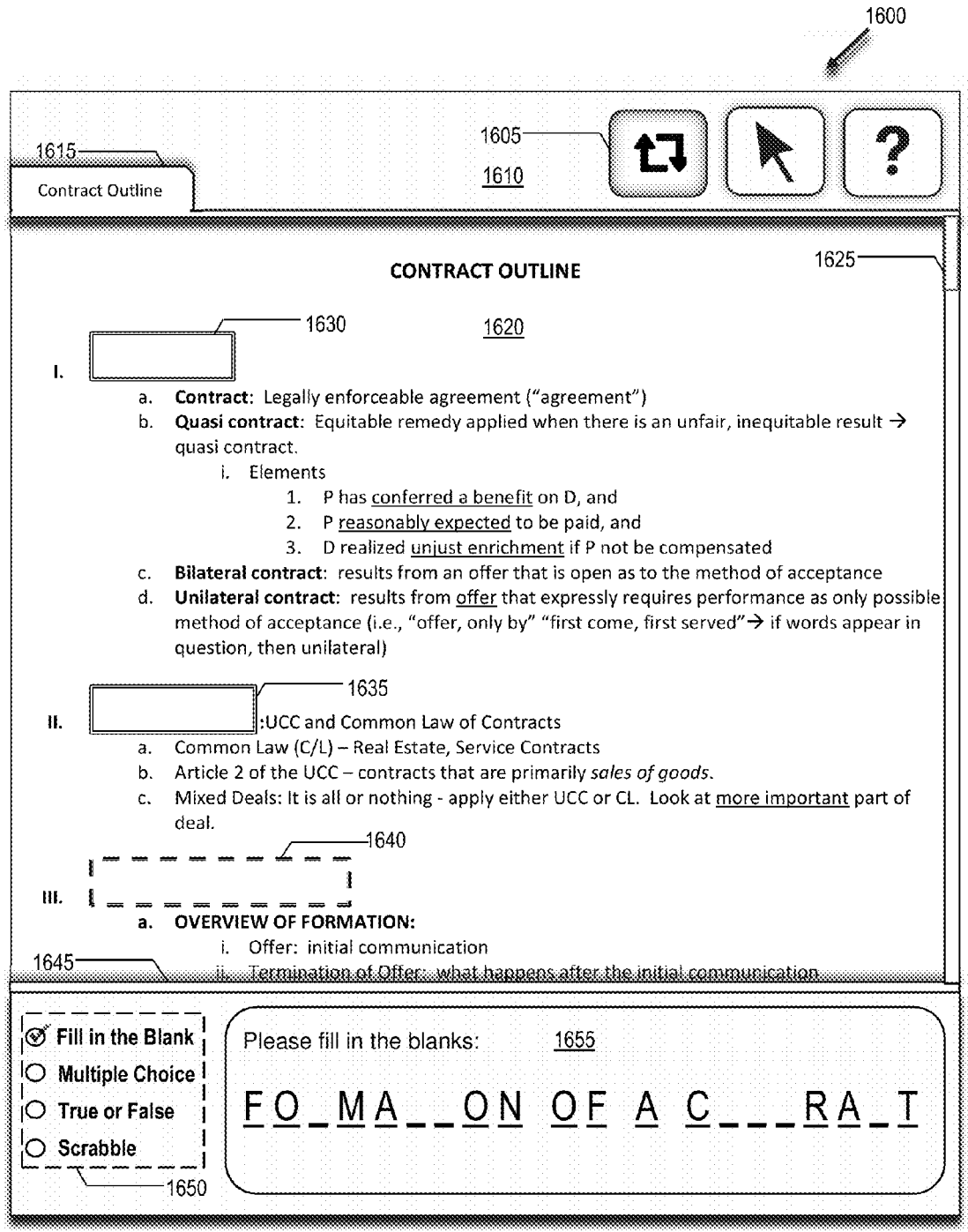
FIG. 16 is a screenshot of another embodiment of the graphical user interface of the application and shows the search results of a point headings search in an automatic configuration setting.

FIG. 16 is a screenshot of another embodiment of the graphical user interface of the application and shows the search results of a point headings search in an automatic configuration setting. As shown in FIG. 16, another embodiment of the graphical user interface 1600 of the application

600 may comprise: a menu bar 1610, a document window 1620, and a user input window 1645. When applying the parameters shown in FIG. 14 to the document 1200 shown in FIG. 12, the first level point headings 1215, 1220, 1225 shown in FIG. 12 may be replaced with test items 1630, 1635, 1640 shown in the document window 1620. The automatic configuration button 1605 shown in the menu bar 1610 may show that it is selected (e.g., depressed or highlighted) and the window tab 1615 of the document window 1620 may show the test template and its test items of the document 1200. The scrollbar 1625 may also be adjusted to the top to show the available test items in the first page of the test template.

Regarding the user input window 1645, the user may be presented with one or more different formats of test questions 1650, and the user may select a fill-in-the-blank question as the selected format for test item 1640, as shown in FIG. 16. As a result, the test question 1655 may be a fill-in-the-blank question, and the user may be prompted to answer that question. Specifically, as shown in FIG. 16, the selected keywords or phrase may be "FORMATION OF A CONTRACT", and the user may be able to answer the test question correctly for test item 1640 by entering those words/letters verbatim into the spaces located in the user input window 1645. Although FIG. 16 shows that the test question 1655 has certain spaces filled with letters (e.g., "F", "O", "M", "A", "O", "N", "O", "F", "A", "C", R", "A", "T"), the test question 1655 may have no letters.

FIG. 17 is an illustration of one embodiment of a document with bullet points. As shown in FIG. 17, one embodiment of a document 1700 with bullet points may comprise: a plurality of bullets 1705 and a bullet point 1710, 1715, 1720, 1725, 1730, 1735, 1740, 1745, 1750, 1755, 1760, 1765, 1770, 1775, 1780, 1785 for each corresponding bullet. As discussed above, a bullet point 1710, 1715, 1720, 1725, 1730, 1735, 1740, 1745, 1750, 1755, 1760, 1765, 1770, 1775, 1780, 1785 may be any number of items printed in a list, each after a bullet or centered dot, and may be the significant points in a longer piece of text. Each bullet point 1710, 1715, 1720, 1725, 1730, 1735, 1740, 1745, 1750, 1755, 1760, 1765, 1770, 1775, 1780, 1785 may be the ideas or arguments in an article or presentation and may be typically printed with a bullet before each for emphasis. A bullet point 1710, 1715, 1720, 1725, 1730, 1735, 1740, 1745, 1750, 1755, 1760, 1765, 1770, 1775, 1780, 1785, as shown in FIG. 17, may also be a list of vocabulary words with corresponding definitions. Although FIG. 17 shows a centered dot as a bullet, it should be understood that a bullet may be any type of symbol such as a square, arrow, triangle or letter.

Figure 18:
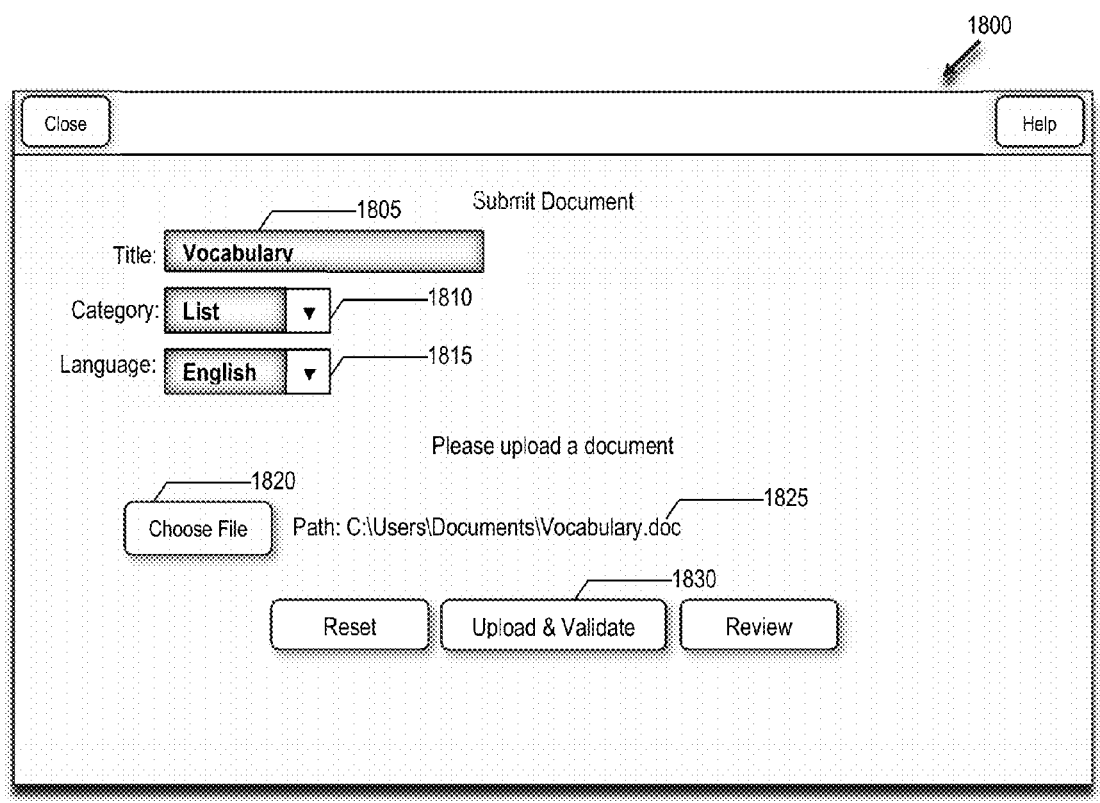
FIG. 18 is a screenshot of another embodiment of a submit document window of the application.

FIG. 18 is a screenshot of another embodiment of a submit document window of the application. As shown in FIG. 18, another embodiment of the submit document window 1800 may comprise: a title input field 1805, category input field 1810, language input field 1815, choose file button 1820, path 1825; and upload button 1830. As discussed above, the submit document window 1800 may appear when a user selects the upload document button 935 shown in FIG. 9 and may be used to upload a document into a computer readable storage device accessible by the application 600. In this embodiment, the user may upload the document 1700 shown in FIG. 17 to select one or more bullet points to be used as test items. The user may name the document "Vocabulary" by entering the title "Vocabulary" into title input field 1805. The user may categorize or classify some of the contents of the document 1700 as a list by selecting "List" in the category input field 1810. The user may also identify the primary language of the document 1700 as the English language by selecting "English" in the language input field 1815. The user may then select the document 1700 as the document used for testing by selecting the choose file button 1820 and selecting the appropriate document in the computer-readable storage device 440, 545, which may be found in the computer system 400, 500. As a result of selecting the desired document, an appropriate path 1825 may be shown, wherein the path 1825 may be the general form of the name of a file or directory and may specify a unique location in a file system. Once the appropriate document is selected, the user may select the upload button 1830 to upload the document 1700 for processing by the application 600. Although FIG. 18 shows that three input fields may be used when uploading a document, any number of input fields may be used without deviating from the scope of this disclosure.

Figure 19:
FIG. 19 is a screenshot of another embodiment of the automatic search window of the application and shows how a user may use a bullet point search to automatically search for keywords in a document.

FIG. 19 is a screenshot of another embodiment of the automatic search window of the application and shows how a user may use a bullet point search to automatically search for keywords in a document. As shown in FIG. 19, another embodiment of the automatic search window 1900 of the application 600 may comprise: a no search term option 1905, bullet point search 1910, bullet point level input field 1915, and submit button 1920. As discussed above, the no search term option 1905 may be a selected to disable the search term feature of the application 600. The bullet point search 1910 may be one of the search criteria that allows the application to automatically search for one or more words or keywords preceded by one or more bullets. The bullet point level input field 1915 may be an input field where the user may select the desired amount of words when the application 600 searches for bullet points as keywords. Unlike the point headings search 1140, 1410, the bullet point search 1910 may not have the option in searching for keywords with varying point heading levels that may include indentations. After the user selects the desired search criteria (e.g., bullet point search 1910 for single words 1915), the user may confirm the settings by selecting the submit button 1920.

Figure 20:
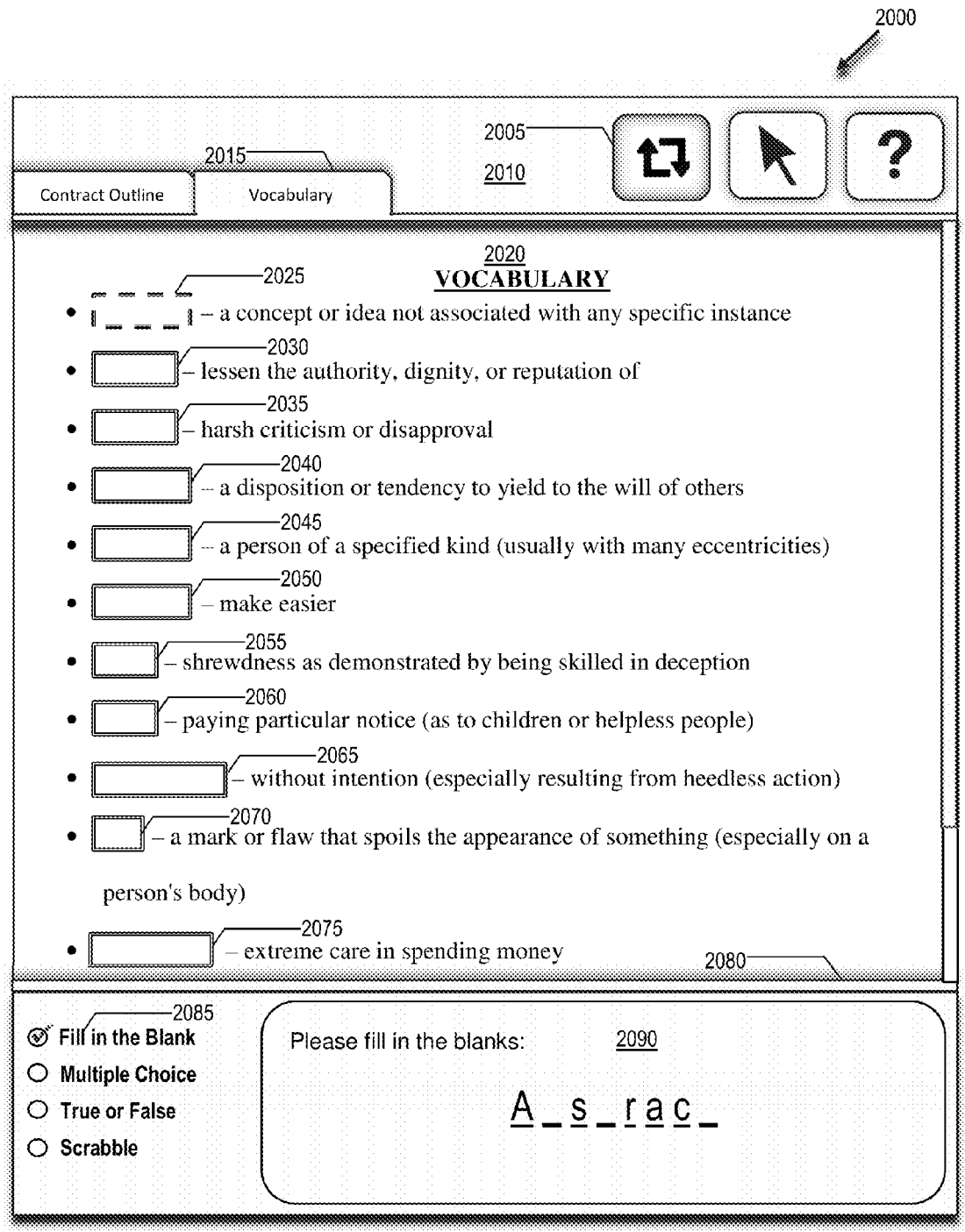
FIG. 20 is a screenshot of another embodiment of the graphical user interface of the application and shows the search results of a bullet point search in an automatic configuration setting.

FIG. 20 is a screenshot of another embodiment of the graphical user interface of the application and shows the search results of a bullet point search in an automatic configuration setting. As shown in FIG. 20, another embodiment of the graphical user interface 2000 of the application 600 may comprise: a menu bar 2010, a document window 2020, and a user input window 2080. When applying the parameters shown in FIG. 19 to the document 1700 shown in FIG. 17, each bullet point 1710, 1715, 1720, 1725, 1730, 1735, 1740, 1745, 1750, 1755, 1760, 1765, 1770, 1775, 1780, 1785 shown in FIG. 17 may be replaced with test items 2025, 2030, 2035, 2040, 2045, 2050, 2055, 2060, 2065, 2070, 2075 shown in the document window 2020. The automatic configuration button 2005 shown in the menu bar 2010 may show that it is selected (e.g., depressed or highlighted) and the window tab 2015 of the document window 2020 may show the test template and its test items 2025, 2030, 2035, 2040, 2045, 2050, 2055, 2060, 2065, 2070, 2075 of the document 1700.

Regarding the user input window 2080, the user may select a fill-in-the-blank test question 2085 as the selected format for the test item 2025. As a result, the test question 2090 may be a fill-in-the-blank question. Specifically, as shown in FIG. 20, the selected word or keyword may be "Abstract" and the user may be able to answer the test question correctly for test item 2025 by entering those words/letters verbatim into the user input window 2080.

Figure 21:
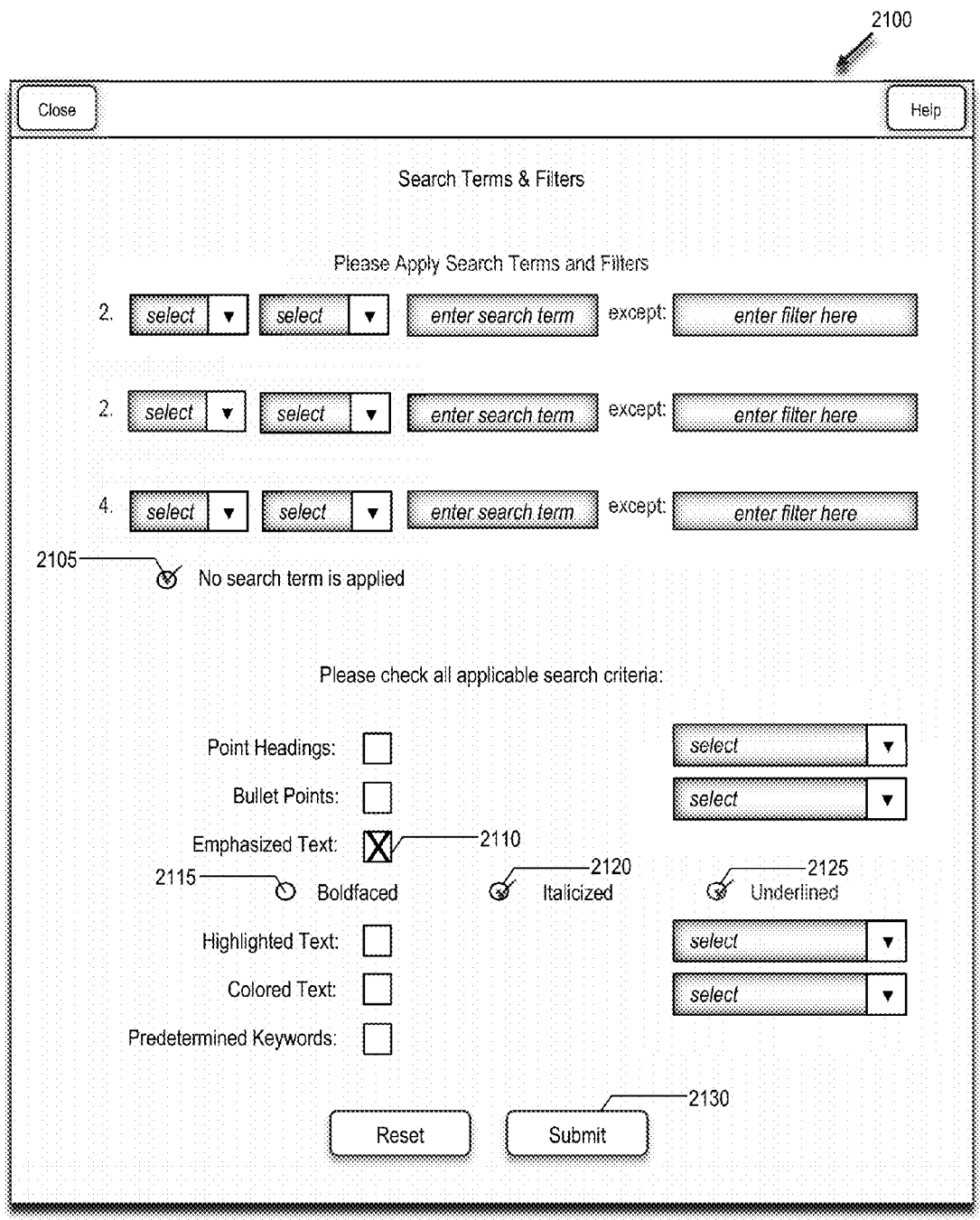
FIG. 21 is a screenshot of another embodiment of the automatic search window of the application and shows how a user may use an emphasized text search to automatically search for keywords in a document.

FIG. 21 is a screenshot of another embodiment of the automatic search window of the application and shows how a user may use an emphasized text search to automatically search for keywords in a document. As shown in FIG. 21, another embodiment of the automatic search window 2100 of the application 600 may comprise: a no search term option 2105, emphasized text search 2110, boldfaced selection 2115, italicized selection 2120, underlined selection 2125, and submit button 2130. As discussed above, the no search term option 2105 may be selected to disable the search term feature of the application 600. The emphasized text search 2110 may be a search criteria that allows the application to automatically search for one or more words or keywords that are formatted with emphasized text (i.e., boldfaced, italicized, or underlined) and may be further filtered by the boldfaced selection 2115, italicized selection 2120, and underlined selection 2125. The emphasized text search 2110 may also be applied to textual information when the words are point headings. FIG. 21 also shows that the user may select an emphasized text search 2110 for words or keywords that are italicized or underlined. After the user selects the desired search criteria (e.g., italicized and underlined, as shown in FIG. 21), the user may confirm the settings by selecting the submit button 2130.

FIG. 22 is a screenshot of another embodiment of the graphical user interface of the application and shows the search results of an emphasized text search in an automatic configuration setting. As shown in FIG. 22, another embodiment of the graphical user interface 2200 of the application 600 may comprise: a menu bar 2210, a document window 2220, and a user input window 2255. When applying the parameters shown in FIG. 21 to the document 1200 shown in FIG. 12, any emphasized words or text that are italicized or underlined may be selected as the keywords for testing and may be replaced by test items 2225, 2230, 2235, 2240, 2245, 2250. The automatic configuration button 2205 shown in the menu bar 2210 may show that it is selected (e.g., depressed or highlighted) and the window tab 2215 of the document window 2220 may show the test template and corresponding test items 2225, 2230, 2235, 2240, 2245, 2250 of the document 1200, shown in FIG. 12.

Regarding the user input window 2255, the user may select a multiple choice question 2260 as the desired format for test item 2245 and, as a result, the test question 2265 may be a multiple choice question. Specifically, as shown in FIG. 22, the selected keywords or phrase may be "Sales of Goods" and the user may be able to answer the test question 2265 correctly for test item 2245 by selecting answer choice "a" in user input window 2255 as the correct answer.

FIG. 23 is an illustration of one embodiment of a document with highlighted text and colored text. As shown in FIG. 23, one embodiment of a document 2300 with highlighted text and colored text may comprise: highlighted text 2305, 2310 and a colored text 2315. Highlighted text 2305, 2310 may be any type of text in a document that is surrounded with a highlighted color or displayed in such a way that the text is distinct from the remaining text of the document 2300. The highlighted text 2305, 2310 may also be an area or a spot in a document 2300 that is strongly illuminated. Colored text 2315 may be any type of text in a document 2300 that is marked with a different color or displayed in such a way that the characters are distinct from the remaining characters of the document 2300. Like the highlighted text 2305, 2310, colored text 2315 may be any text in a document that is strongly illuminated when compared to the rest of the text in the document. Although FIG. 23 shows only two lines of highlighted text and one line of colored text, any number of lines of text may be highlighted or colored.

Figure 24:
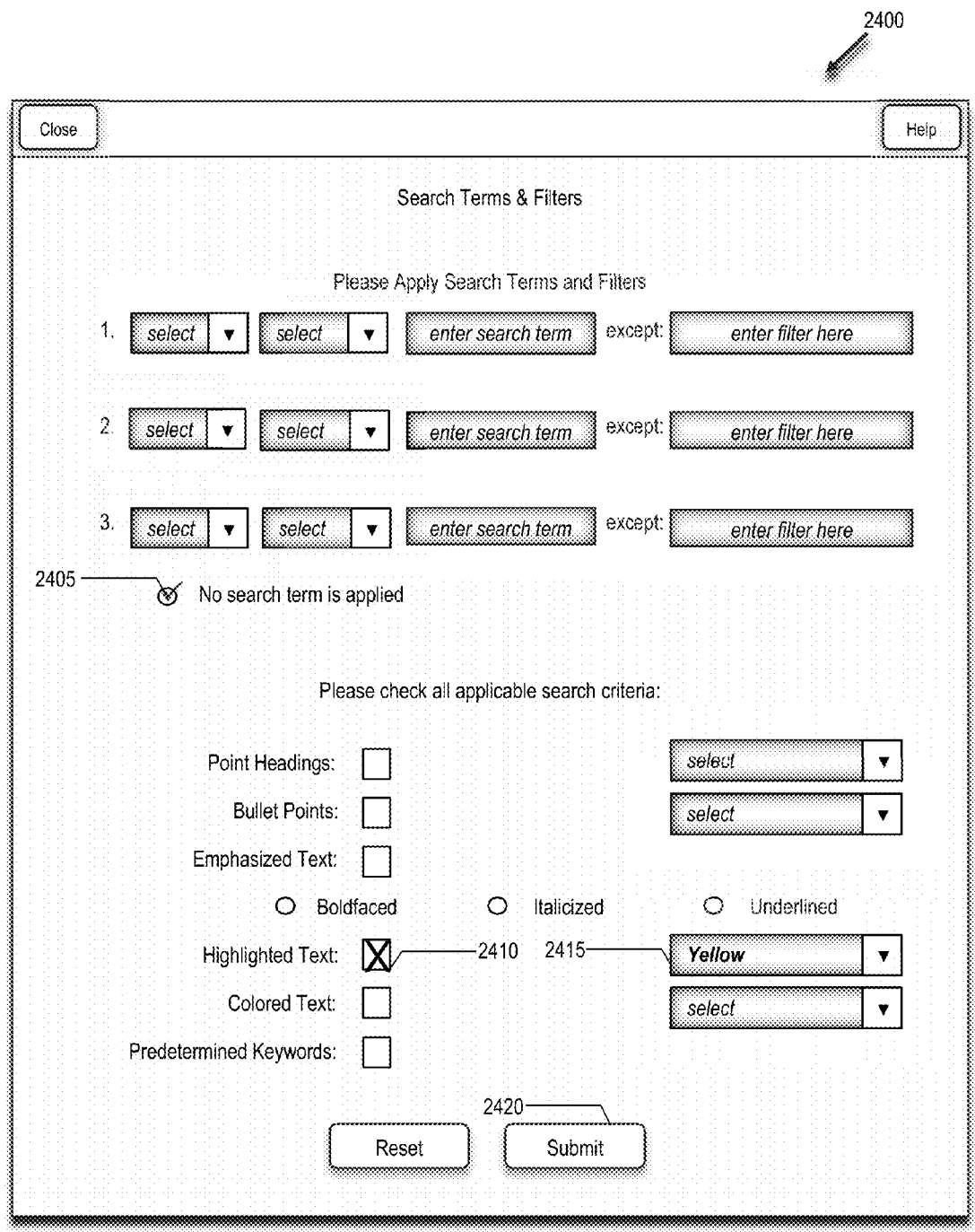
FIG. 24 is a screenshot of another embodiment of the automatic search window of the application and shows how a user may use a highlighted text search to automatically search for keywords in a document.

FIG. 24 is a screenshot of another embodiment of the automatic search window of the application and shows how a user may use a highlighted text search to automatically search for keywords in a document. As shown in FIG. 24, another embodiment of the automatic search window 2400 of the application 600 may comprise: a no search term option 2405, highlighted text search 2410, highlighted text input field 2415, and submit button 2420. As discussed above, the no search term option 2405 may be a selected to disable the search term feature in the application 600. The highlighted text search 2410 may be one of the search criteria that allows the application to automatically search for one or more words that are highlighted text in the document. The highlighted text input field 2415 may be an input field where the user may select the desired color of the highlighted portion when the application 600 searches for highlighted text as keywords. After the user selects the desired search criteria (e.g., highlighted text search 2410 for yellow text as selected in the highlighted text input field 2415 shown in FIG. 24), the user may confirm the settings by selecting the submit button 2420. Although FIG. 24 shows the highlighted text input field to be a scroll down menu, the highlighted text input field may also be a colored palette used to select a desired highlighted color, similar to the text highlight color palette feature in Microsoft Word®.

Figure 25:
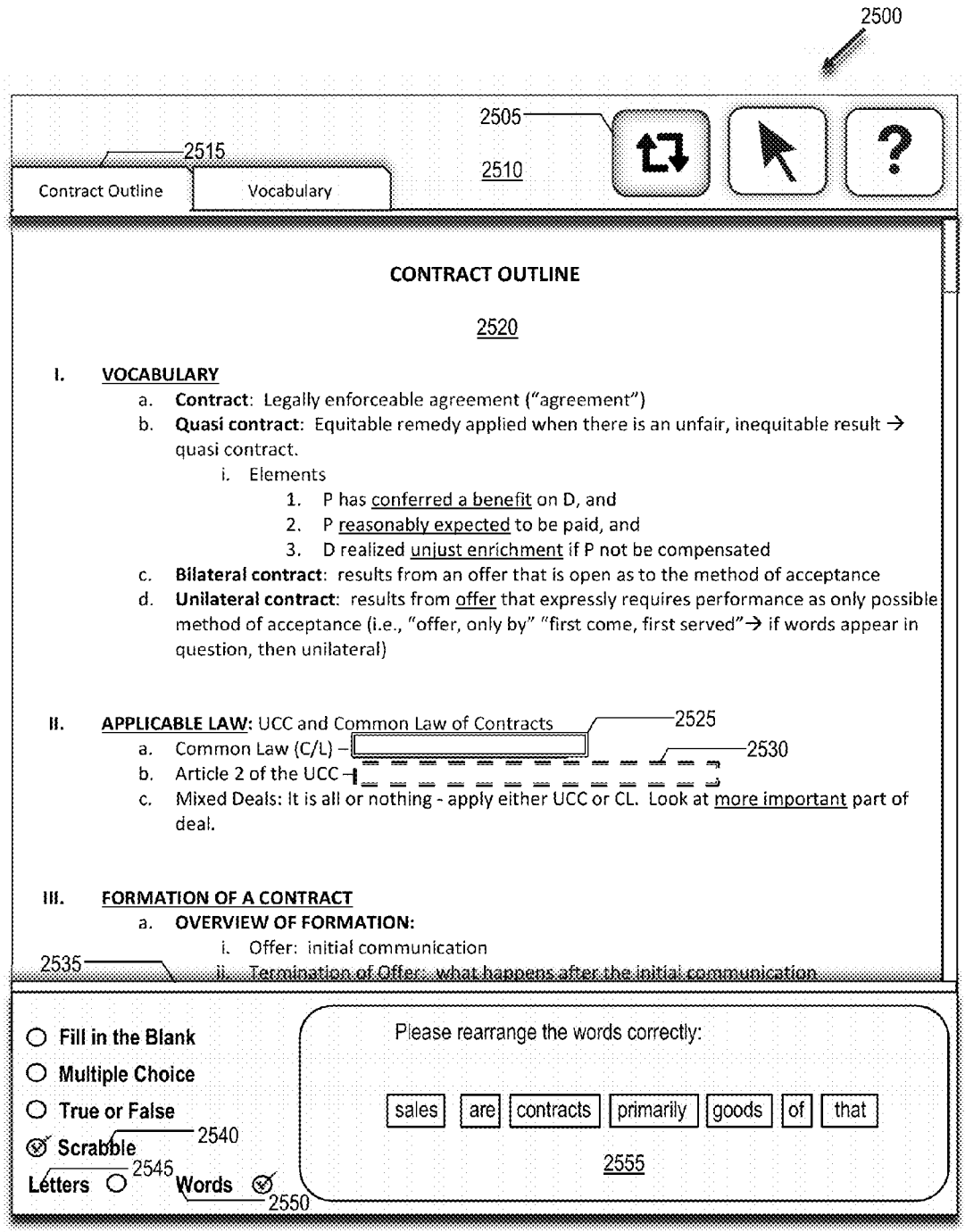
FIG. 25 is a screenshot of another embodiment of the graphical user interface of the application and shows the search results of a highlighted text search in an automatic configuration setting.

FIG. 25 is a screenshot of another embodiment of the graphical user interface of the application and shows the search results of a highlighted text search in an automatic configuration setting. As shown in FIG. 25, another embodiment of the graphical user interface 2500 of the application 600 may comprise: a menu bar 2510, document window 2520, and user input window 2535. When applying the parameters shown in FIG. 24 to the document 2300 shown in FIG. 23, any terms highlighted in the document may be replaced as test items 2525, 2530. The automatic configuration button 2505 shown in the menu bar 2510 may show that it is selected (e.g., depressed or highlighted) and the window tab 2515 of the document window 2520 may show the test template and its corresponding test items 2525, 2530 of the document 2300.

Regarding the user input window 2535, the user may select a Scrabble®-like question 2540 as the desired format for the test item 2530 and, as a result, test question 2555 may be a Scrabble®-like question 2540. Additionally, each Scrabble®-like question 2540 may have the option for the user to select a Letter Scrabble® 2545 or Word Scrabble® 2550. Here, in the embodiment shown in FIG. 25, the selected keywords, for example, may be "sales", "are", "contracts", "primarily", "goods", "of", and "that", and the user may be able to answer this test question 2555 correctly for test item 2530 by rearranging the words to state the phrase "contracts that are primarily sales of goods" into the user input window 2535 as the correct answer.

Figure 26:
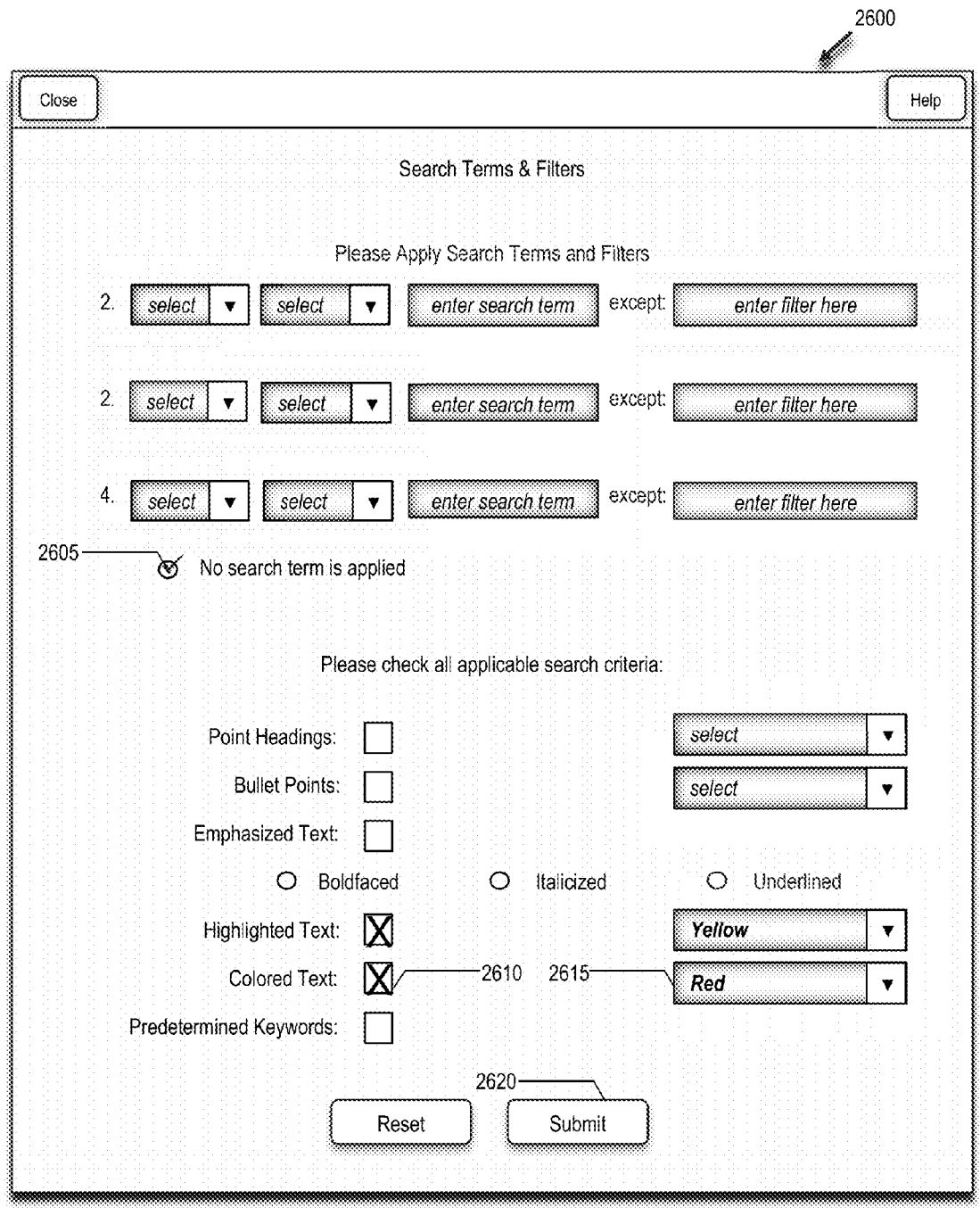
FIG. 26 is a screenshot of another embodiment of the automatic search window of the application and shows how a user may use a highlighted text search and colored text search to automatically search for keywords in a document.

FIG. 26 is a screenshot of another embodiment of the automatic search window of the application and shows how a user may use a highlighted text search and colored text search to automatically search for keywords in a document. As shown in FIG. 26, another embodiment of the automatic search window 2600 of the application 600 may comprise: a no search term option 2605, colored text search 2610, colored text input field 2615, and submit button 2620. As discussed above, the no search term option 2605 may be selected to disable the search term feature in the application 600. The colored text search 2610 may be one of the search criteria that allows the application to automatically search for one or more words or keywords with a particular colored font in the document. The colored text input field 2615 may be an input field where the user may select the desired color of the font or text when the application 600 searches for colored text as keywords. After the user selects the desired search criteria (e.g., colored text search 2610 with red font as selected in the colored text input field 2615 shown in FIG. 26), the user may confirm the settings by selecting the submit button 2620. Although FIG. 26 shows the colored text input field 2615 to be a scroll down menu, the colored text input field may also be a colored palette used to select a desired font color, similar to the font color feature in Microsoft Word®.

Figure 27:
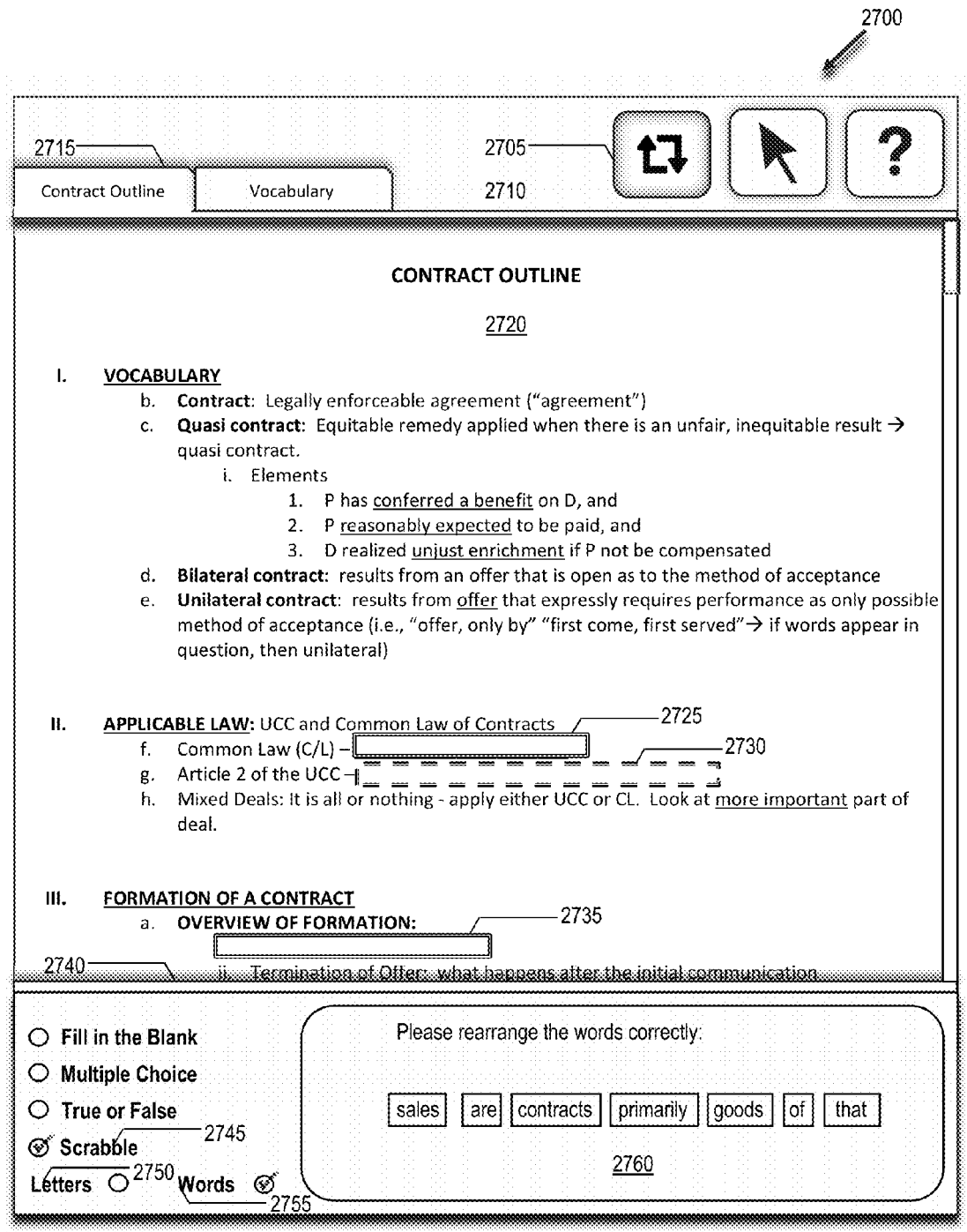
FIG. 27 is a screenshot of another embodiment of the graphical user interface of the application and shows the search results of a highlighted text search and colored text search in an automatic configuration setting.

FIG. 27 is a screenshot of another embodiment of the graphical user interface of the application and shows the search results of a highlighted text search and colored text search in an automatic configuration setting. As shown in FIG. 27, another embodiment of the graphical user interface 2700 of the application 600 may comprise: a menu bar 2710, document window 2720, and user input window 2740. In addition to the highlighted text that was selected in FIG. 25, when applying the parameters shown in FIG. 26 to the document 2300 shown in FIG. 23, any terms with a particular colored font in the document 2300 may also be replaced as a test item 2735. The automatic configuration button 2705 shown in the menu bar 2710 may show that it is selected (e.g., depressed or highlighted) and the window tab 2715 of the document window 2720 may show the test template and corresponding test items 2725, 2730, 2735 of document 2300.

Regarding the user input window 2740, the user may select a Scrabble®-like question 2745 as the desired format for the test item 2730 and, as a result, the test question 2760 may be a Scrabble®-like question 2745. Additionally, as discussed above, each Scrabble®-like question 2745 may have the option for the user to select a Letter Scrabble® 2750 or Word Scrabble® 2755. Here, as shown in FIG. 27, the selected keywords, for example, may be "sales", "are", "contracts", "primarily", "goods", "of", and "that", and the user may be able to answer this test question 2760 correctly for test item 2730 by rearranging the words to state the phrase "contracts that are primarily sales of goods" into the user input window 2740 as the correct answer.

FIG. 28 is a screenshot of another embodiment of the automatic search window of the application and shows how a user may use a search term to automatically search for keywords positioned after the search term in a document. As shown in FIG. 28, another embodiment of the automatic search window 2800 of the application 600 may comprise: a first input field 2805, second input field 2810, search term input field 2815, and no search term option 2820. As discussed above, the first input field 2805 may be configured to limit a keyword search in a document to either a single word or phrase for each corresponding search term. The second input field 2810 may be configured to limit the search for keywords for those words that are exactly, before, and/or after the search term. The search term input field 2815 may be the input field where a user can enter a search term when searching for keywords in a document, and the no search term option 2820 may be a selected to disable the search term feature.

FIG. 28 also shows how a user may search for phrase that is after a search term. Here, in this embodiment, based on document 1200 uploaded into the application 600 and shown in FIG. 12, the user may automatically search for keywords after a search term in the document 1200. Specifically, by way of example, the user may select a phrase by selecting the "phrase" option in the in the first input field 2805. The user may also search for one or more keywords after the search term by selecting the term "after" in the second input field 2810. Furthermore, the user may search for keywords located after the search term "Rule:" by typing or entering the term "Rule:" in the search term input field 2815. Finally, the user may choose not to select the no search term option 2820 in order to proceed with an automatic search using a search term. Although FIG. 28 shows only three input fields for each corresponding search term, any number of input fields may be used in an automatic search using a search term.

FIG. 29 is a screenshot of another embodiment of the graphical user interface of the application and shows the search results of an automatic search that uses a search term in an automatic configuration setting. As shown in FIG. 29, another embodiment of the graphical user interface 2900 of the application 600 may comprise: a menu bar 2910, a document window 2920, and a user input window 2935. When applying the search term and corresponding parameters shown in FIG. 28 to the document 1200 shown in FIG. 12, the words or phrase following the search term "Rule:" may be selected as the keywords and may be replaced by test item 2930. The automatic configuration button 2905 shown in the menu bar 2910 may show that it is selected (e.g., depressed or highlighted) and the window tab 2915 of the document window 2920 may show the test template and corresponding test item 2930 of the document 1200. The scrollbar 2925 may also be adjusted to visibly show the test item 2930 located at the lower portion of the first page of the test template.

Regarding the user input window 2935, the user may select a fill-in-the-blank question 2940 as the selected test question format for test item 2930 and, as a result, the test question 2945 may be a fill-in-the-blank question. Specifically, in the embodiment shown in FIG. 29, the selected keywords or phrase may be "An offer is a manifestation of willingness to enter into a K" and the user may be able to answer the test question correctly for test item 2930 by entering those words/letters verbatim into the user input window 2935.

FIG. 30 is a screenshot of another embodiment of the automatic search window of the application and shows how a user may use a search term to automatically search for keywords positioned before the search term in a document. As shown in FIG. 30, another embodiment of the automatic search window 3000 of the application 600 may comprise: a first input field 3005, second input field 3010, search term input field 3015, and no search term option 3020. Here, in this embodiment and in addition to the search term parameters inputted in FIG. 28 for the document 1200 shown in FIG. 12, the user may automatically search for keywords positioned before a search term in the document 1200. Specifically, by way of example, the user may select a phrase for searching by selecting the "phrase" option in the in the first input field 3005. The user may also search for one or more keywords before the search term by selecting the term "before" in the second input field 3010. Furthermore, the user may search for keywords before the hyphen or dash punctuation mark by typing or entering the hyphen/dash punctuation mark or term "-" into the search term input field 3015. Finally, the user may choose not to select the no search term option 3020 in order to proceed with an automatic search using a search term. Although FIG. 30 shows only two search terms being applied, it should be understood that any number of search terms may be used.

FIG. 31 is a screenshot of another embodiment of the graphical user interface of the application and shows the search results of an automatic search that uses a search term in an automatic configuration setting. As shown in FIG. 31, another embodiment of the graphical user interface 3100 of the application 600 may comprise: a menu bar 3110, a document window 3120, and a user input window 3140. In addition to the selected keywords, shown in FIG. 29, when applying the search term and corresponding parameters shown in FIG. 30 to document 1200, any phrases before the search term "-" or hyphen/dash punctuation marks may be selected as the keywords for testing and may be replaced by test items 3125, 3130, 3135. The automatic configuration button 3105 shown in the menu bar 3110 may show that it is selected (e.g., depressed or highlighted) and the window tab 3115 of the document window 3120 may show the test template and corresponding test items 3125, 3130, 3135 of the document 1200.

Regarding the user input window 3140, the user may select a multiple choice question 3145 as the desired test question format for the test item 3125 and, as a result, the test question 3150 may be a multiple choice question. Specifically, in the embodiment shown in FIG. 31, the selected keywords or phrase may be "Common Law (C/L)" and the user may be able to answer the test question correctly for test item 3125 by selecting answer choice "c" in the user input window 3140 as the correct answer choice.

Figure 32:
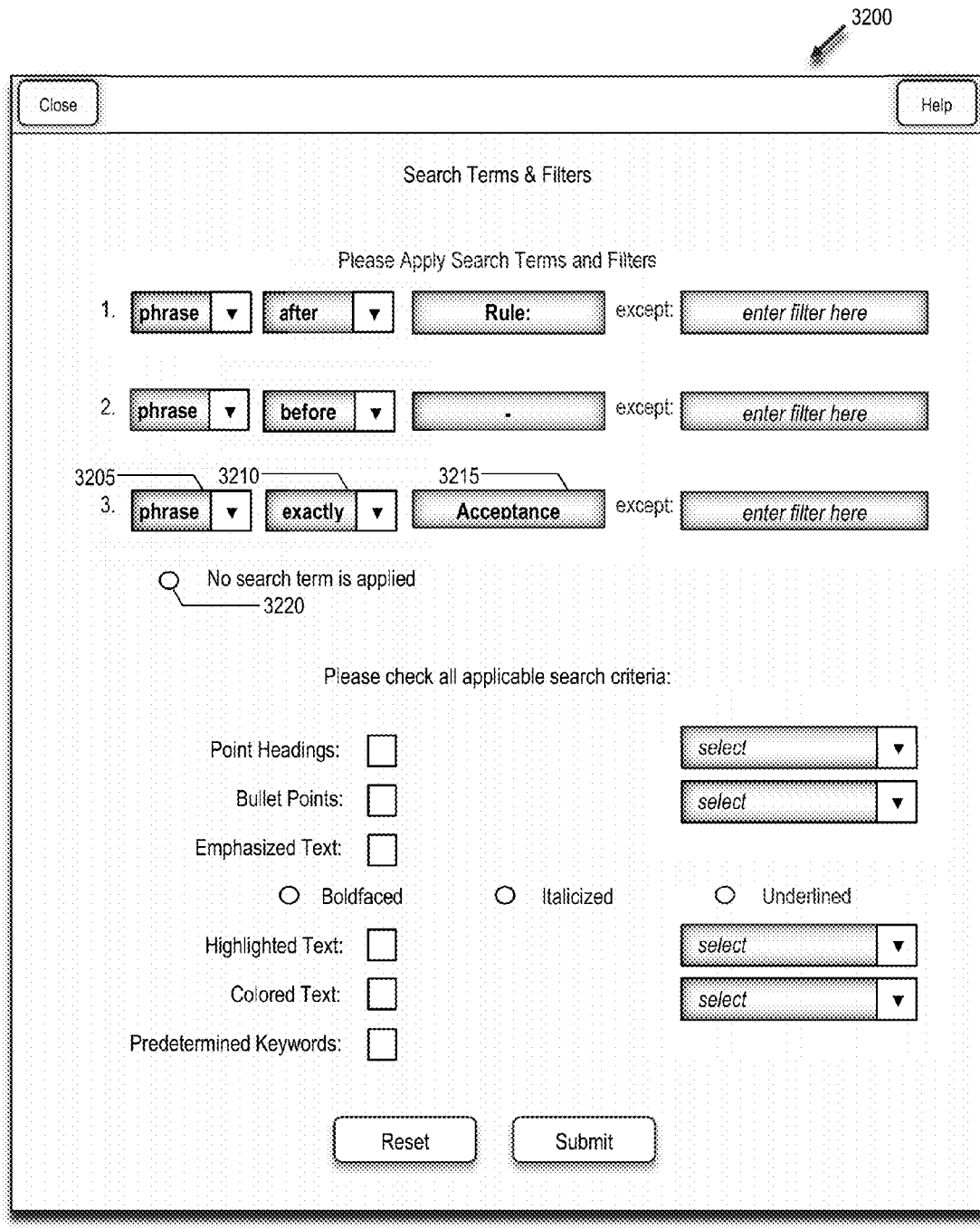
FIG. 32 is a screenshot of another embodiment of the automatic search window of the application and shows how a user may automatically search for keywords using a search term in a document.

FIG. 32 is a screenshot of another embodiment of the automatic search window of the application and shows how a user may automatically search for keywords using a search term in a document. As shown in FIG. 32, another embodiment of the automatic search window 3200 of the application 600 may comprise: a first input field 3205, second input field 3210, search term input field 3215, and no search term option 3220. Here, in this embodiment and in addition to the search term parameters entered in FIG. 30 for the document 1200 shown in FIG. 12, the user may automatically search for keywords using a search term in the document 1200. Specifically, by way of example, the user may automatically select a single word or keyword for the search term itself by selecting the "word" option in the in the first input field 3205. The user may also search for the word exactly as entered in the search term input field 3215 by selecting the term "exactly" in the second input field 3210. Furthermore, the user may search for certain keywords identical to the word "Acceptance" by typing or entering the word "Acceptance" into the search term input field 3215. Finally, the user may choose not to select the no search term option 3220 in order to proceed with an automatic search using a search term. Although FIG. 32 shows only three search terms being applied, any number of search terms may be used.

FIG. 33 is a screenshot of another embodiment of the graphical user interface of the application and shows the search results of an automatic search that uses a search term in an automatic configuration setting. As shown in FIG. 33, another embodiment of the graphical user interface 3300 of the application 600 may comprise: a menu bar 3310, a document window 3320, and a user input window 3335. In addition to the selected keywords, shown in FIG. 31, when applying the search term and corresponding parameters shown in FIG. 32 to the document 1200 shown in FIG. 12, any word spelled as "Acceptance" may be selected as the keyword(s) for testing and may be replaced by a test item 3330. The automatic configuration button 3305 shown in the menu bar 3310 may show that it is selected (e.g., depressed or highlighted) and the window tab 3315 of the document window 3320 may show the test template and corresponding test items of the document 1200. The scrollbar 3325 may also be adjusted to visibly show test item 3330 located at the lower portion of the first page of the test template.

Regarding the user input window 3335, the user may select a true or false question 3340 as the desired format for the test item 3330 and, as a result, the test question 3345 may be a true or false question. Specifically, as shown in FIG. 33, the selected keyword may be "Acceptance" and the user may be able to answer the test question correctly for test item 3330 by selecting answer choice "True" in the user input window 3335 as the correct answer choice.

FIG. 34 is a screenshot of another embodiment of the automatic search window of the application and shows how a user may use a search term and search filter to automatically search for keywords in a document. As shown in FIG. 34, another embodiment of the automatic search window 3400 of the application 600 may comprise a search filter 3405. Here, in this embodiment and in addition to the search term parameters entered in FIGS. 28, 30, and 32 for the document 1200 shown in FIG. 12, the user may incorporate a search filter 3405 when automatically searching for keywords using one or more search terms in the document 1200. Specifically, after selecting the options and/or search terms for the first input field 2805, 3005, 3205, second input field 2810, 3010, 3210, and search term input field 2815, 3015, 3215, the user may include a search filter 3405, which may exclude one or more words in an automatic search when using a search term. For example, the user may enter the term "Mixed Deals" to filter or exclude the words "Mixed Deals" from the test items. Although FIG. 34 shows only one search filter being applied, any number of search filters may be used.

Figure 35:
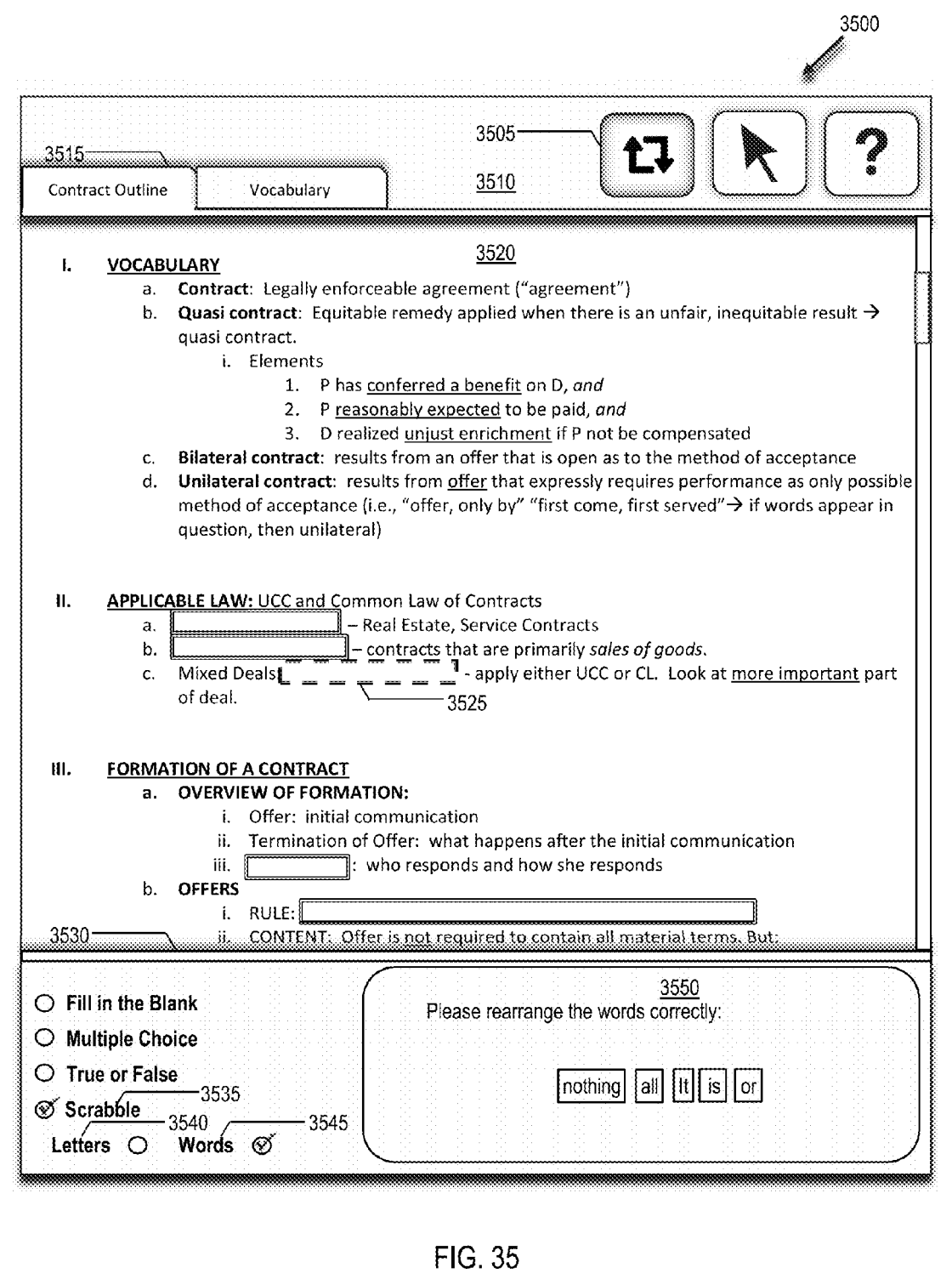

FIG. 35 is a screenshot of another embodiment of the graphical user interface of the application and shows the search results of an automatic search that uses a search term and search filter in an automatic configuration setting. As shown in FIG. 35, another embodiment of the graphical user interface 3500 of the application 600 may comprise: a menu bar 3510, document window 3520, and user input window 3530. In addition to the selected keywords, shown in FIG. 31 and FIG. 33, when applying the search term and corresponding parameters shown in FIG. 34 to the document 1200, any terms spelled as "Mixed Deals" may be remove from any words preceding hyphen or dash marks of the search term "-" and may not be used as a test item 3525. The automatic configuration button 3505 shown in the menu bar 3510 may show that it is selected (e.g., depressed or highlighted) and the window tab 3515 of the document window 3520 may show the test template and corresponding test items of the document 1200.

Regarding the user input window 3530, the user may select a Scrabble®-like question 3535 as the desired format for the test item 3525 and, as a result, the test question 3550 may be a Scrabble®-like question 3535. Additionally, as discussed above, each Scrabble®-like question 3535 may have the option for the user to select a Letter Scrabble® 3540 or Word Scrabble® 3545. Here, in the embodiment shown in FIG. 35, the selected keywords, for example, may be "nothing", "all", "it", "is", and "or", and the user may be able to answer this test question correctly for the test item 3525 by rearranging the words to state the phrase "it is all or nothing" into the user input window 3530 as the correct answer.

Figure 36:
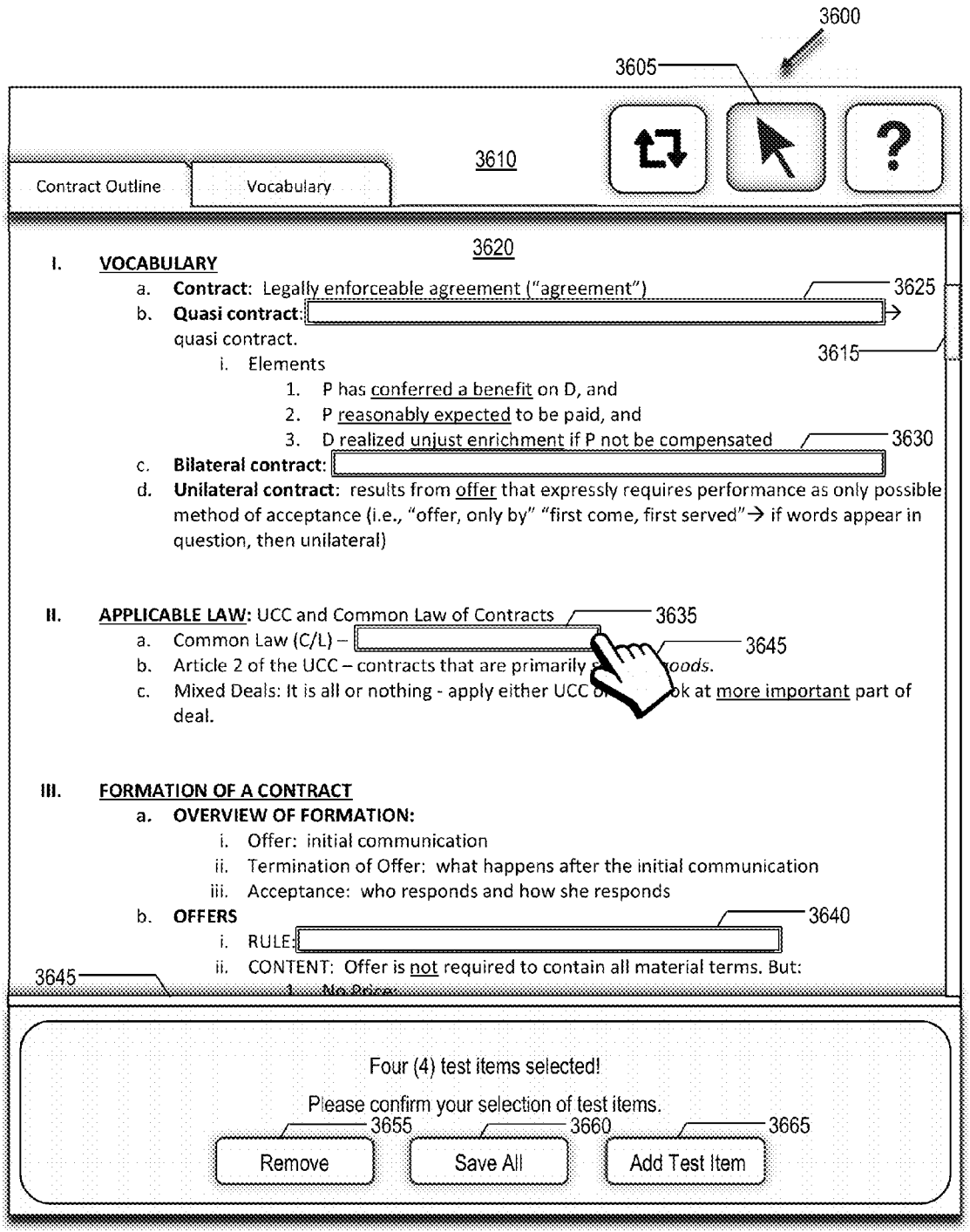
FIG. 36 is a screenshot of another embodiment of the graphical user interface of the application and shows how a user may manually select keywords in a document.

FIG. 36 is a screenshot of another embodiment of the graphical user interface of the application and shows how a user may manually select keywords in a document. As shown in FIG. 36, another embodiment of the graphical user interface 3600 of the application 600 may comprise: a menu bar 3610, a document window 3620, and a user input window 3645. FIG. 36 shows how a user may manually select one or more keywords in the document 1200 shown in FIG. 12. The user may set the configuration setting as a manual setting by selecting the manual configuration button 3605 located in the menu bar 3610, and, when setting the configuration setting to a manual setting, the user may manually select the keyword(s) to be replaced as test items by using a pointing device 3645 such as a mouse pointer or cursor and/or the finger of the hand of the user for a touchscreen devices. For example, as shown in FIG. 36, the user may select the keywords: (1) "Equitable remedy applied when there is an unfair, inequitable result" as the first test item 3625; (2) "results from an offer that is open as to the method of acceptance" as the second test item 3630;

(3) "Real Estate, Service Contracts" as the third test item 3635; and (4) "An offer is a manifestation of willingness to enter into a K" as the fourth test item 3640. The scrollbar 3615 may also be adjusted to allow the user to select additional keywords at various areas of the document 1200.

Regarding the user input window 3645, the application 600 may show how many test items have been selected and may prompt the user to add or delete more test items. Specifically, the user may delete a test item by selecting the test item that he or she desires to remove and then may select the remove button 3655 to remove that particular test item. The user may also add a test item by selecting one or more keywords to be used test items and then selecting the add test item button 3665 to add that particular test item. Once the user is satisfied with the selected test items, the user may select the save all button 3660 to save his or her document as a test template for testing. Although FIG. 36 only shows four test items manually selected, any number of test items may be manually selected.

Figure 37:
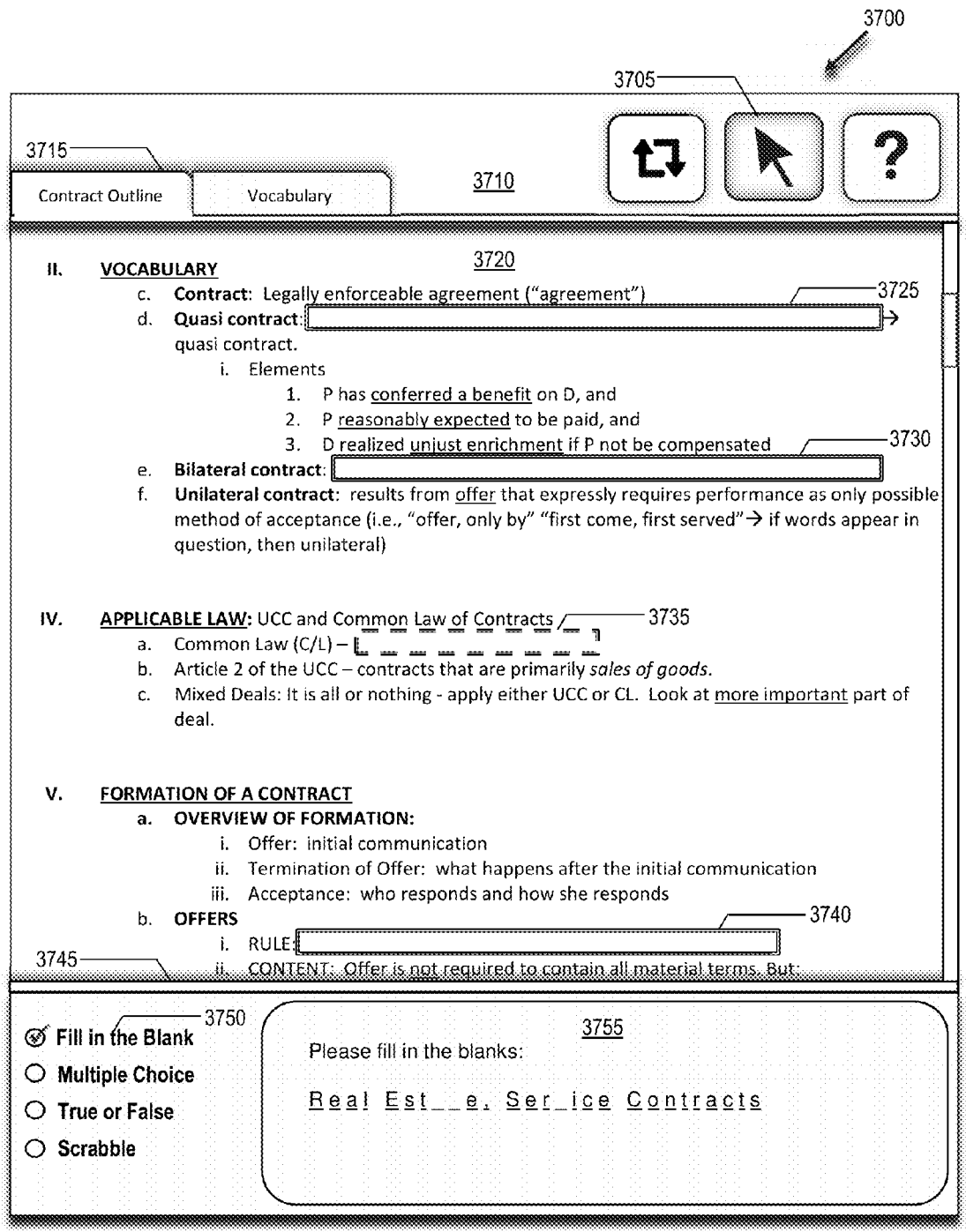
FIG. 37 is a screenshot of another embodiment of the graphical user interface of the application and shows the search results of a manual search by the user in a manual configuration setting.

FIG. 37 is a screenshot of another embodiment of the graphical user interface of the application and shows the search results of a manual search by the user in a manual configuration setting. As shown in FIG. 37, another embodiment of the graphical user interface 3700 of the application 600 may comprise: a menu bar 3710, document window 3720, and user input window 3745. After the user manually selects the keywords shown in FIG. 36 to the document 1200, the user may select replace those keywords as test items 3725, 3730, 3735, 3740. The manual configuration button 3705 shown in the menu bar 3710 may show that it is selected (e.g., depressed or highlighted) and the window tab 3715 of the document window 3720 may show the test template and corresponding test items of the document 1200.

Regarding the user input window 3745, the user may select a fill-in-the-blank question 3750 as the desired test question format for test item 3735 and, as a result, the test question 3755 may be a fill-in-the-blank question. Specifically, as shown in FIG. 37, the selected keywords may be "Real Estate, Service Contracts" and the user may be able to answer the test question correctly for test item 3735 by correctly inputting "Real Estate, Service Contracts" verbatim as the correct answer in response to the test question 3755 located in the user input window 3745.

FIG. 38 is an illustration of another embodiment of a document. As shown in FIG. 38, another embodiment of the document 3800 may comprise: point headings 3805, 3810; charts 3815, 3820; and formulas 3825. As discussed above, the point headings 3805, 3810 may refer to one or more lists of bullet points and/or alphanumeric characters divided into headings and subheadings that distinguish main points from supporting points. The charts 3815, 3820 may refer to a group of information in the form of a table, graph, or diagram. The formulas 3825 may refer to one or more mathematical relationships or rules expressed in symbols.

Figure 39:
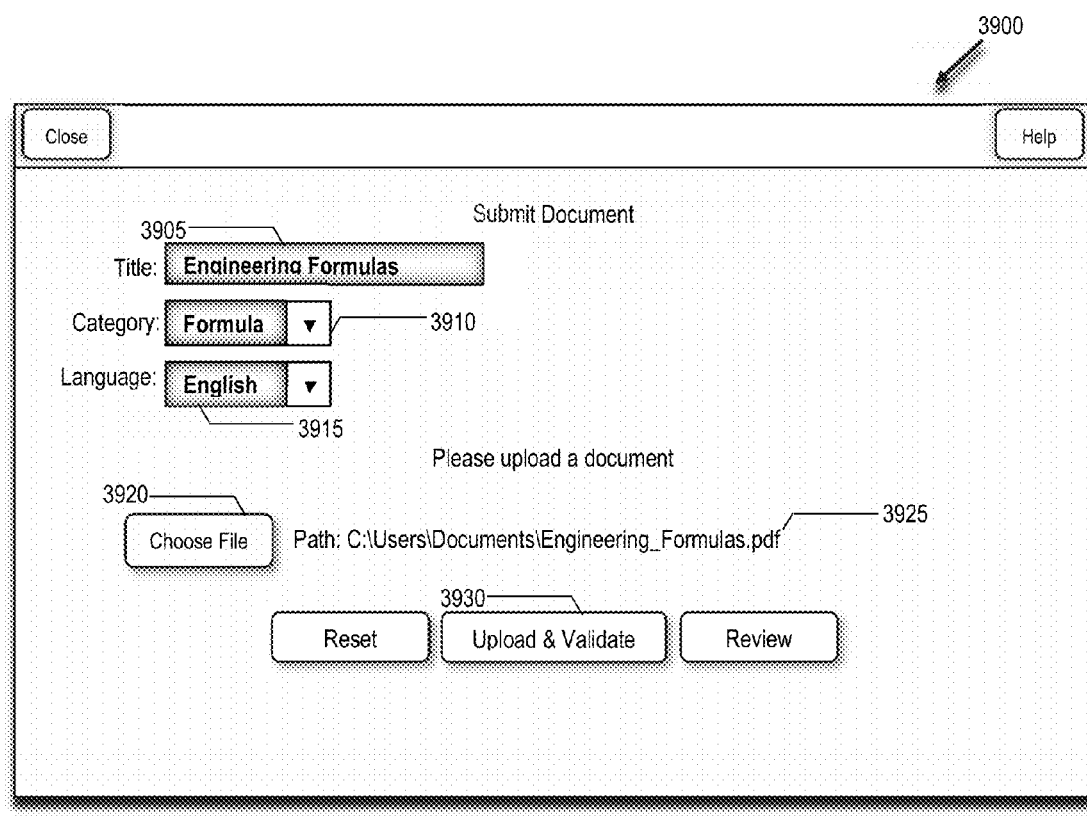
FIG. 39 is a screenshot of another embodiment of a submit document window of the application.

FIG. 39 is a screenshot of another embodiment of a submit document window of the application. As shown in FIG. 39, another embodiment of the submit document window 3900 may comprise: a title input field 3905, category input field 3910, language input field 3915, choose file button 3920, path 3925, and upload button 3930. As discussed above, the submit document window 3900 may appear when a user selects the upload document button 935, shown in FIG. 9 and may be used to upload a document into a computer readable storage device 440, 545 accessible by the application 600. In this embodiment, the user may upload the document 3800 shown in FIG. 38 to select formulas 3825 to be used as test items. The user may name the document or test template "Engineering Formulas" by entering the title "Engineering Formulas" into title input field 3905. The user may categorize or classify some of the contents of the document 3800 formulas by selecting "Formula" in the category input field 3910. The user may identify the primary language of the document 3800 as the English language by selecting "English" in the language input field 3915. The user may select the document 3800 as the document used for testing by selecting the choose file button 3920 and selecting the appropriate document in the computer-readable storage device 440, 545, which may be found in the computer system 400, 500. As a result of selecting the desired document, an appropriate path 3925 may be shown, wherein the path 3925 may be the general form of a file directory and may specify a unique location of a file in the computer system 400, 500. Once the appropriate document is selected, the user may select the upload button 3930 to upload the document 3800 for processing by the application 600. Although FIG. 39 shows that three input fields may be used when uploading a document, any number of input fields may be used.

Figure 40:
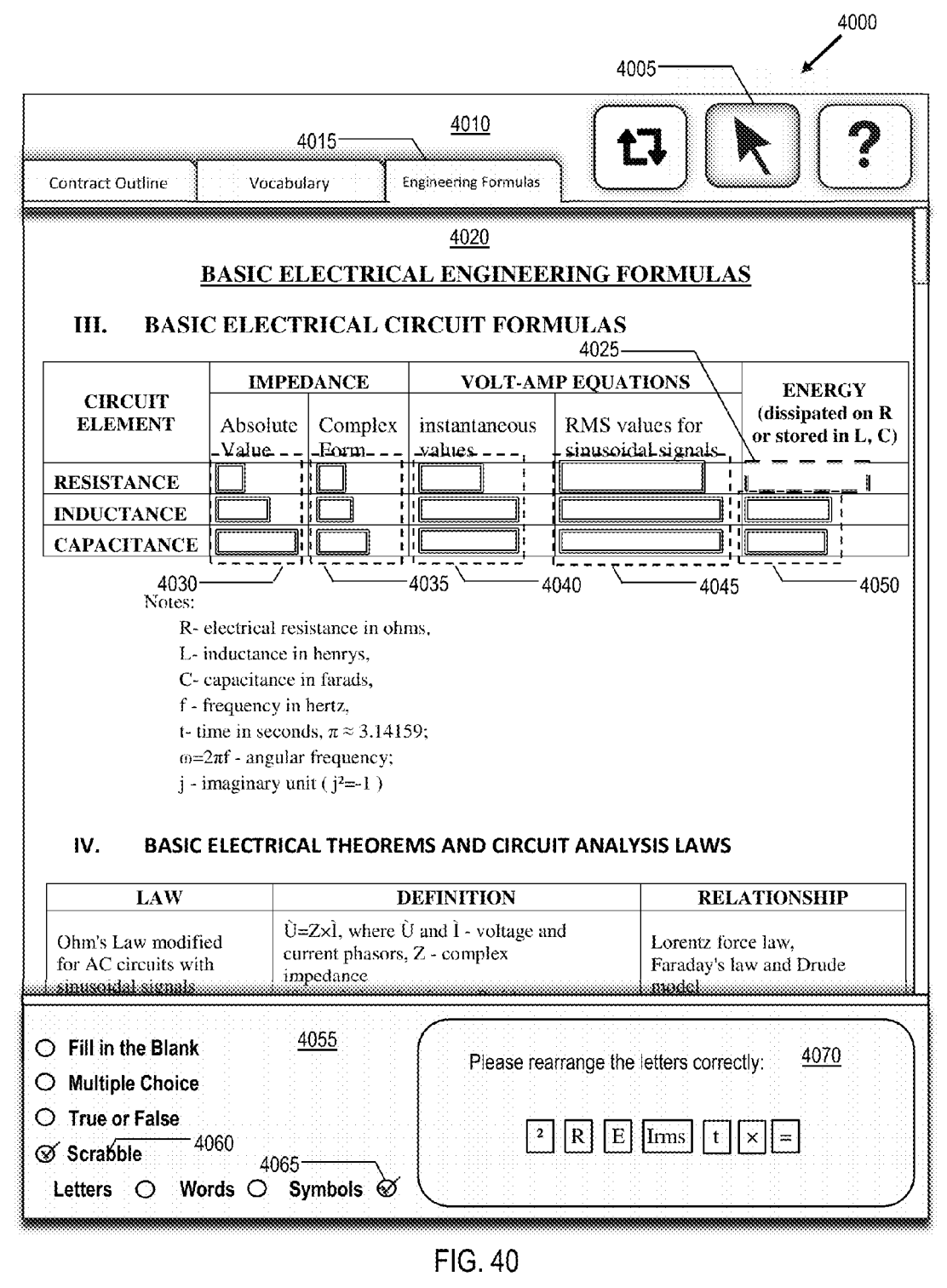

FIG. 40 is a screenshot of another embodiment of the graphical user interface of the application and shows the search results of a manual search in a manual configuration setting. As shown in FIG. 40, another embodiment of the graphical user interface 4000 of the application 600 may comprise: a menu bar 4010, document window 4020, and user input window 4055. After the user manually selects the keywords in document 3800 shown in FIG. 38 (e.g., formulas), the user may select any of those keywords to be replaced as test items 4025, 4030, 4035, 4040, 4045, 4050. The manual configuration button 4005 shown in the menu bar 4010 may show that it is selected (e.g., depressed or highlighted) and the window tab 4015 of the document window 4020 may show the test template and its corresponding test items 4025, 4030, 4035, 4040, 4045, 4050 of the document 3800.

Regarding the user input window 4055, the user may select a Scrabble®-like question 4060 as the desired format for the test item 4025 and, as a result, the test question 4070 may be a Scrabble®-like question 4060. Additionally, as discussed above, each Scrabble®-like question 4060 may have the option for the user to select a Letter Scrabble®, Word Scrabble®, or Symbol Scrabble® 4065. Here, in this embodiment and as shown in FIG. 40, the selected keywords, for example, may be "$^2$", "R", "E", "Irms", "t", "×" and "=", and the user may be able to answer this test question 4070 correctly for test item 4025 by rearranging the symbols in the user input window 4055 to state "$E = Irms^2 R \times t$".

Figure 41:
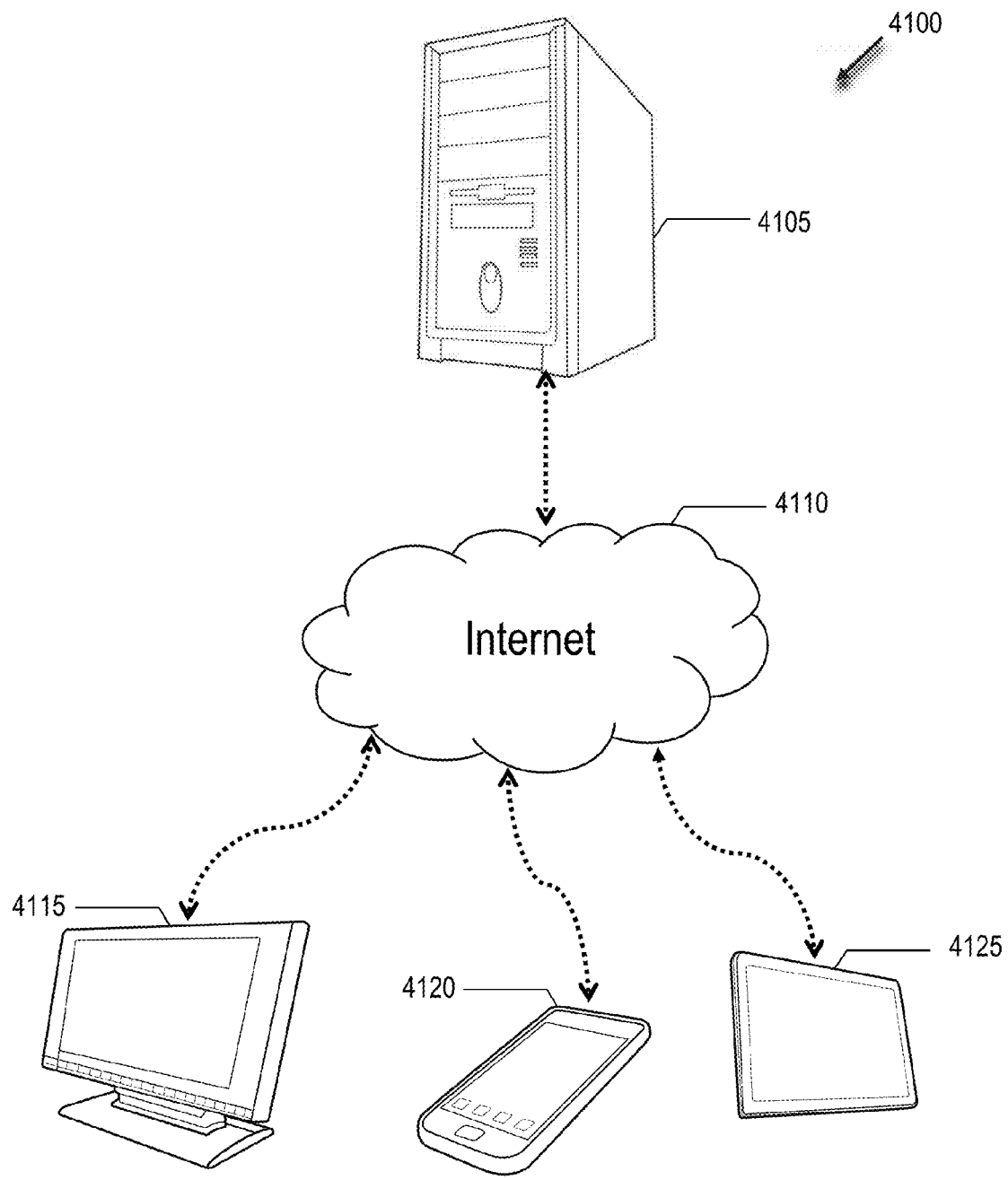
FIG. 41 is an illustration of additional embodiments of a system for enhanced memorization of a document.

FIG. 41 is an illustration of additional embodiments of a system for enhanced memorization of a document. As shown in FIG. 41, additional embodiments of a system 4100 for enhanced memorization of a document may comprise: a server 4105, Internet 4110, personal computer 4115, smartphone 4120, and tablet computer 4125. The server 4105 may be a computer system or computer program that manages access to a centralized resource or service in a network and may act as a repository for documents that may be processed by the application 600. The Internet 4110 may be a computer network consisting of a worldwide network of computer networks that use the TCP/IP network protocols to facilitate data transmission and exchange. The personal computer 4115 may be a computer system 400, 500 designed for individual use, as by a person in an office or at home or school, for applications such as word processing, data management, financial analysis, and/or computer games. The smartphone 4120 may be a device that combines a cell phone with a hand-held computer, and may offer Internet access, data storage, e-mail capability, and word processing. The tablet computer 4125 may be any wireless computer system 400, 500 that allows a user to take notes using natural handwriting with a stylus, digital pen, or finger on a touch screen.

FIG. 41 also shows how a user may use these additional embodiments of the system to enhance the memorization of a document. Specifically, a user may upload the document to a computer-readable storage device 440, 545 of a computer system 400, 500 such as the server 4105 and the application 600 may access the textual information of the uploaded document. Alternatively, the document may be uploaded to another computer system 400, 500 such as a personal computer 4115, smartphone 4120, and/or tablet computer 4125. The application 600 may be running on a separate computer system 400, 500 such as a personal computer 4115, smartphone 4120, and tablet computer 4125 and may access the textual information of the document stored in the computer-readable storage device 440, 545 of the server 4105 or another computer system 400, 500. The application 600 may then receive one or more configuration settings from the user, and, as a result of the configuration settings selected by the user, the application 600 may replace one or more keywords with test items for testing in order to create a test template. After the test template has been created, the test template may be displayed to the user through the display screen of the computer system 400, 500 such as the personal computer 4115, smartphone 4120, and tablet computer 4125. The user may then answer the test items of the test template through the computer system 400, 500. Although FIG. 41 shows the system 4100 with four different devices (e.g., server 4105, personal computer 4115, smartphone 4120, and tablet computer 4125), the system 4100 may function with any number of devices.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The components, steps, features, objects, benefits, and advantages that have been discussed are merely illustrative, and none of them, nor the discussions relating to them, are intended to limit the scope of protection in any way. Numerous other embodiments are also contemplated, including embodiments that have fewer, additional, and/or different components, steps features, objects, benefits, and advantages. The components and steps may also be arranged and ordered differently.

The foregoing description of the preferred embodiment has been presented for the purposes of illustration and description. While multiple embodiments are disclosed, still other embodiments will become apparent to those skilled in the art from the above detailed description. As will be realized, the scope of protection is capable of modifications in various obvious aspects, all without departing from the spirit and scope of the present disclosure. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims. The scope of protection is limited solely by the claims that now follow, and that scope is intended to be broad as is reasonably consistent with the language that is used in the claims. The scope of protection is also intended to be broad to encompass all structural and functional equivalents.

What is claimed as new and desired to be protected by Letters Patent is set forth in the appended claims:

1. A method for enhanced memorization of a document using a computer system, the method comprising the computer-implemented steps of:
    accessing textual information of a document stored in a computer-readable storage device by an application running on a computer system;
    receiving at least one configuration setting from a user, the at least one configuration setting relating, at least in part, to a selection of one or more keywords within the document for memorization by the user;
    responsive to the selection of the one or more keywords of the textual information based on the at least one configuration setting, replacing the one or more selected keywords with one or more test items to create a test template, such that the test template comprises the textual information and the one or more test items replacing the one or more selected keywords;
    wherein the one or more test items are positioned over the one or more keywords, such that the one or more test items are positioned over the one or more keywords;
    wherein the one or more test items are adapted to reveal the one or more keywords when the user inputs one or more correct answers in response to a test question through a user input window, the one or more correct answers relating, at least in part to an identification of the one of the more keywords; and
    displaying to the user the test template, wherein the test template is configured for the user to answer the one or more test items.

2. The method according to claim 1, wherein the at least one configuration setting for the selection of the one or more keywords is an automatic setting; and
    wherein the automatic setting causes the application to automatically select the one or more keywords of the textual information for testing based on one or more search criteria.

3. The method according to claim 2, wherein the one or more search criteria comprises a point headings search; and
    wherein the point headings search causes the application to automatically select one or more words preceded by one or more alphanumeric bullets, such that the one or more words preceded by the one or more alphanumeric bullets are the one or more selected keywords.

4. The method according to claim 2, wherein the one or more search criteria comprises a bullet point search; and
    wherein the bullet point search causes the application to automatically select one or more words preceded by one or more bullets, such that the one or more words preceded by the one or more bullets are the one or more selected keywords.

5. The method according to claim 2, wherein the one or more search criteria comprises an emphasized text search; and
    wherein the emphasized text search causes the application to automatically select one or more emphasized text, such that the one or more emphasized text are the one or more selected keywords.

6. The method according to claim 2, wherein the one or more search criteria comprises a highlighted text search; and wherein the highlighted text search causes the application to automatically select one or more highlighted text, such that the one or more highlighted text are the one or more selected keywords.

7. The method according to claim 2, wherein the one or more search criteria comprises a colored text search; and
wherein the colored text search causes the application to automatically select one or more colored text, such that the one or more colored text are the one or more selected keywords.

8. The method according to claim 1, wherein the at least one configuration setting for the selection of the one or more keywords is an automatic setting; and
wherein the automatic setting causes the application to automatically select the one or more keywords of the textual information for testing based on a search term.

9. The method according to claim 8, wherein the one or more automatically selected keywords of the textual information for testing are the search term.

10. The method according to claim 8, wherein the one or more automatically selected keywords of the textual information for testing are one or more words preceding the search term.

11. The method according to claim 8, wherein the one or more automatically selected keywords of the textual information for testing are one or more words following the search term.

12. The method according to claim 8, wherein the search term comprises at least one search filter.

13. The method according to claim 1, wherein the at least one configuration setting for the selection of the one or more keywords is a manual setting; and
wherein the manual setting causes the application to allow the user to manually select the one or more keywords of the textual information for testing.

14. The method according to claim 1, further comprising the first step of:
prompting the user to upload the document into the computer-readable storage device, wherein the uploaded document comprises the textual information generated in response to an optical character recognition (OCR) module.

15. The method according to claim 1, wherein the one or more test items is selected from the group of test items consisting of: a fill-in-the-blank question; a multiple choice question; a true or false question; and a Scrabble®-like question.

16. A method for enhanced memorization of a document using a computer system, the method comprising the computer-implemented steps of:
prompting a user to upload a document into a computer-readable storage device by an application running on a computer system;
accessing textual information of the uploaded document stored in the computer-readable storage device;
automatically selecting one or more keywords of the textual information of the uploaded document, wherein the one or more keywords are subjects for testing;
replacing the one or more automatically selected keywords of the textual information with one or more test items to create a test template, such that the test template comprises the textual information and the one or more test items replacing the one or more automatically selected keywords;
wherein the one or more test items are positioned over the one or more keywords, such that the one or more test items conceal the one or more keywords;
wherein the one or more test items are adapted to reveal the one or more keywords when the user inputs one or more correct answers in response to a test question through a user input window, the one or more correct answers relating, at least on part, to an identification of the one or more keywords; and
displaying to the user the test template, wherein the test template is configured for the user to answer the one or more test items.

17. The method according to claim 16, wherein the automatically selecting step of the one or more selected keywords is based on one or more search criteria.

18. The method according to claim 17, wherein the one or more search criteria comprises a point headings search; and
wherein the point headings search causes the application to automatically select one or more words preceded by one or more alphanumeric bullets, such that the one or more words preceded by the one or more alphanumeric bullets are the one or more automatically selected keywords.

19. The method according to claim 17, wherein the one or more search criteria comprises a bullet point search; and
wherein the bullet point search causes the application to automatically select one or more words preceded by one or more bullets, such that the one or more words preceded by the one or more bullets are the one or more automatically selected keywords.

20. The method according to claim 17, wherein the one or more search criteria comprises an emphasized text search; and
wherein the emphasized text search causes the application to automatically select one or more emphasized text, such that the one or more emphasized text are the one or more automatically selected keywords.

21. The method according to claim 17, wherein the one or more search criteria comprises a highlighted text search; and
wherein the highlighted text search causes the application to automatically select one or more highlighted text, such that the one or more highlighted text are the one or more automatically selected keywords.

22. The method according to claim 17, wherein the one or more search criteria comprises a colored text search; and
wherein the colored text search causes the application to automatically select one or more colored text, such that the one or more colored text are the one or more automatically selected keywords.

23. The method according to claim 16, wherein the automatically selecting step of the one or more selected keywords is based on a search term; and
wherein the search term comprises at least one search filter.

24. The method according to claim 23, wherein the one or more automatically selected keywords of the textual information for testing are the search term.

25. The method according to claim 23, wherein the one or more automatically selected keywords of the textual information for testing are one or more words preceding the search term.

26. The method according to claim 23, wherein the one or more automatically selected keywords of the textual information for testing are one or more words following the search term.

27. The method according to claim 16, wherein the uploaded document comprises the textual information generated in response to an optical character recognition (OCR) module.

28. The method according to claim 16, wherein the one or more test items is selected from the group of test items consisting of: a fill-in-the-blank question; a multiple choice question; a true or false question; and a Scrabble®-like question.

29. A method for enhanced memorization of a document using a computer system, the method comprising the computer-implemented steps of:
prompting a user to upload a document into a computer-readable storage device by an application running on a computer system;
accessing textual information of the uploaded document stored in the computer-readable storage device;
displaying to the user the textual information;
prompting the user to manually select one or more keywords of the textual information of the uploaded document, wherein the one or more manually selected keywords are one or more subjects for testing;
replacing the one or more manually selected keywords of the textual information of the uploaded document with one or more test items to create a test template, such that the test template comprises the textual information and the one or more test items replacing the one or more manually selected keywords;
wherein the one or more test items are positioned over the one or more keywords, such that the one or more test items conceal the one or more keywords;
wherein the one or more test items are adapted to reveal the one or more keywords when the user inputs one or more correct answers in response to a test question through a user input window, the one or more correct answers relating, at least in part, to an identification of the one or more keywords; and
displaying to the user the test template, wherein the test template is configured for the user to answer the one or more test items.

30. The method according to claim 29, wherein the uploaded document comprises the textual information generated in response to an optical character recognition (OCR) module.

31. The method according to claim 29, wherein the one or more test items is selected from the group of test items consisting of: a fill-in-the-blank question; a multiple choice question; a true or false question; and a Scrabble®-like question.

32. A non-transitory computer readable storage medium, comprising one or more executable instructions, which, when executed by a computer system, configure the computer system to perform a method for enhanced memorization of a document, comprising:
accessing textual information of a document stored in a computer-readable storage device by an application running on a computer system;
receiving at least one configuration setting from a user, the at least one configuration setting relating, at least in part, to a selection of one or more keywords within the document for memorization by the user;
responsive to a selection of one or more keywords of the textual information based on the at least one configuration setting, replacing the one or more selected keywords with one or more test items to create a test template, such that the test template comprises the textual information and the one or more test items replacing the one or more selected keywords;
wherein the one or more test items are positioned over the one or more keywords, such that the one or more test items conceal the one or more keywords;
wherein the one or more test items are adapted to reveal the one or more keywords when the user inputs one or more correct answers in response to a test question through a user input window, the one or more correct answers relating, at least in part, to an identification of the one or more keywords; and
displaying to the user the test template, wherein the test template is configured for the user to answer the one or more test items.

33. The method according to claim 32, wherein the at least one configuration setting for the selection of the one or more keywords is an automatic setting; and
wherein the automatic setting causes the application to automatically select the one or more keywords of the textual information for testing based on one or more search criteria.

34. The method according to claim 33, wherein the one or more search criteria comprises a point headings search; and
wherein the point headings search causes the application to automatically select one or more words preceded by one or more alphanumeric bullets, such that the one or more words preceded by the one or more alphanumeric bullets are the one or more selected keywords.

35. The method according to claim 33, wherein the one or more search criteria comprises a bullet point search; and
wherein the bullet point search causes the application to automatically select one or more words preceded by one or more bullets, such that the one or more words preceded by the one or more bullets are the one or more selected keywords.

36. The method according to claim 33, wherein the one or more search criteria comprises an emphasized text search; and
wherein the emphasized text search causes the application to automatically select one or more emphasized text, such that the one or more emphasized text are the one or more selected keywords.

37. The method according to claim 33, wherein the one or more search criteria comprises a highlighted text search; and
wherein the highlighted text search causes the application to automatically select one or more highlighted text, such that the one or more highlighted text are the one or more selected keywords.

38. The method according to claim 33, wherein the one or more search criteria comprises a colored text search; and
wherein the colored text search causes the application to automatically select one or more colored text, such that the one or more colored text are the one or more selected keywords.

39. The method according to claim 32, wherein the at least one configuration setting for the selection of the one or more keywords is an automatic setting; and
wherein the automatic setting causes the application to automatically select the one or more keywords of the textual information for testing based on a search term.

40. The method according to claim 39, wherein the one or more automatically selected keywords of the textual information for testing are the search term.

41. The method according to claim 39, wherein the one or more automatically selected keywords of the textual information for testing are one or more words preceding the search term.

42. The method according to claim 39, wherein the one or more automatically selected keywords of the textual information for testing are one or more words following the search term.

43. The method according to claim 39, wherein the search term comprises at least one search filter.

44. The method according to claim 32, wherein the at least one configuration setting for the selection of the one or more keywords is a manual setting; and
    wherein the manual setting causes the application to allow the user to manually select the one or more keywords of the textual information for testing.

45. The method according to claim 32, wherein the one or more test items is selected from the group of test items consisting of: a fill-in-the-blank question; a multiple choice question; a true or false question; and a Scrabble®-like question.

* * * * *